Jan. 25, 1955     E. O. BLODGETT     2,700,421
JUSTIFICATION CONTROL TAPE PUNCH
Filed Oct. 13, 1950     35 Sheets-Sheet 1
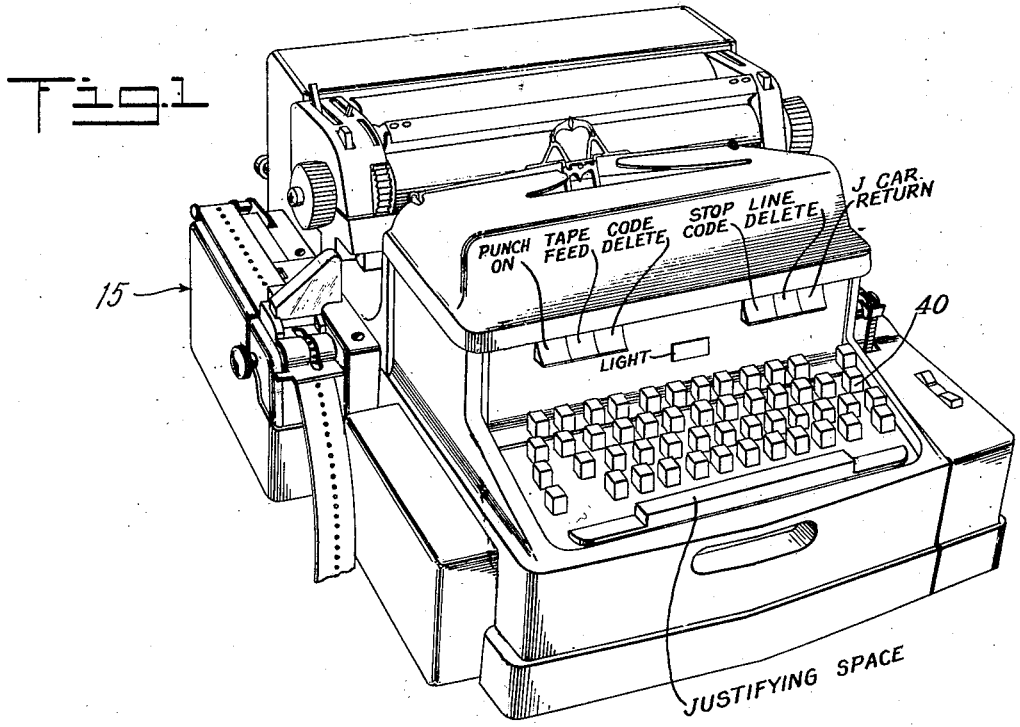
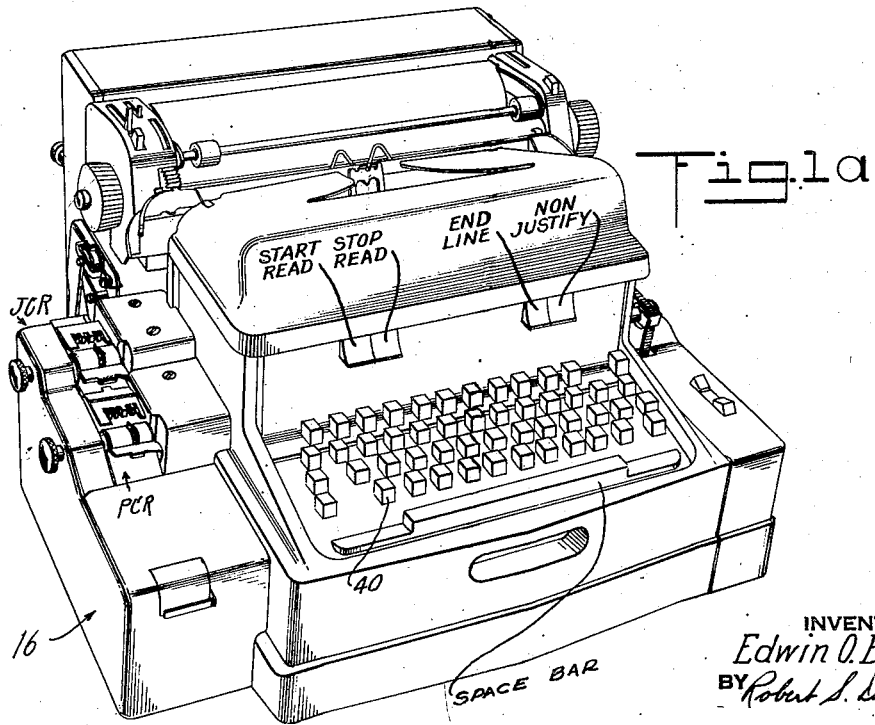
INVENTOR
Edwin O. Blodgett
BY Robert S. Dunham
ATTORNEY

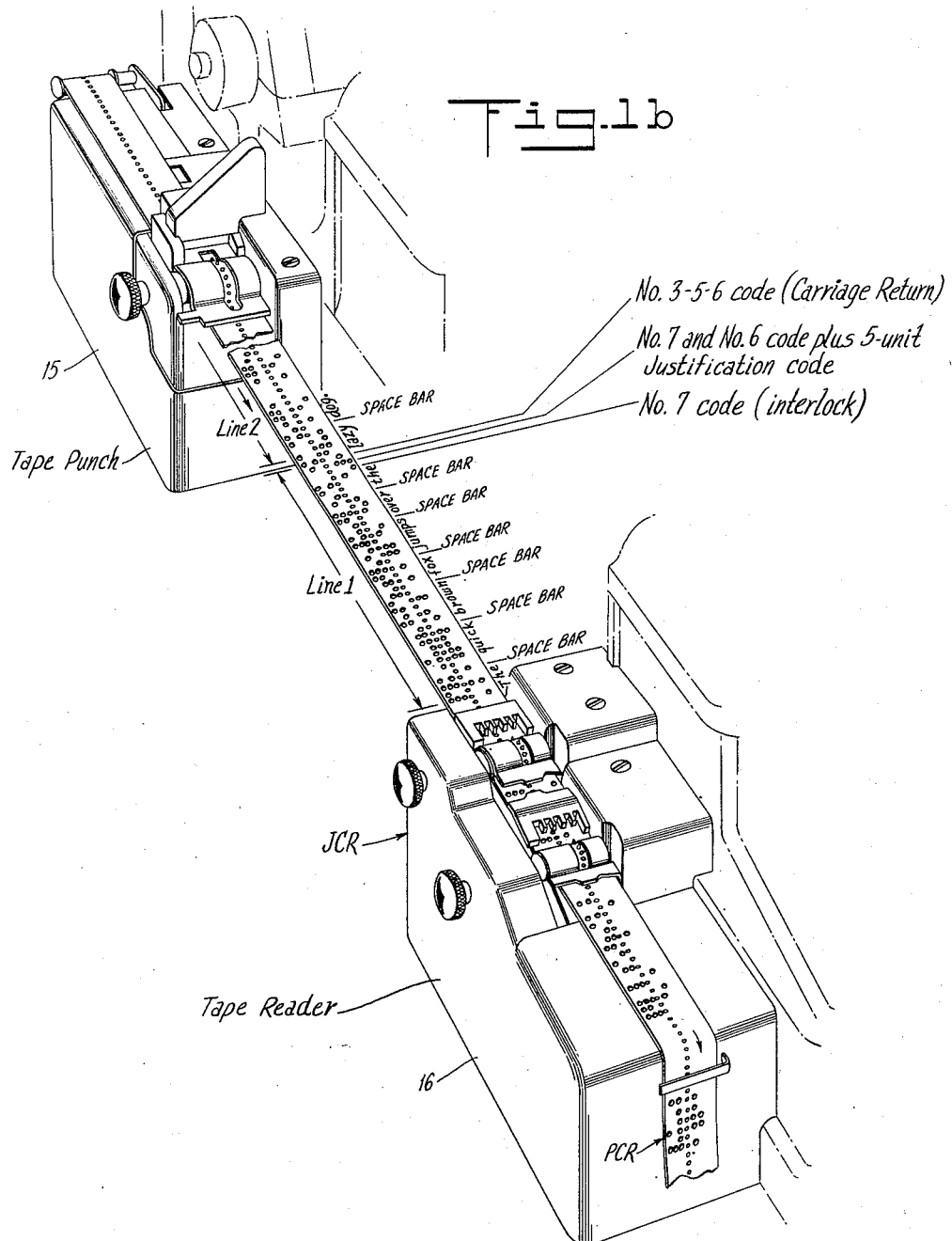

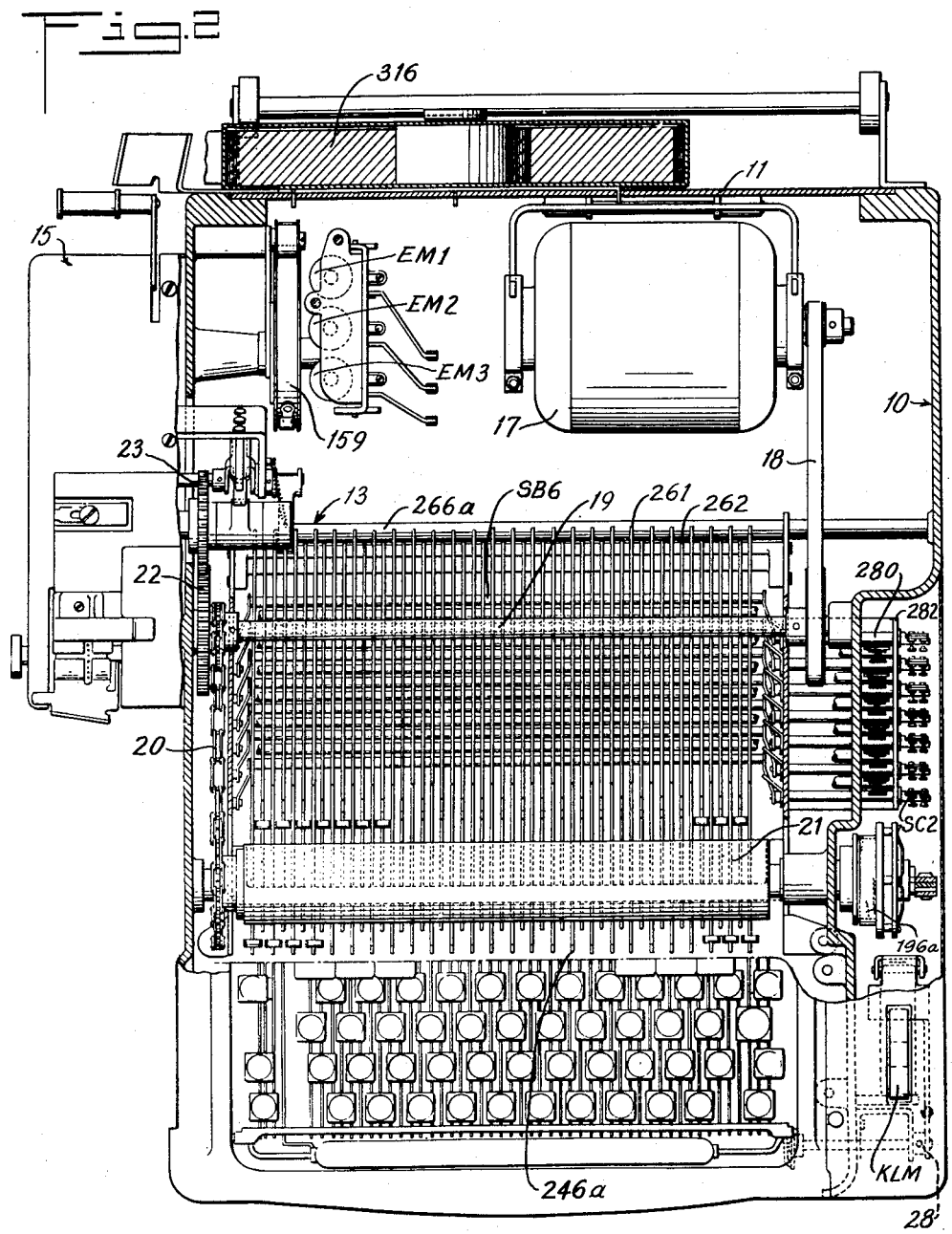

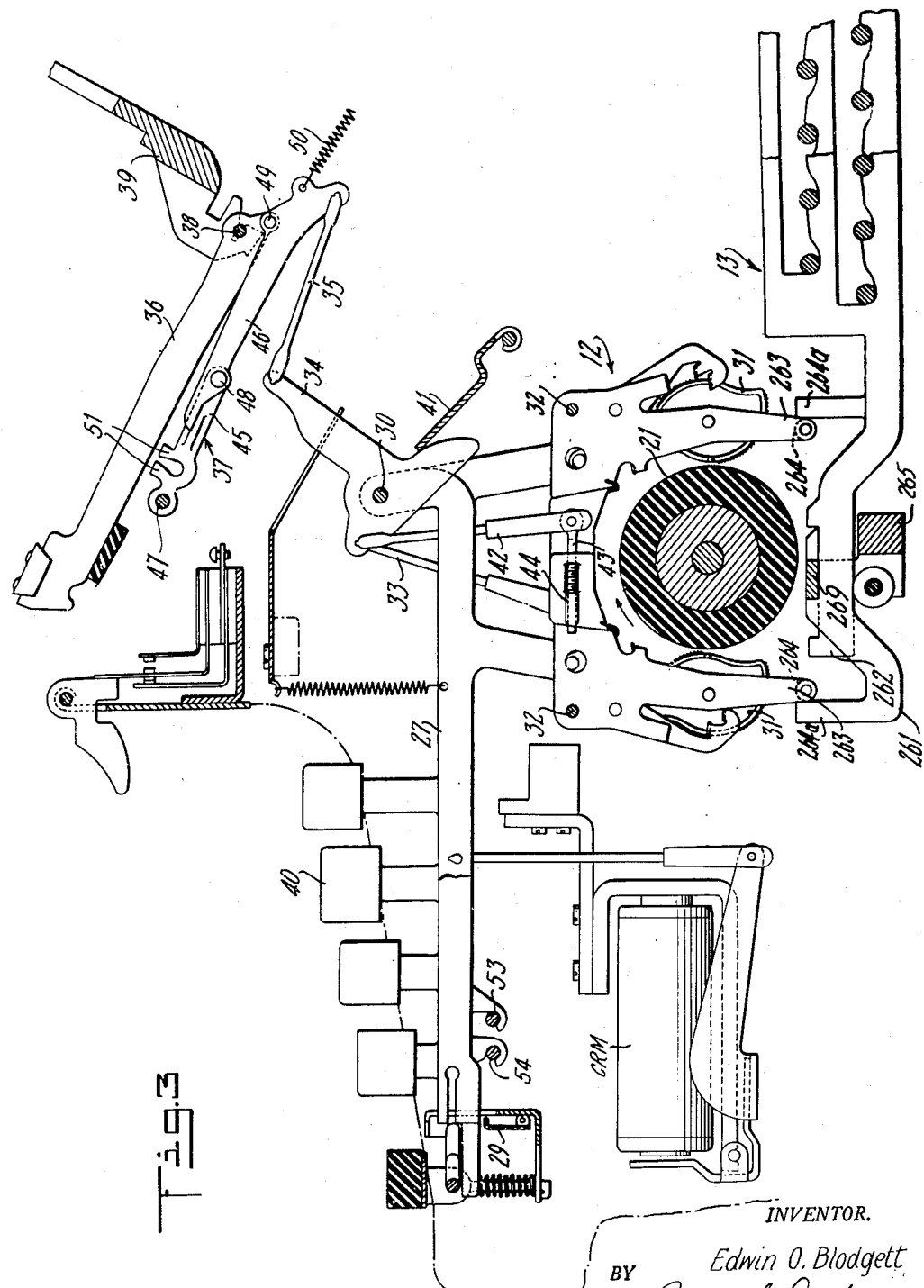

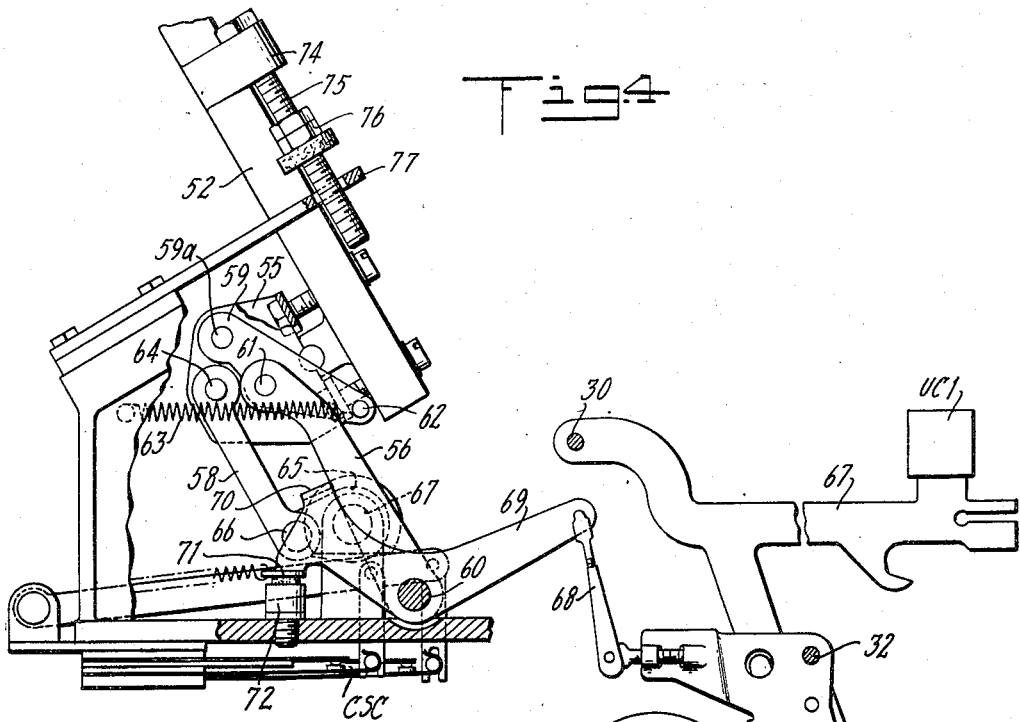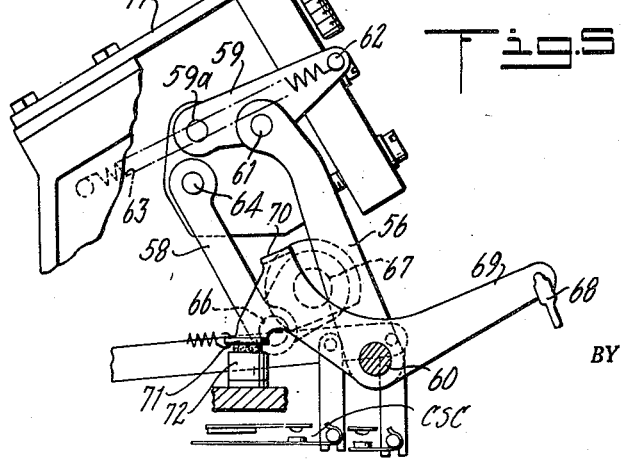

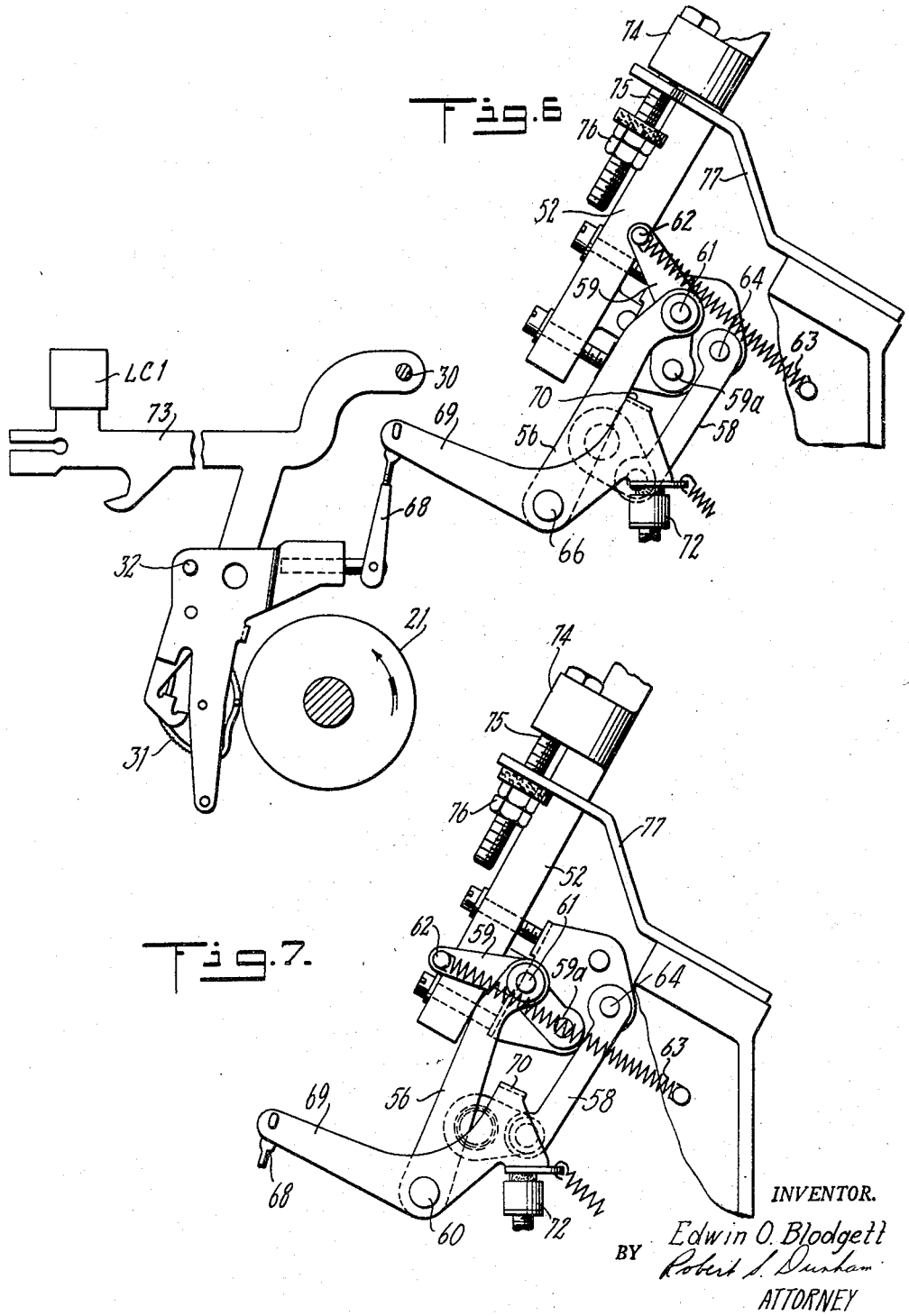

Jan. 25, 1955 E. O. BLODGETT 2,700,421
JUSTIFICATION CONTROL TAPE PUNCH
Filed Oct. 13, 1950 35 Sheets-Sheet 7
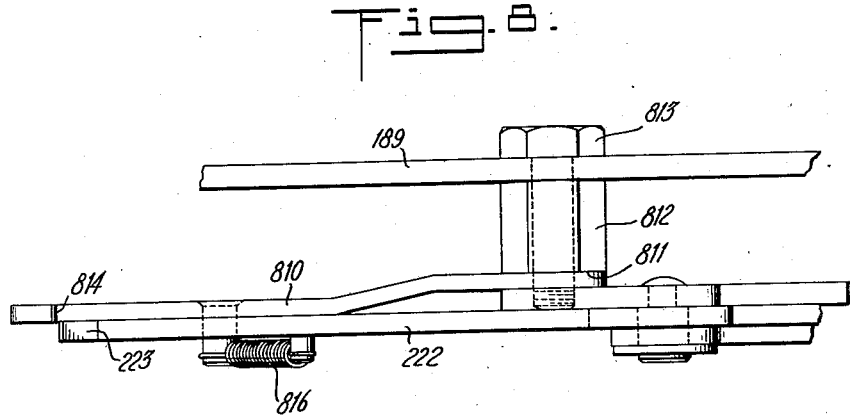
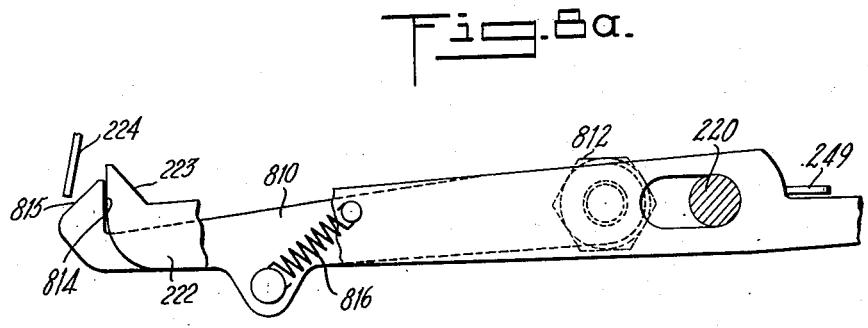
INVENTOR
Edwin O. Blodgett
BY Robert S. Dunham
ATTORNEY Jan. 25, 1955 E. O. BLODGETT 2,700,421
JUSTIFICATION CONTROL TAPE PUNCH
Filed Oct. 13, 1950 35 Sheets-Sheet 8

INVENTOR
Edwin O. Blodgett
BY Robert S. Dunham
ATTORNEY

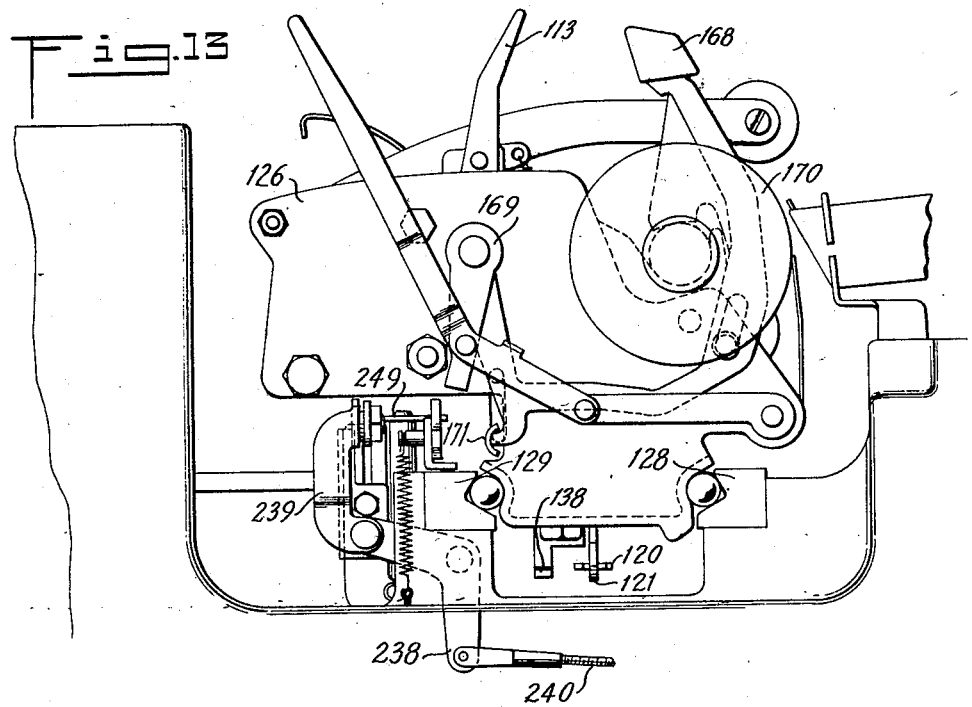
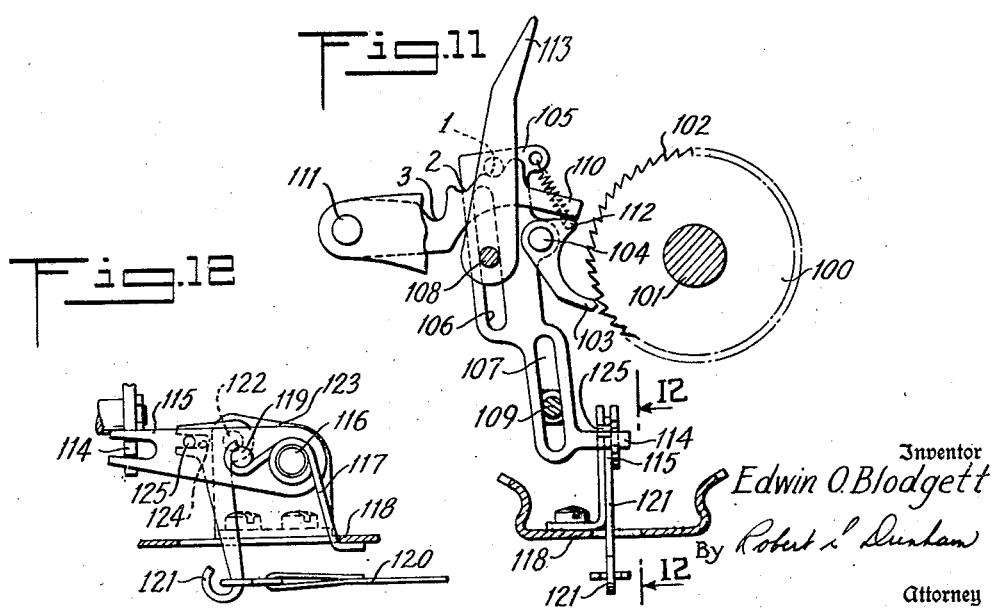

Jan. 25, 1955  E. O. BLODGETT  2,700,421
JUSTIFICATION CONTROL TAPE PUNCH
Filed Oct. 13, 1950  35 Sheets-Sheet 10

INVENTOR.
Edwin O. Blodgett
BY Robert S. Dunham
ATTORNEY

Jan. 25, 1955

E. O. BLODGETT 2,700,421

JUSTIFICATION CONTROL TAPE PUNCH

Filed Oct. 13, 1950

INVENTOR.
Edwin O. Blodgett
BY Robert S. Dunham
ATTORNEY

Jan. 25, 1955  E. O. BLODGETT  2,700,421
JUSTIFICATION CONTROL TAPE PUNCH
Filed Oct. 13, 1950  35 Sheets-Sheet 12

INVENTOR.
Edwin O. Blodgett
BY Robert S. Dunham
ATTORNEY

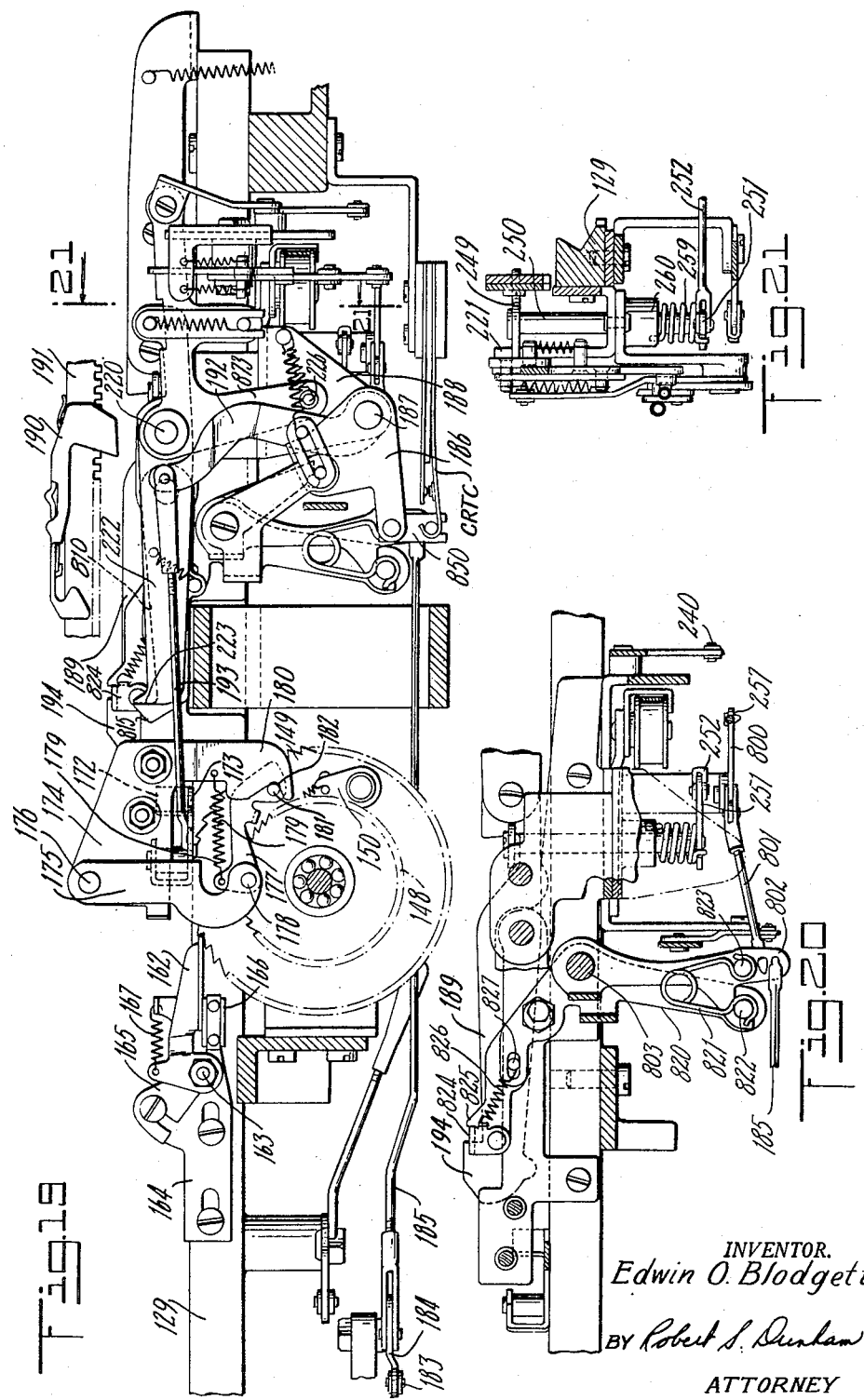

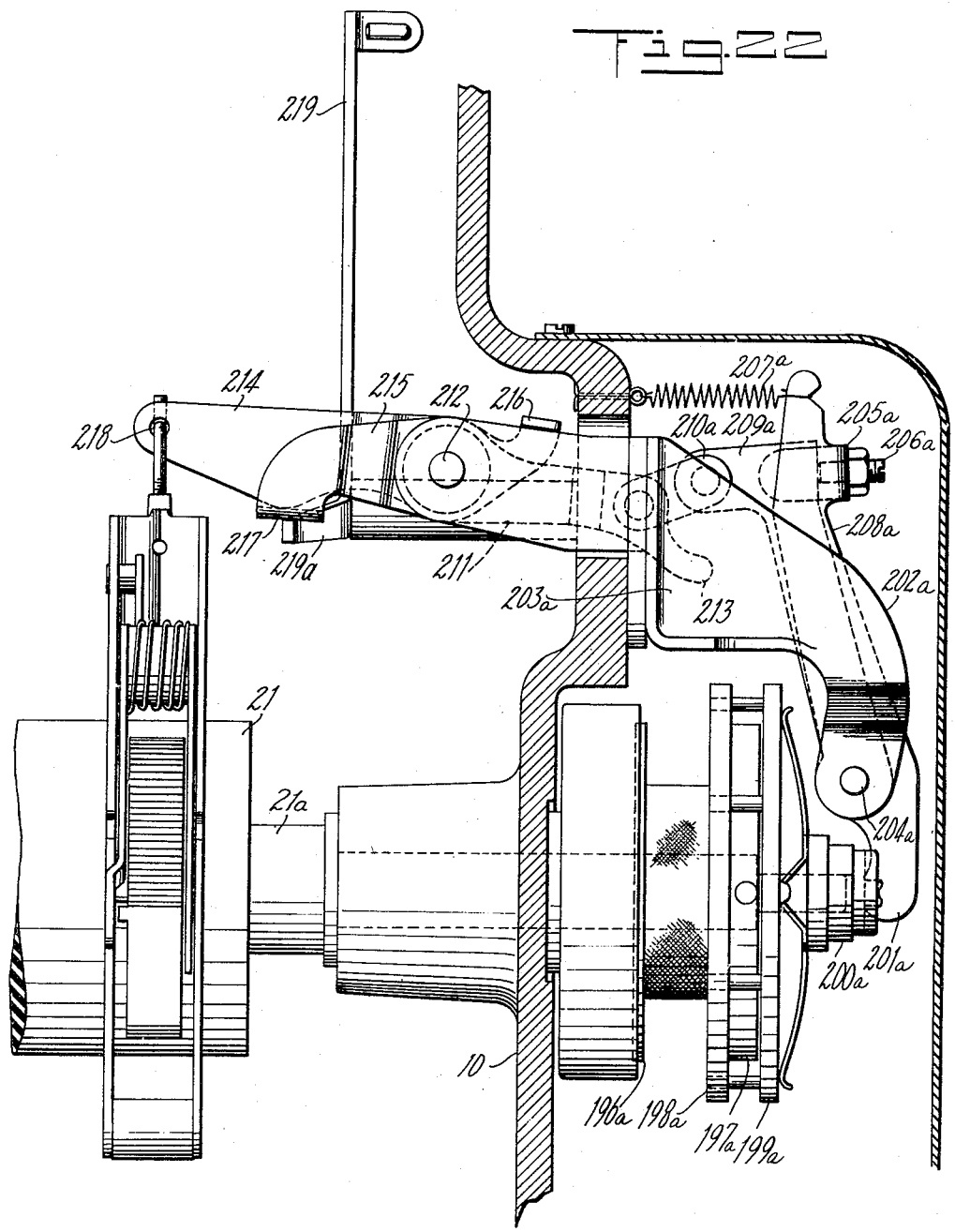

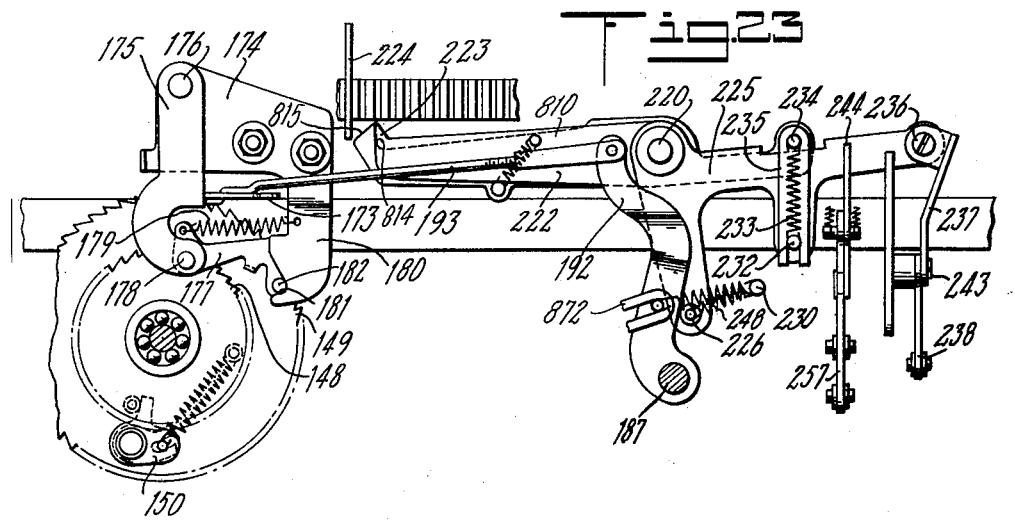
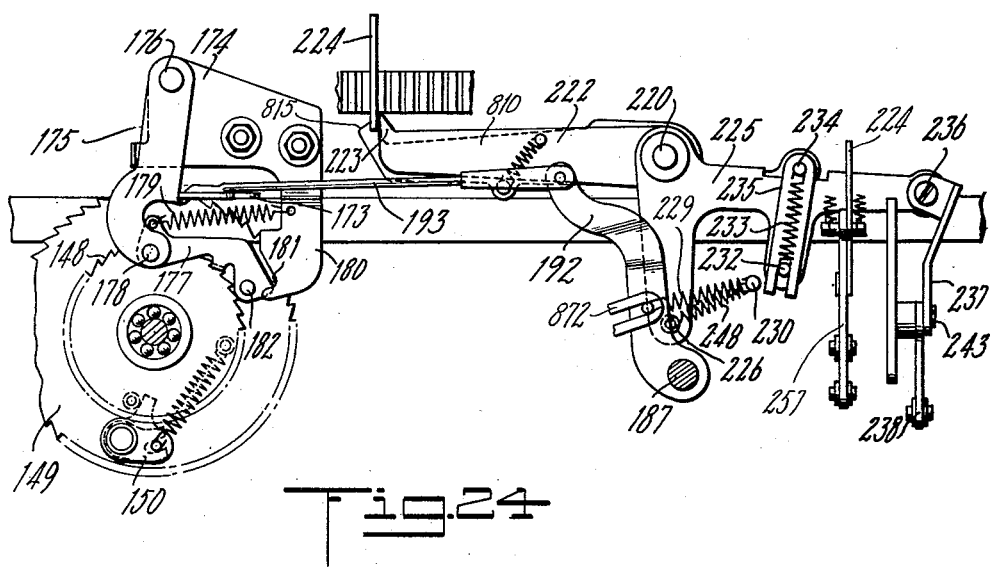

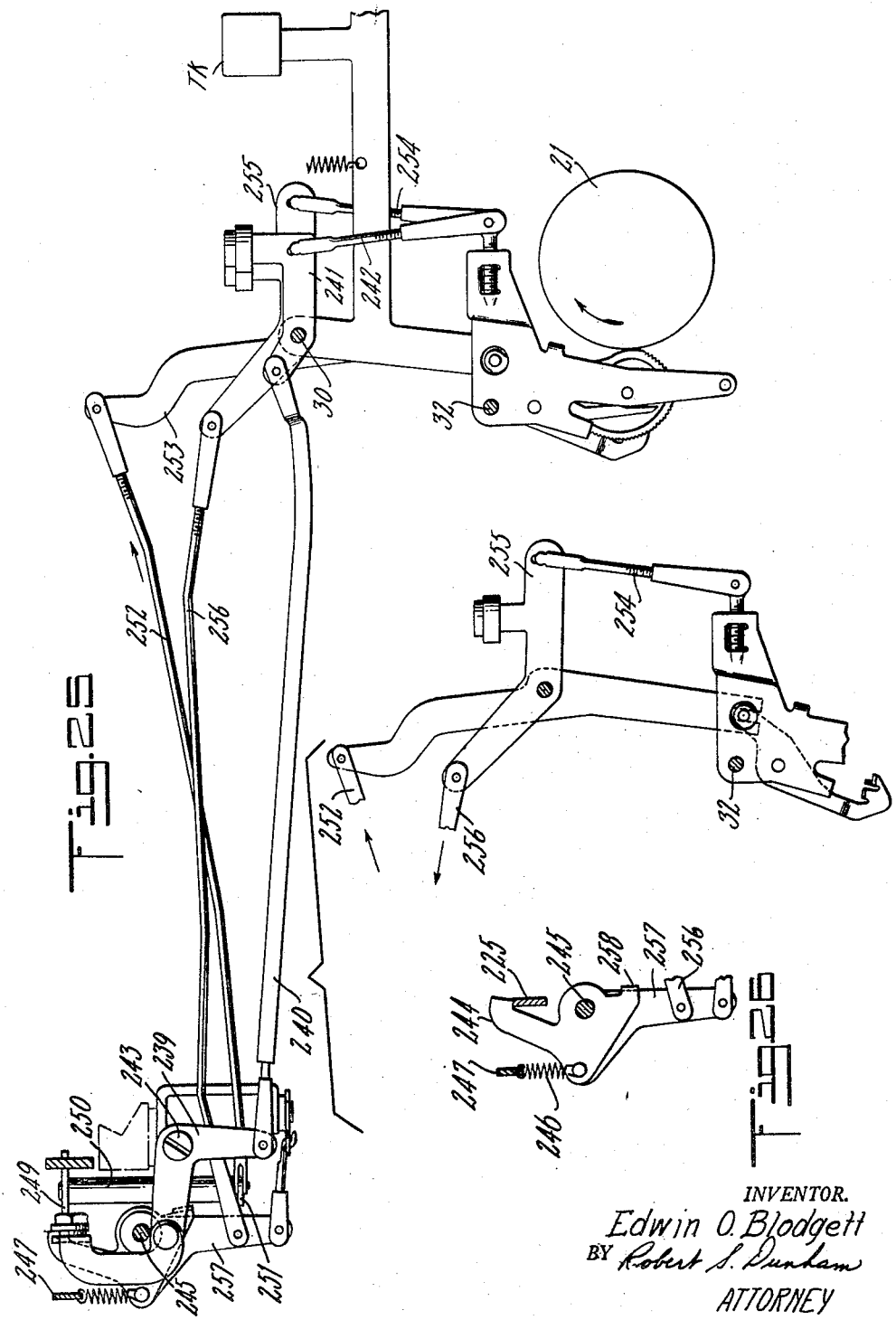

Jan. 25, 1955  E. O. BLODGETT  2,700,421
JUSTIFICATION CONTROL TAPE PUNCH
Filed Oct. 13, 1950  35 Sheets-Sheet 17
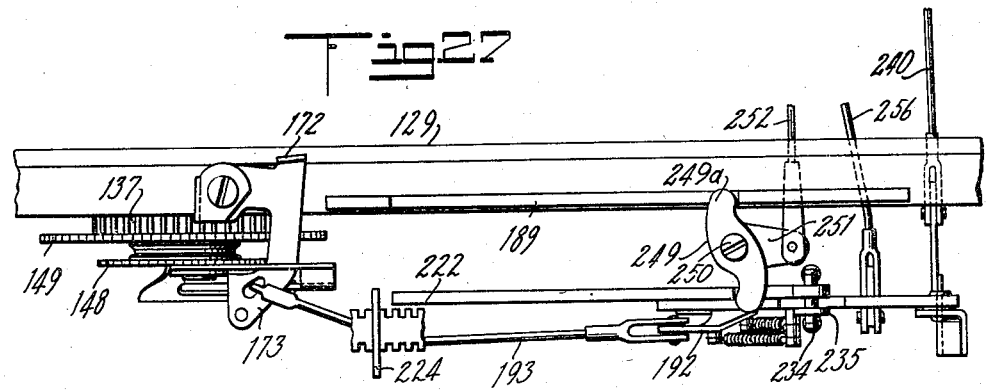
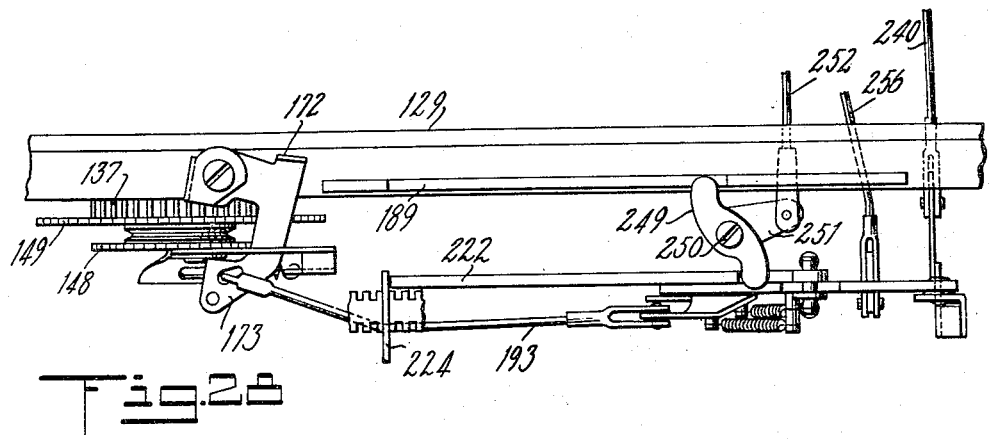
INVENTOR.
*Edwin O. Blodgett*
BY *Robert S. Dunham*
ATTORNEY

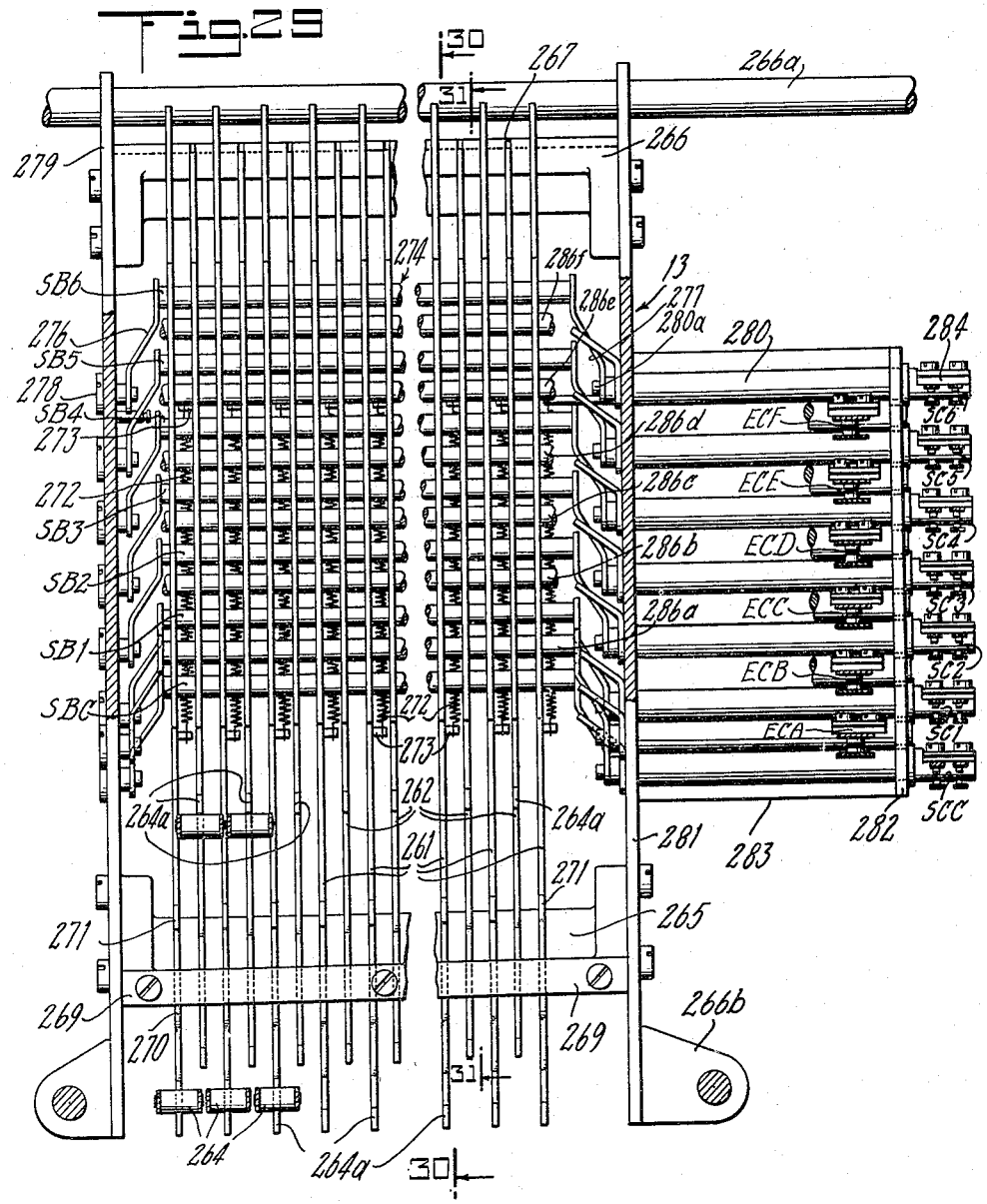

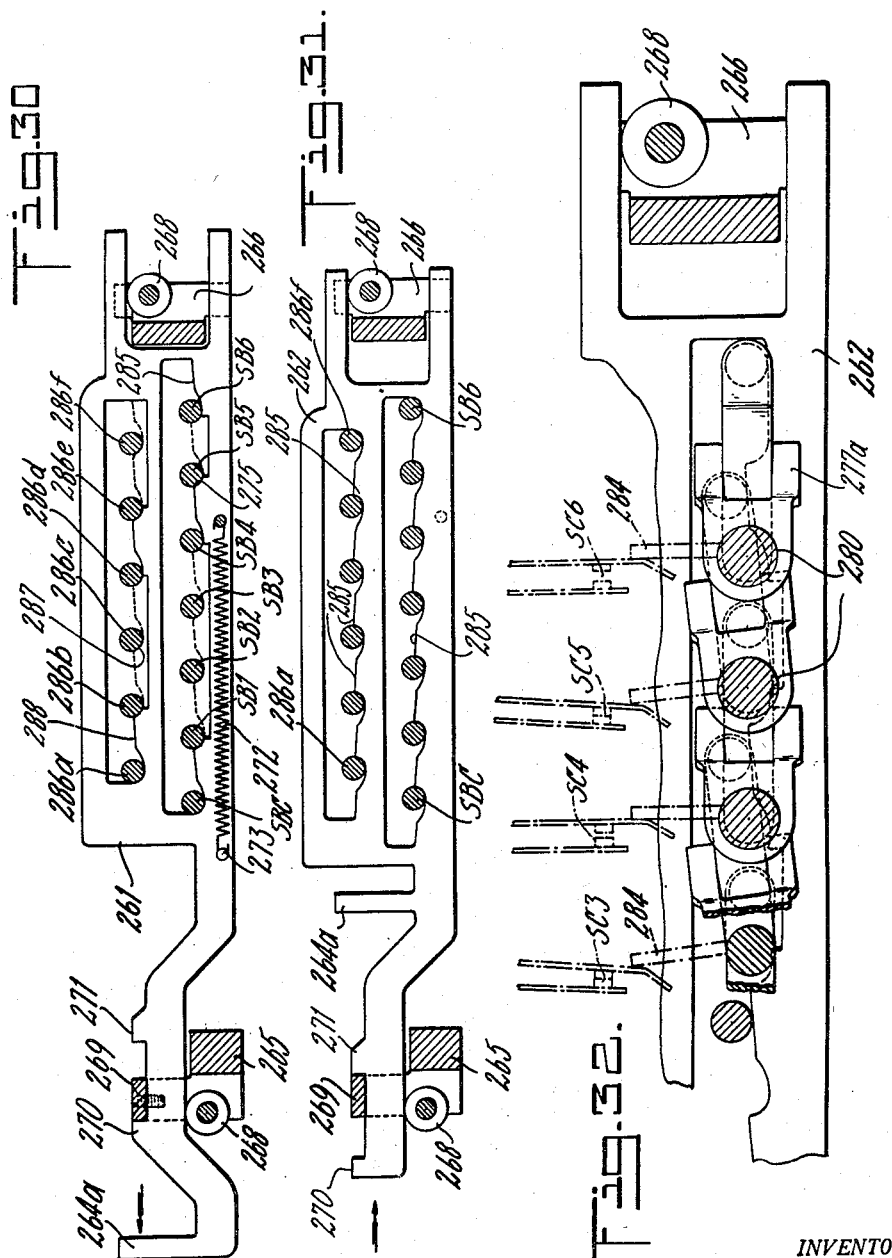

Jan. 25, 1955  E. O. BLODGETT  2,700,421
JUSTIFICATION CONTROL TAPE PUNCH
Filed Oct. 13, 1950  35 Sheets-Sheet 20
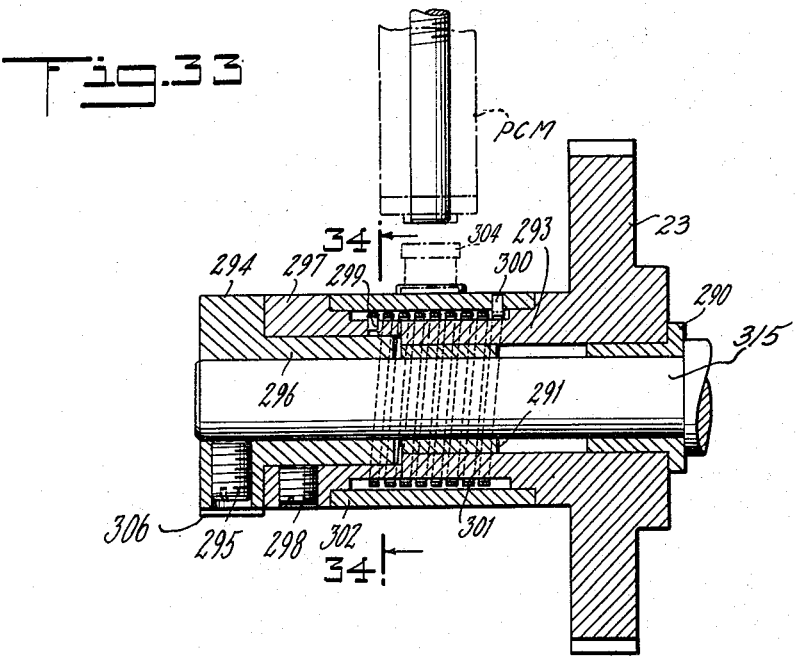
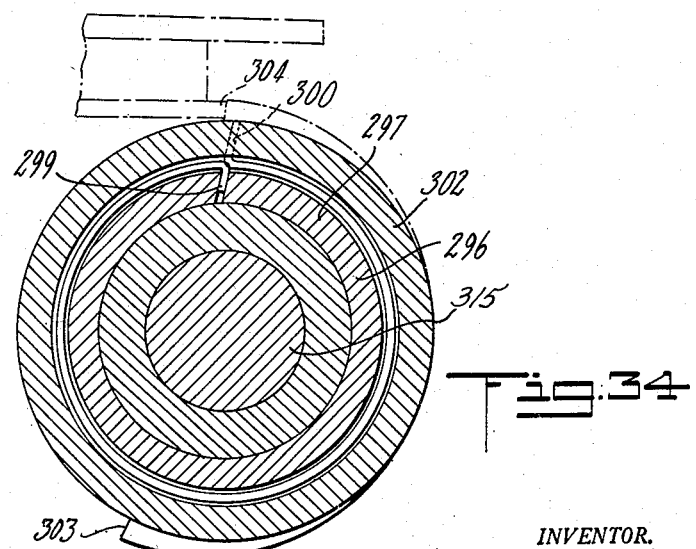
INVENTOR.
Edwin O. Blodgett
BY Robert S. Dunlam
ATTORNEY

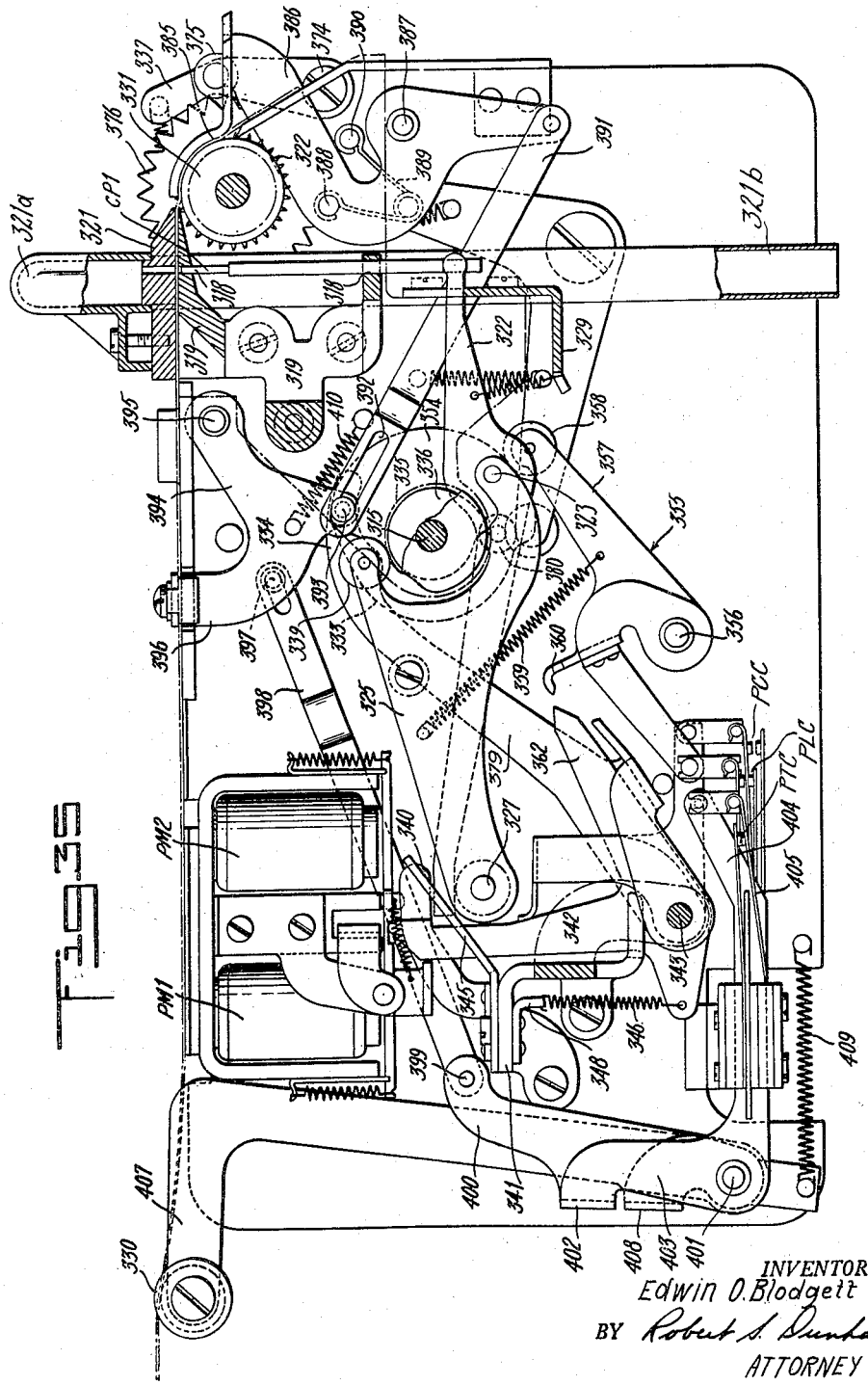

Jan. 25, 1955  E. O. BLODGETT  2,700,421
JUSTIFICATION CONTROL TAPE PUNCH
Filed Oct. 13, 1950  35 Sheets-Sheet 22

INVENTOR
Edwin O. Blodgett
BY Robert S. Dunham
ATTORNEY

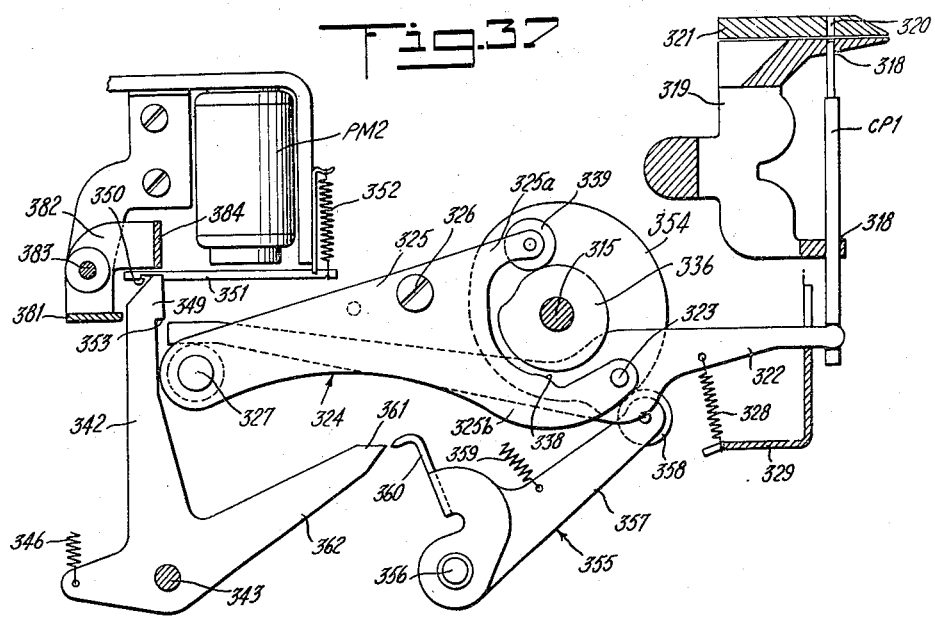
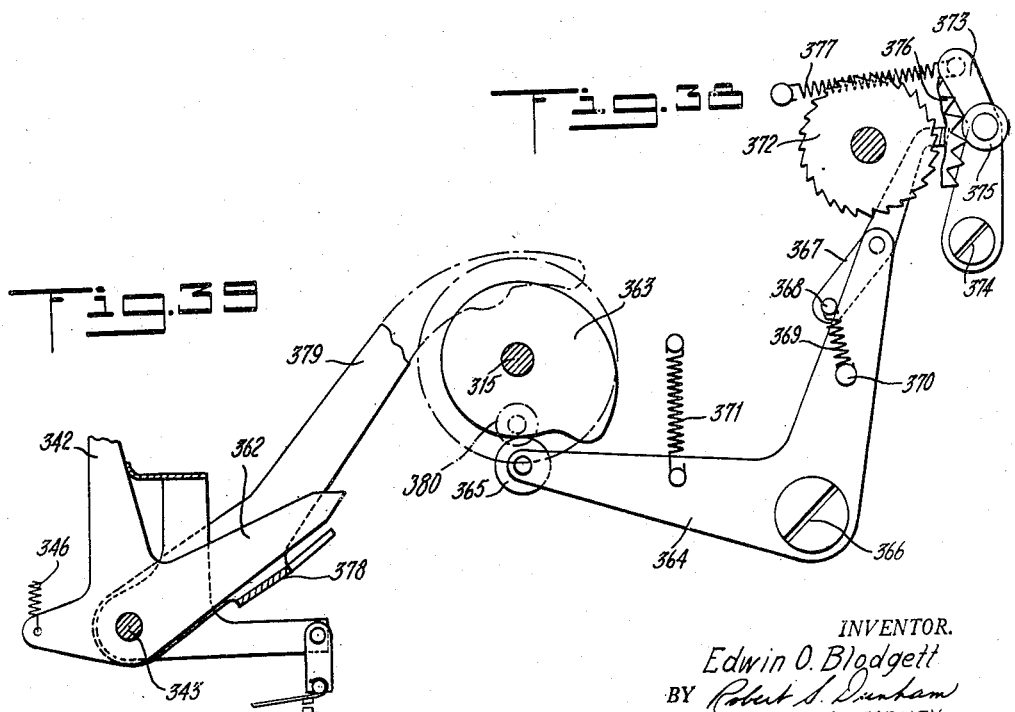

Jan. 25, 1955     E. O. BLODGETT     2,700,421
JUSTIFICATION CONTROL TAPE PUNCH
Filed Oct. 13, 1950     35 Sheets-Sheet 24
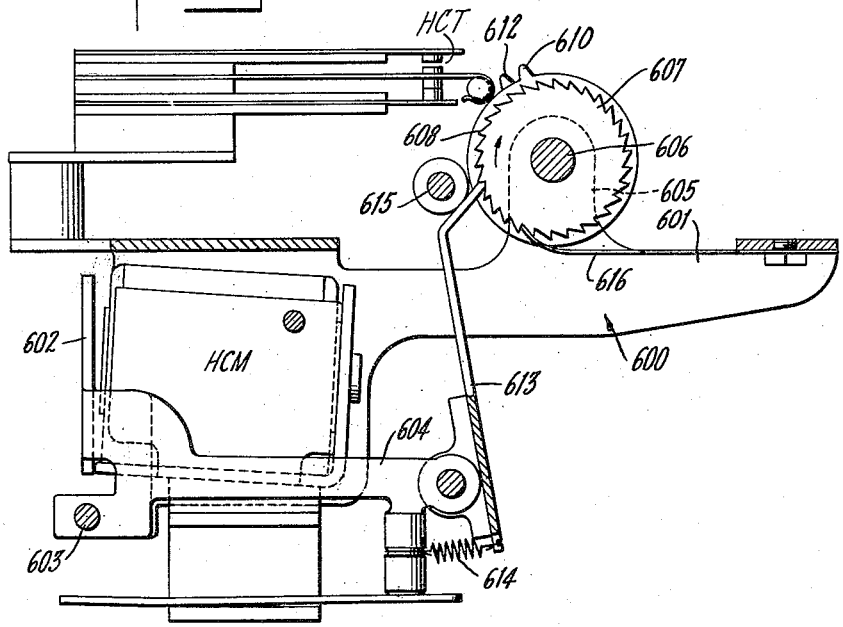
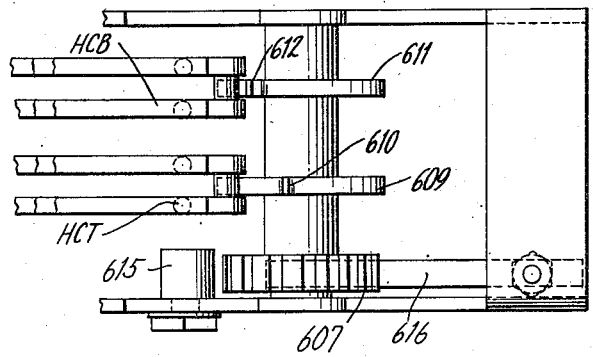
INVENTOR
Edwin O. Blodgett
BY Robert S. Durham
ATTORNEY Jan. 25, 1955  E. O. BLODGETT  2,700,421
JUSTIFICATION CONTROL TAPE PUNCH
Filed Oct. 13, 1950  35 Sheets-Sheet 25
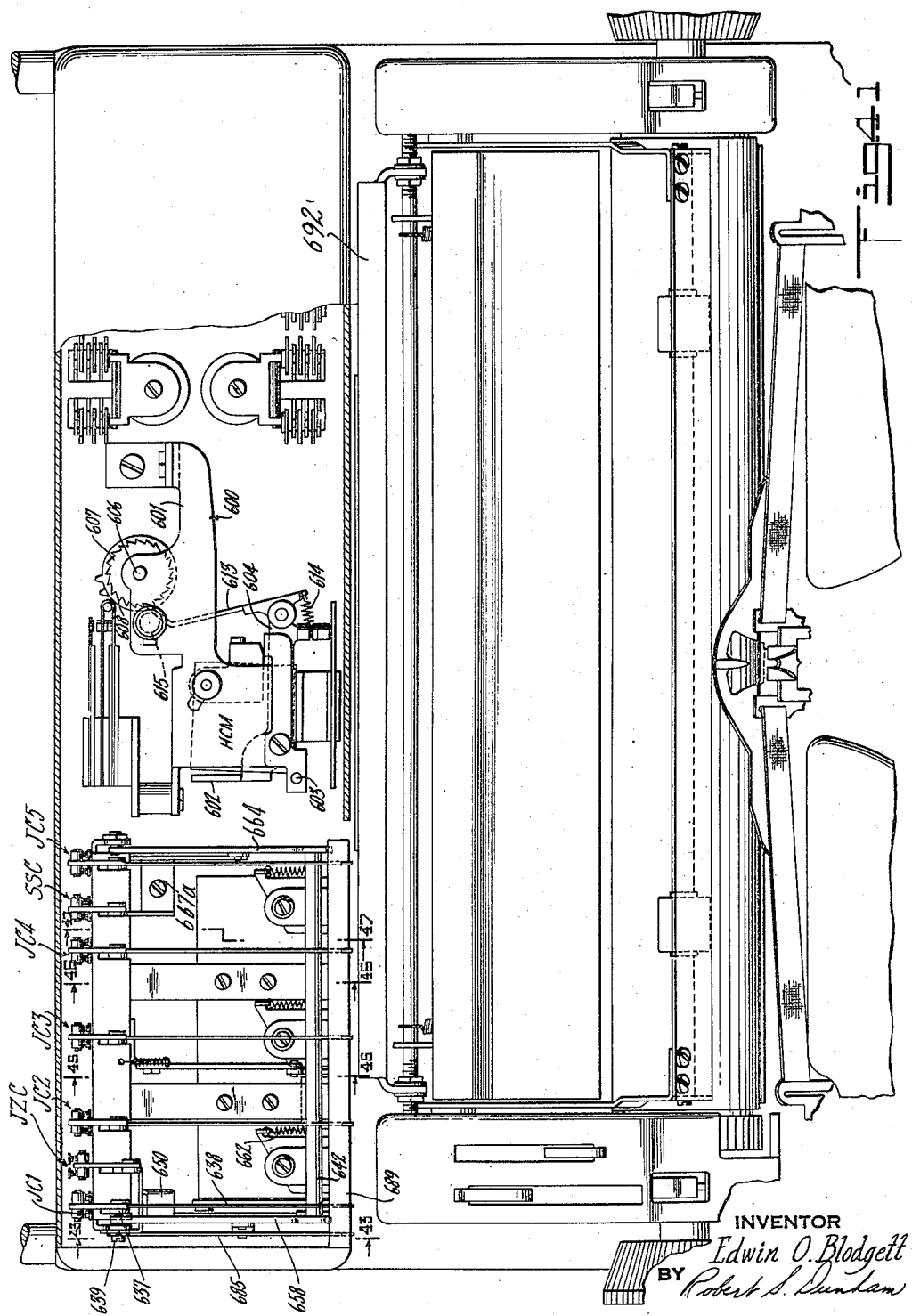
INVENTOR
*Edwin O. Blodgett*
BY *Robert S. Dunlam*
ATTORNEY Jan. 25, 1955   E. O. BLODGETT   2,700,421
JUSTIFICATION CONTROL TAPE PUNCH
Filed Oct. 13, 1950   35 Sheets-Sheet 26

INVENTOR
Edwin O. Blodgett
BY Robert S. Dunham
ATTORNEY

Jan. 25, 1955
E. O. BLODGETT
2,700,421
JUSTIFICATION CONTROL TAPE PUNCH
Filed Oct. 13, 1950
35 Sheets-Sheet 27
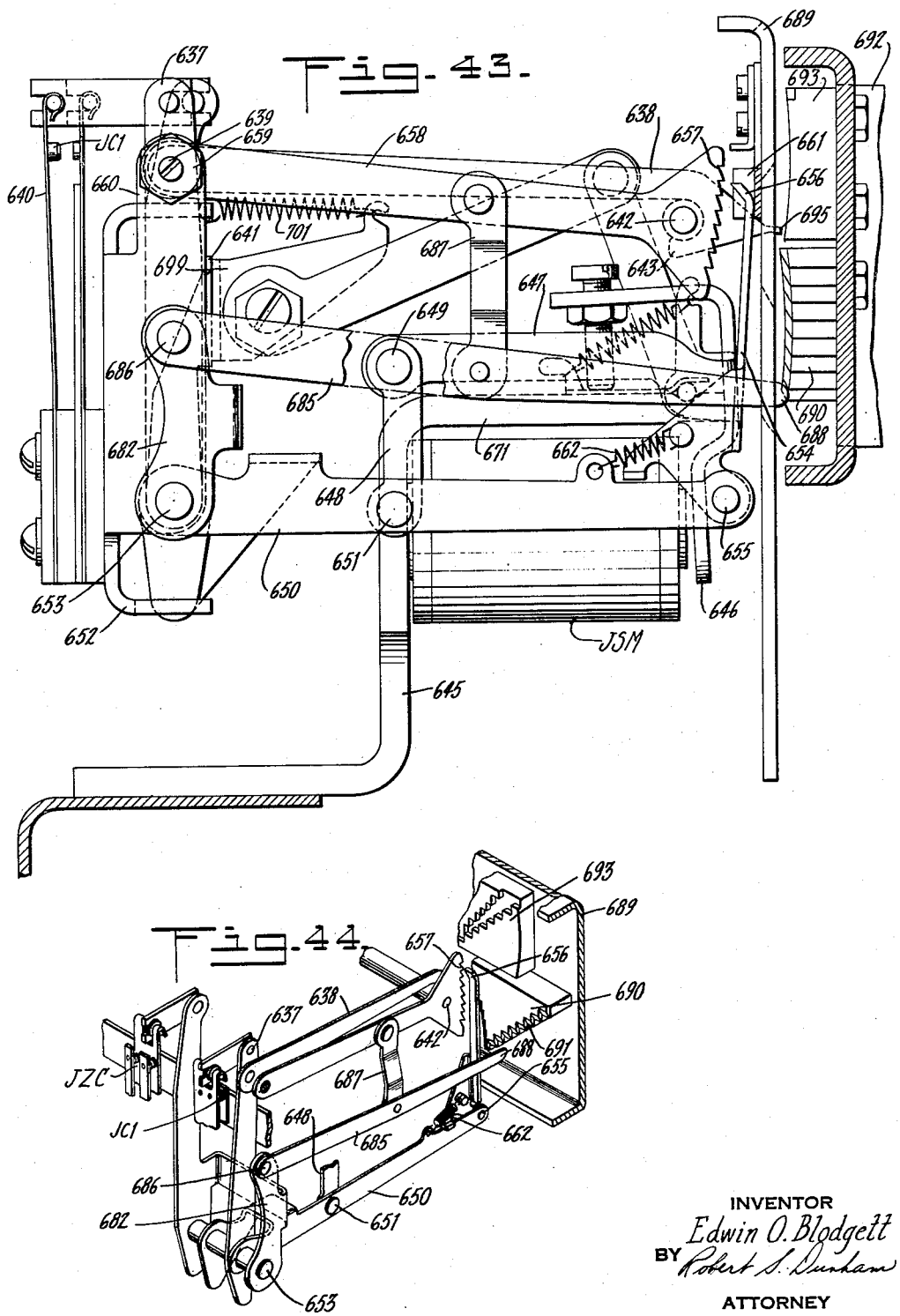
INVENTOR
Edwin O. Blodgett
BY Robert S. Dunham
ATTORNEY

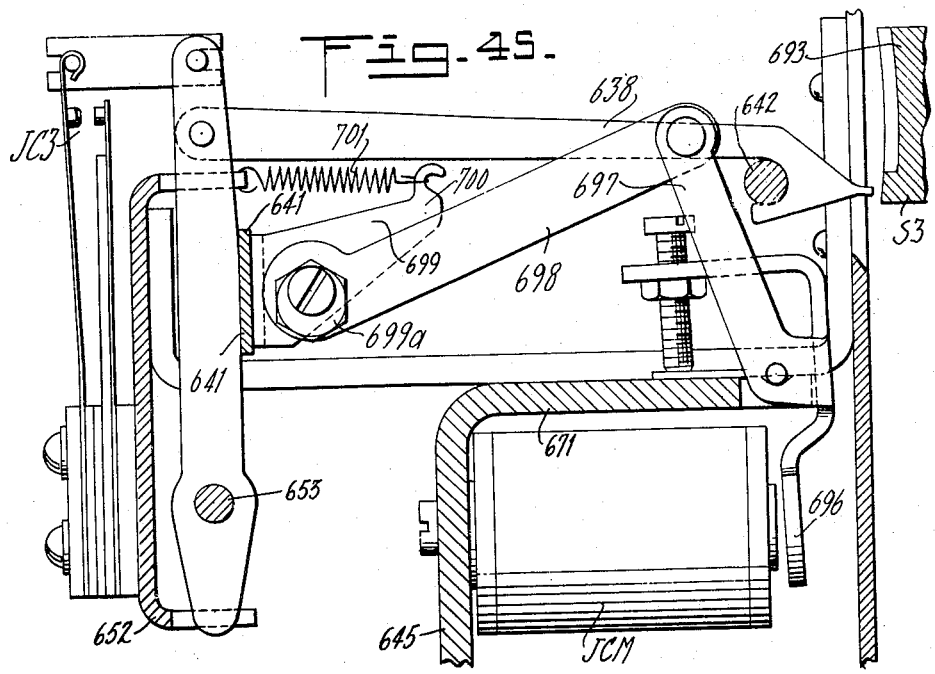
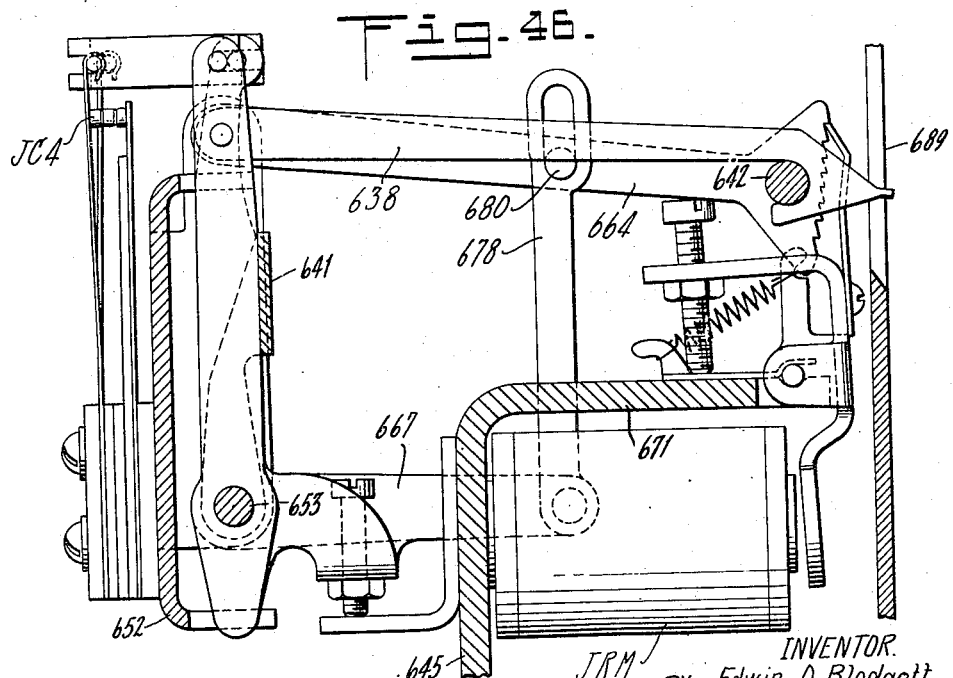

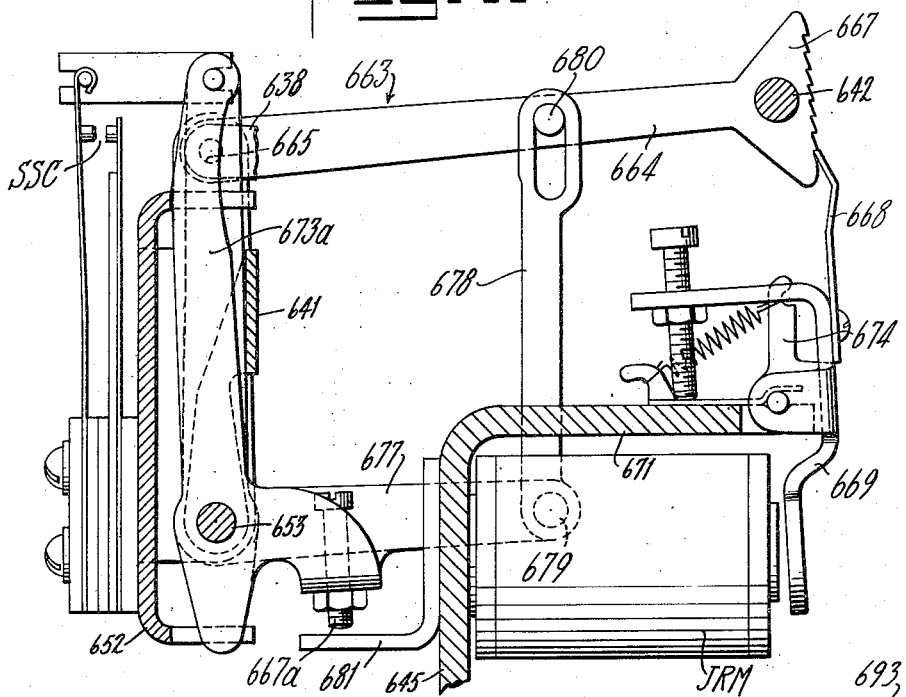
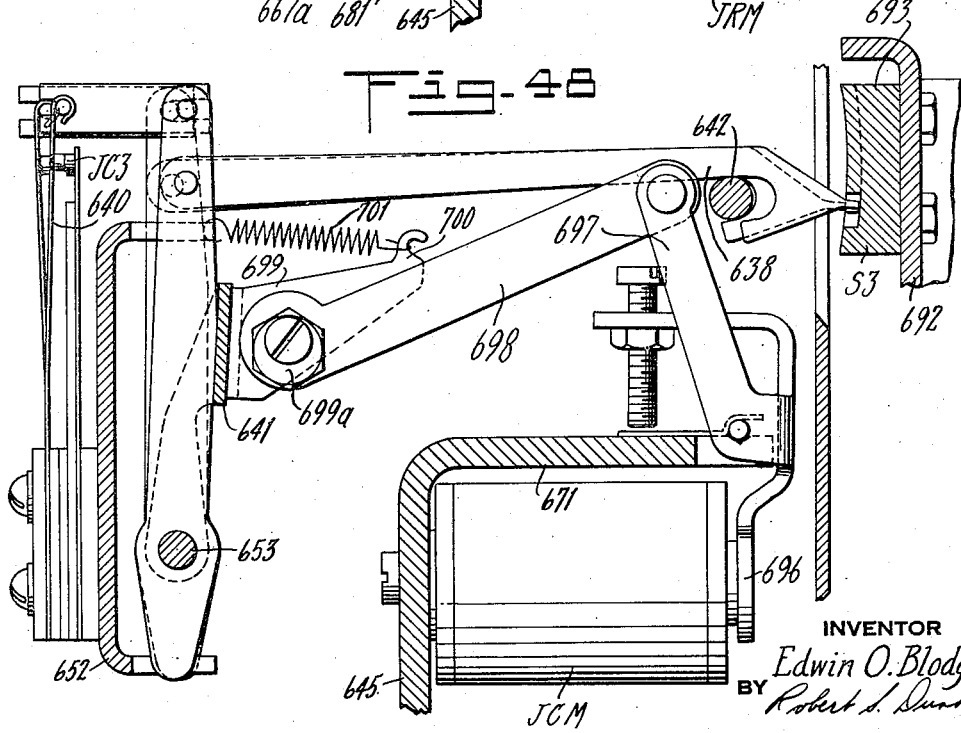

Jan. 25, 1955  E. O. BLODGETT  2,700,421
JUSTIFICATION CONTROL TAPE PUNCH
Filed Oct. 13, 1950  35 Sheets-Sheet 30
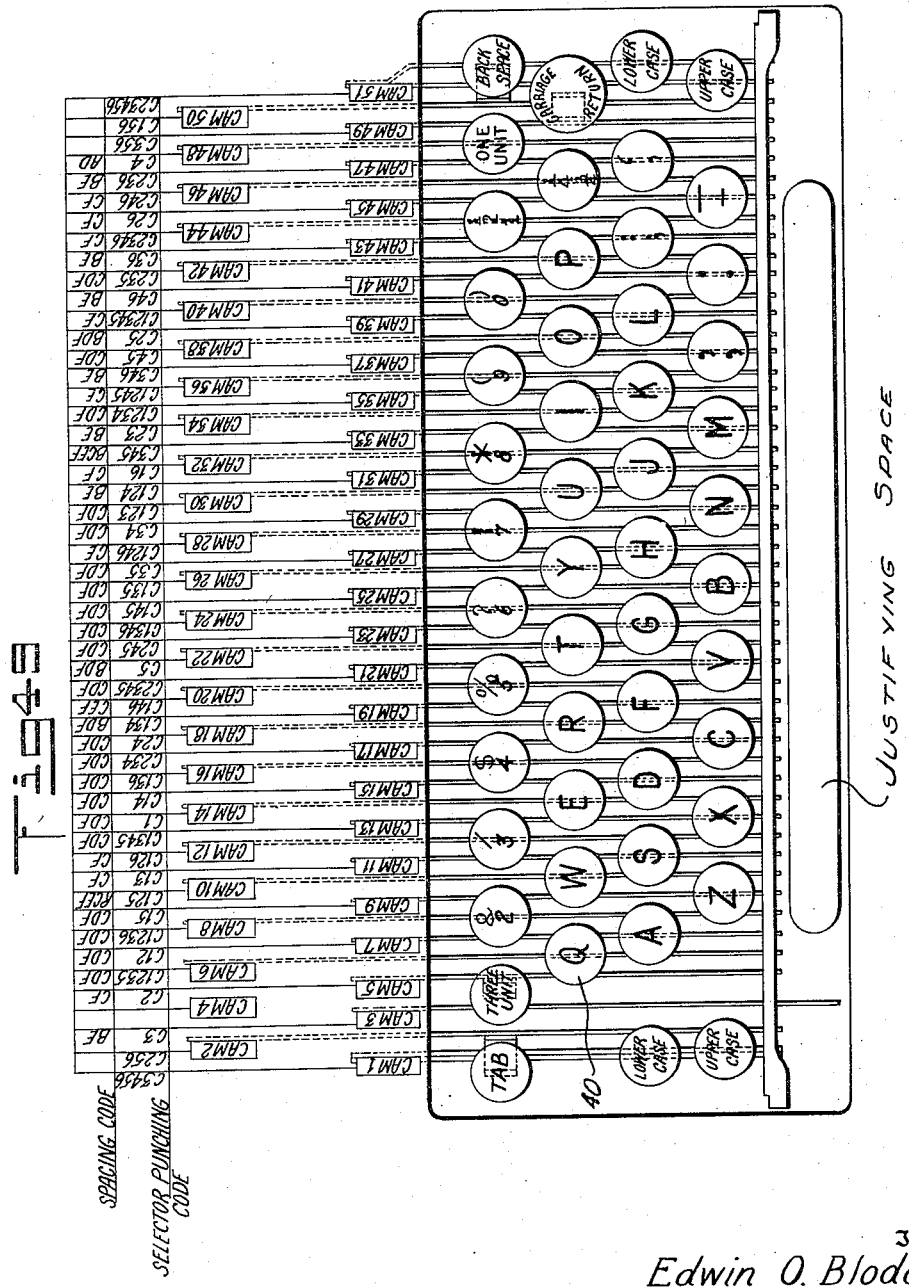
Inventor
Edwin O. Blodgett
By Robert S. Dunham
Attorney Jan. 25, 1955  E. O. BLODGETT  2,700,421
JUSTIFICATION CONTROL TAPE PUNCH Filed Oct. 13, 1950  35 Sheets—Sheet 31

Jan. 25, 1955   E. O. BLODGETT   2,700,421
JUSTIFICATION CONTROL TAPE PUNCH
Filed Oct. 13, 1950   35 Sheets-Sheet 33

INVENTOR
Edwin O. Blodgett
BY
ATTORNEY

Jan. 25, 1955  E. O. BLODGETT  2,700,421
JUSTIFICATION CONTROL TAPE PUNCH
Filed Oct. 13, 1950  35 Sheets-Sheet 34

Fig. 53

INVENTOR
Edwin O. Blodgett
BY Robert S. Dunham
ATTORNEY

Fig. 54

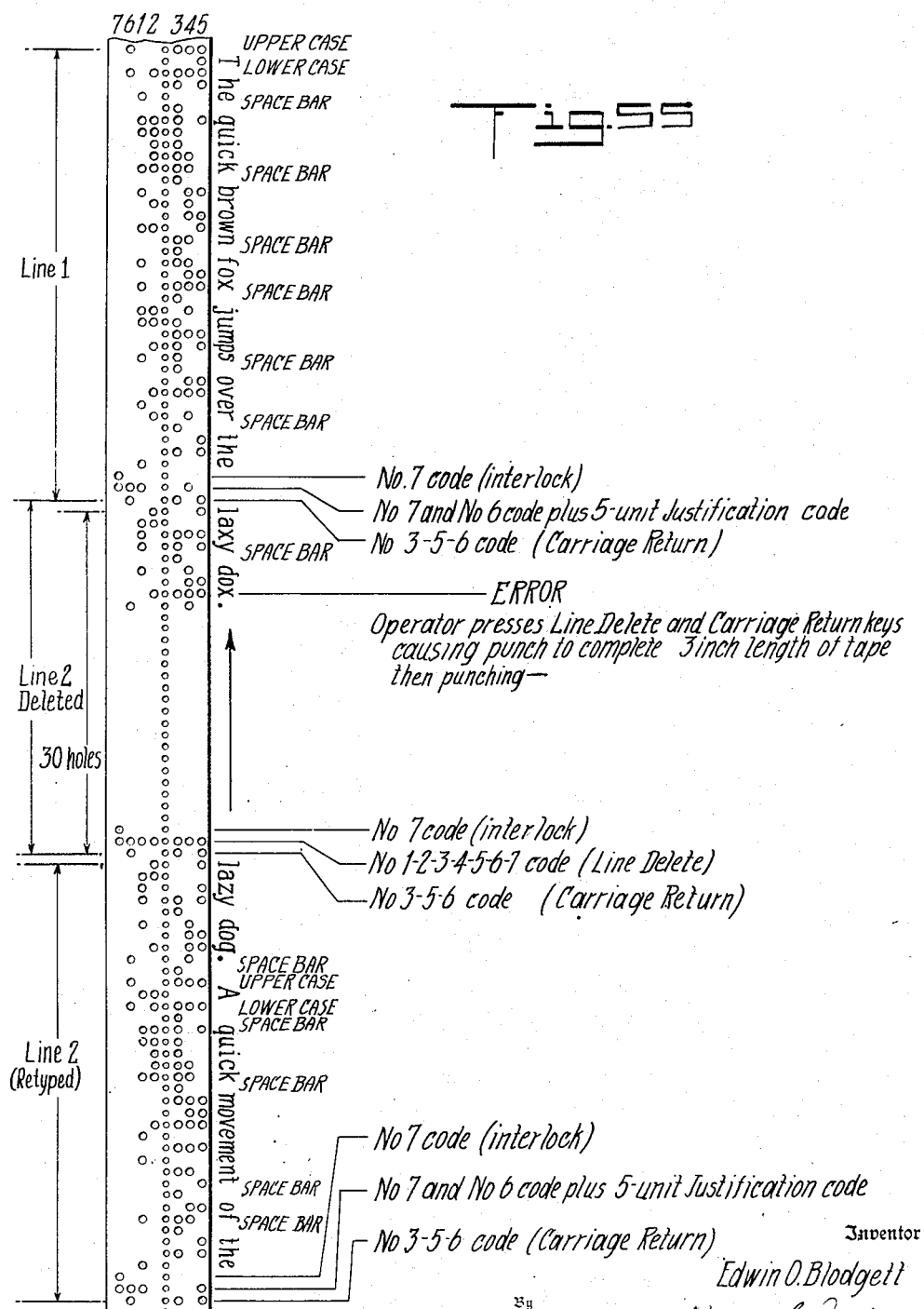

United States Patent Office 2,700,421
Patented Jan. 25, 1955

2,700,421

JUSTIFICATION CONTROL TAPE PUNCH

Edwin O. Blodgett, Rochester, N. Y., assignor to Commercial Controls Corporation, Rochester, N. Y., a corporation of Delaware Application October 13, 1950, Serial No. 189,979

11 Claims. (Cl. 164—113)

This invention relates to a writing machine controlled tape punch. More particularly, it relates to mechanism in which a justification control tape may be coded by perforating so that such control tape may then be used for the automatic reproduction of justified copy.

It is the principal object of the invention to provide a mechanism for the production of a control tape for use in the composition of justified lines wherein the spacing between words is either increased or decreased to achieve substantially complete justification. To this end it is the purpose of the invention that a justification control code be punched in a control tape which is the quotient of the unit shortage in a line divided by the number of word spaces in the line.

It is a further object of the invention to provide in the tape punch of a writing machine of the kind described a control code computing mechanism which automatically determines the proper number of units of word spaces to be inserted between words in the first part of the justified line and also automatically determines the point, if any, where such word spacing value is reduced to the next lesser number of units and the proper number of such lesser word space units, whereby substantially complete justification of a line may be secured.

It is a purpose of this invention to provide a machine for the production of a control tape for the composition of justified lines wherein either a line delete signal or a justification control signal is recorded at the trailing end of the line of character codes in the tape of the tape punch so that such recording may be used to reproduce each line in justified form or to omit the line according to the control signal recorded at the trailing end of the line.

It is a further object of the invention to provide a recorder including a tape punch wherein a single manual operation of a carriage return key automatically effects the sequence of operations of the recorder, including the punching of an interlocking code in the tape, the punching of a justification code in the tape, carriage return, and the incidental punching of a carriage return code in the tape.

It is a further object of the invention to provide in a recorder of the kind described a tape hole counter which insures that a minimum length of tape has been punched, thereby adapting the tape for use in a reproducer having a tape reader including two reading stations.

To the end that the general objectives of the invention may be attained, the mechanism herein comprises a power operated writing machine having code selecting means operative upon depression of a key lever to select a code representative of the character controlled by such lever, together with a tape punch controlled by the key control selector for producing in a tape combinational code perforations. The tape preparing mechanism is provided with means for computing the amount of unit spacing between words necessary to produce substantially justified lines and is adapted to cause the punching of a justification code in the tape at the trailing end of each justifiable line of character perforations upon actuation of a carriage return key. The justification control tape produced herein is designed for use in mechanism that includes means for sensing a tape perforated as stated and for translating such perforations to the end that power operated type action may be under the control of the perforated tape for transcribing the coded substance into justified printed form.

Specific objects, features and advantages of the invention will become clear as the description of the machine is read in light of the drawings in which:

Fig. 1 is an exterior perspective view of a trial copy recorder for preparing a perforated control tape;

Fig. 1a is an exterior perspective view of a justified copy reproducer adapted to be controlled by the perforated control tape produced in the recorder;

Fig. 1b is a perspective view, on a somewhat enlarged scale, of the trial copy recorder tape punch, the justified copy reproducer tape reader, and a section of control tape extending from the tape punch through the tape reader in such manner that character codes of a line of composition are in a leading position and the justification control codes for such line trail the character codes;

Fig. 2 is a horizontal sectional view through the trial copy recorder at a point just above the keyboard;

Fig. 3 is a vertical sectional view through the keyboard, the power roll, the type basket and part of the code selecting mechanism of the trial copy recorder;

Fig. 4 is a detailed view of toggle mechanism used in the recorder and the reproducer for shifting the type basket to lower case position;

Fig. 5 is a view similar to Fig. 4 and shows the toggle linkage in the released position assumed when the type basket is in upper case position;

Fig. 6 is a detail view of the toggle mechanism for shifting the type basket to upper case position;

Fig. 7 is a view similar to Fig. 6 but shows the toggle linkage in the released position which it assumes when the type basket is shifted to lower case position;

Fig. 8 is a fragmentary plan view showing a carriage rebound latch;

Fig. 8a is a fragmentary elevational view of the rebound latch shown in Fig. 8;

Fig. 11 is a detail view of platen indexing mechanism of the recorder and the reproducer;

Fig. 12 is a view taken on line 12—12 of Fig. 11;

Fig. 13 is an end elevational view of the carriage used in both the recorder and in the reproducer;

Fig. 19 is a rear elevation of tabulating and carriage release mechanism applicable to both the recorder and to the reproducer;

Fig. 20 is a rear elevation of a part of the carriage release and tabulating mechanism, certain parts having been removed to show underlying structure;

Fig. 21 is a sectional view on line 21—21 of Fig. 19;

Fig. 22 illustrates a carriage return control clutch and its associated operating mechanism;

Fig. 23 is a rear plan view of the tabulating mechanism showing the parts in one position of operation;

Fig. 24 is a rear plan view of the tabulating mechanism shown in Fig. 23 but showing the parts thereof in a different position of operation;

Fig. 25 is a vertical section transversely of a platen carriage and includes portions of the keyboard and power mechanism, including a tabulation key and its associated linkage, this mechanism being applicable to both the recorder and reproducer;

Fig. 26 shows a tabulating release lever latch and its associated operating linkage;

Fig. 27 is a plan view of the tabulating mechanism shown in Fig. 23;

Fig. 28 is a plan view of the tabulating mechanism shown in Fig. 24;

Fig. 29 is a top plan view of a code selector mechanism and associated code selecting contacts forming part of the trial copy recorder;

Fig. 30 is a longitudinal sectional view through the code selector mechanism of Fig. 29 showing one of the selector slides;

Fig. 31 is a view similar to that of Fig. 30 showing, however, a different selector slide;

Fig. 32 is an enlarged fragmentary sectional view through the selector mechanism and indicates its relation to code selecting contacts;

Fig. 33 is an axial sectional view through an electromagnetic clutch used in connection with the tape punch of the trial copy recorder, the same clutch structure also being employed in connection with the translating unit of the justified copy reproducer;

Fig. 34 is a transverse vertical section on line 34—34 of Fig. 33;

Fig. 35 is a longitudinal view in elevation through a tape punch forming part of the trial copy recorder, some portions being shown in section;

Fig. 37 is a detail view of the punch control mechanism;

Fig. 38 is a detail view of the tape feeding mechanism constituting part of the punch unit;

Fig. 39 is a detail view of certain of the punch mechanism;

Fig. 40 is an elevational view, parts being in section, of a hole counter used in connection with the tape punching operation of the trial copy recorder;

Fig. 40a is a plan view of the hole counter of Fig. 40;

Fig. 41 is a top plan view of the rear portion of the trial copy recorder with a portion of the cover plate broken away to show the justification code computer and the tape hole counter;

Fig. 43 is an end elevational view of a justification computer forming part of the trial copy recorder on line 43—43 of Fig. 41;

Fig. 44 is a perspective view of the right hand end portion of the justification computer;

Fig. 45 is a sectional view through the justification computing mechanism on line 45—45 of Fig. 41;

Fig. 46 is a sectional view through the justification computing mechanism on line 46—46 of Fig. 41;

Fig. 47 is a sectional view on line 47—47 of Fig. 41 and corresponds generally to Fig. 46 but shows the seeker bail in its elevated position;

Fig. 48 is a view generally similar to Fig. 45 but shows the seekers released for contact with the code bar;

Fig. 49 is a keyboard layout diagram of the trial copy recorder;

Fig. 50 is a diagram showing the manner in which line justification is computed;

Figure 51:
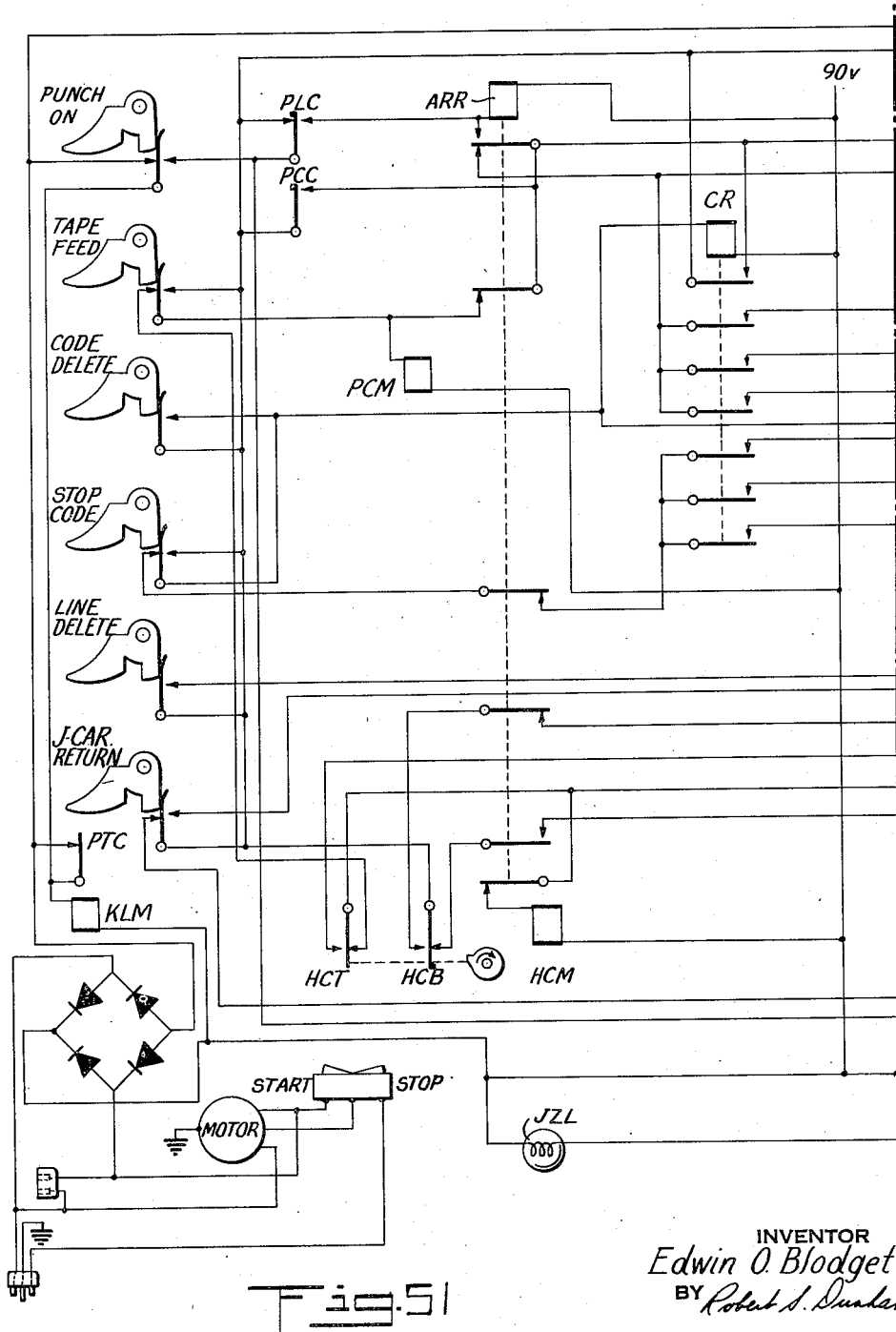
Figure 52:
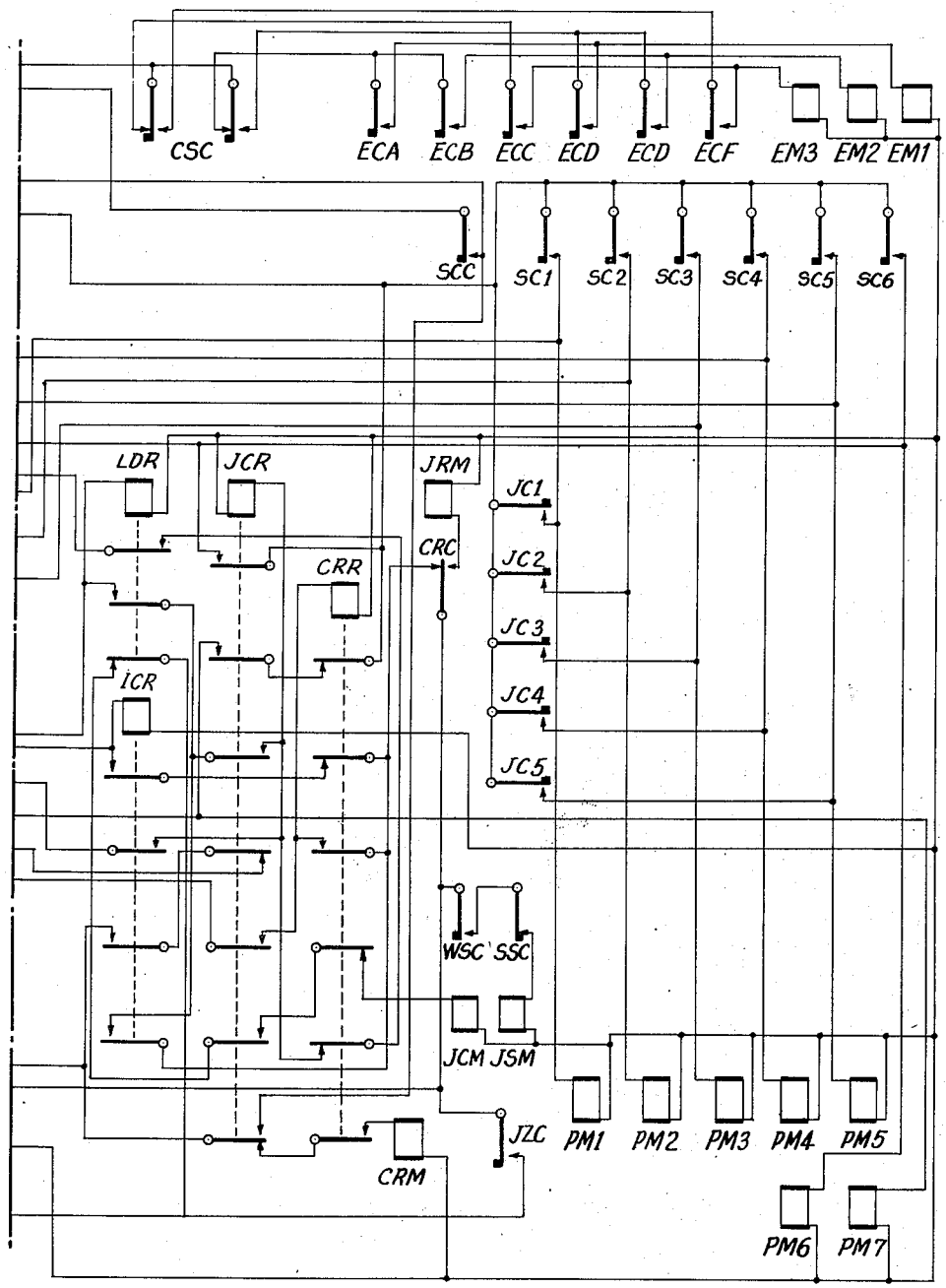

Figs. 51 and 52 together constitute the electrical control system for the trial copy recording unit;

Figs. 53 and 54 show sections of the control tape prepared in the trial copy recorder for use in the justified copy reproducer; and Fig. 55 is an exemplary section of control tape showing various control codes and character codes as produced in the trial copy machine, the arrow showing the direction of tape movement through both the tape punch and the tape readers.

In order to render a detailed description of the mechanism herein easier of understanding it is perhaps appropriate to first describe generally the structure and function of the mechanism.

General

The writing mechanism herein involves two machines, a trial copy recorder and a justified copy reproducer. This application concerns itself mainly with the trial copy recorder. Claim to the justified copy reproducer is made in my co-pending application Serial No. 277,747, filed March 21, 1952, which is a division of this application. The trial copy recorder is operated manually to print a trial copy in order to determine the normal length of lines. During this trial printing, a tape is punched, and, at the trailing end of each line, a justifying code is also punched in the tape which enables that line to be expanded or contracted to the desired length upon retyping. The justifying code comprises the 7 and 6 holes together with various combinations of the 1 through 5 hole group. This retyping is done automatically on the justified copy reproducer, and the justifying information in the tape automatically conditions apparatus to alter the extent of spacing between words as required for justification of each line.

Word spacing in both the recorder and in the reproducer is effected by differential wheel escapement mechanism that is used for proportional letter spacing. The normal extent of word spacing in making the trial copy is two units, and, in justifying, the extent of word spacing may be one, two, three, four or five units as required.

The expansion or contraction of lines is accomplished by selecting a unit value of word spacing which will be as uniform as possible throughout the line. However, inasmuch as the word spacing is not infinitely variable but must be in multiples of one unit spacing, it is impossible in every instance to make the word spacing exactly the same throughout a justified line as this would sometimes require spacing in fractional parts of a unit. Also, the number of word spaces in which justification is accomplished is limited to eight, so that in any unusually long lines having more than eight word spaces, the extent of spacing is always the normal two units after the eighth word space.

For example, if it is necessary for justification to expand the length of a line 21 units and the line has 12 word spaces, the first five word spaces will be five units each, the next three will be four units each and the last four will be two units each. All this is accomplished automatically by apparatus in the trial copy recorder which selects a particular justification control code to be punched in the tape, and later the apparatus in the justified copy reproducer is conditioned by this control code to automatically select the proper number of units of word spacing in the first part of the line and the point, if any, where this word spacing value changes to the next lesser number of units and then to select, automatically, the proper number of lesser word space units.

The trial copy recorder and justified copy reproducer are each assembled around a four-sided base 10 which supports a power frame assembly 12. In the case of the recorder (Fig. 1), there is provided a code selector 13, a tape punch 15, and a justification code computer (Figs. 42 through 48). In the case of the reproducer (Fig. 1a) there is provided a power frame assembly 12, a double tape reader 16 and a code translator 14. In each machine an electric motor 17 is adapted to drive a power shaft 19. Gears 22 and 23 furnish power to the tape punch 15 of the recorder. A chain 20 transmits power to a power roller 21 from which the type action is operated.

A die-cast power frame 39 is mounted within the base casting of each unit. Assembled on the power frame of both the recorder and reproducer are the key levers 27 and the power operated type actions comprising levers 34, 35, 45 and 46. Each key lever 27 is operable to control an associated power cam 31 with a minimum of effort. A normally energized magnetic lock 28 is provided for the keyboard in each machine to prevent effective operation of the keys when the power is off or when the keys should not be operated for any other reason.

Each key lever 27 controls a cam assembly 12 coacting with a continually running power roll 21. Each cam 31 furnishes the power for operating the type bar 36 through a bell crank arrangement consisting of levers 34, 35 and toggles 45–46. The cam in the case of the recorder also operates a slide of a code selector mechanism 13 when required. The extent of movement imparted to each type bar 36 by its associated cam 31 is variable by a turnbuckle adjusting arrangement 43 so that exactly the right printing impression may be obtained for each character.

In both the recorder and reproducer there is provided a selection between upper and lower case printing by shifting the type basket 52 as shown in Figs. 4 through 7 of the drawings. A key lever 67 and its associated cam are provided for shifting the basket to upper case position, and a separate key lever 73 and its associated cam are provided for shifting the basket to the lower case position. This provides positive fast automatic operation of the case shifting mechanism by the code translator of the reproducer as will be more specifically pointed out hereinafter. Two oppositely arranged toggle mechanisms consisting of levers 56, 58, 59 and 69 (Figs. 4 and 6) adjustably hold the basket in its two shifted positions, and the power from each of the shifting cams is applied to move the basket by breaking its associated toggle. This results in an easy, accelerated motion of the basket, which greatly reduces power roll wear and makes the shift operation so fast that in automatic operation the tape reader of the reproducer does not need to be delayed during case shifting movement.

Figure 14:
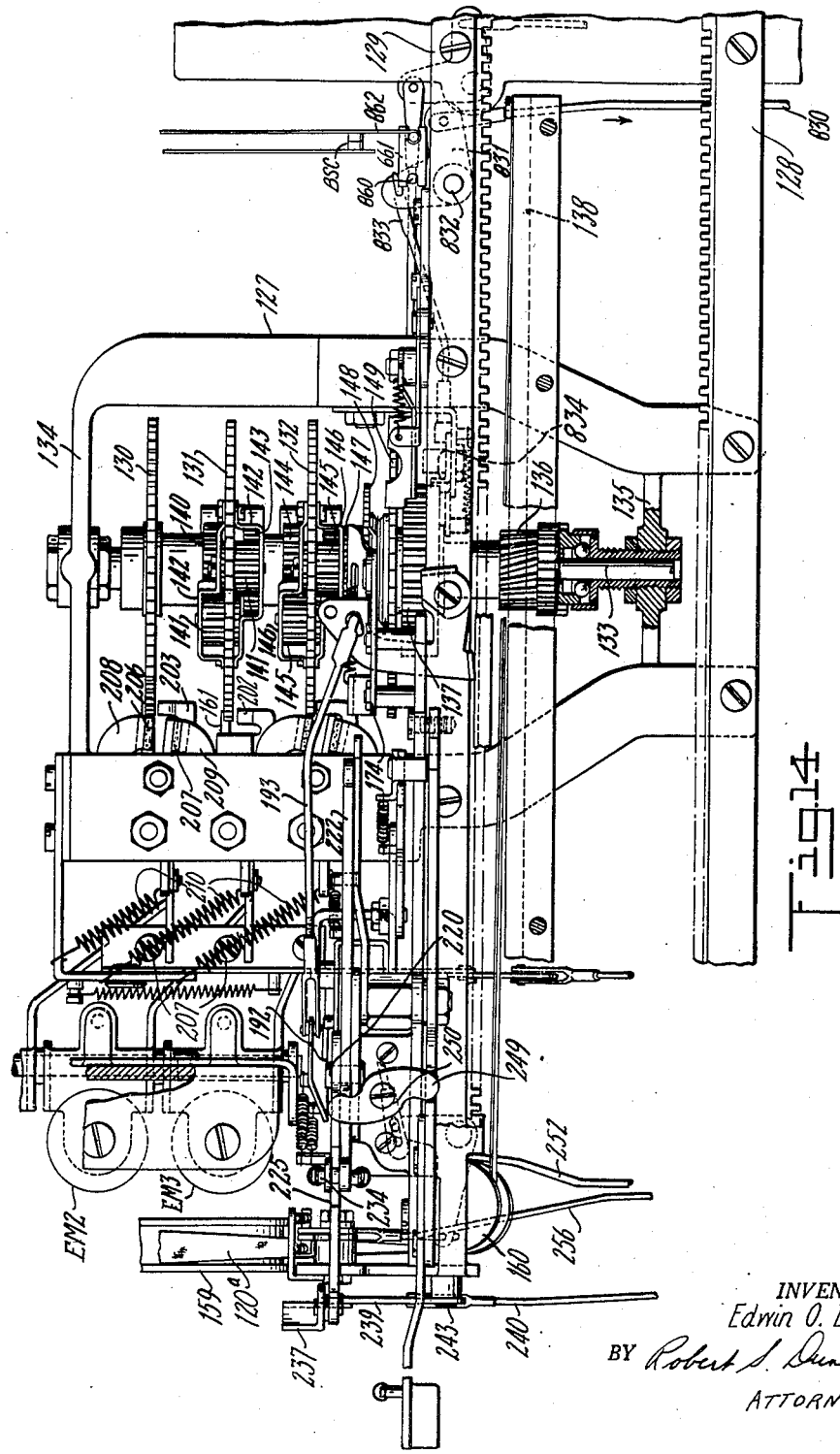
Fig. 14 is a plan view of the carriage escapement mechanism used in both the recorder and in the reproducer.

All letter spacing movements of the carriage in both the recorder and in the reproducer are controlled by letter spacing mechanism shown in Fig. 14 of the drawings. This includes a rotary ratchet wheel 136 which is operated by the segment universal bar 138. For producing proportional letter spacing, three differentially connected escapement wheels 130, 131 and 132 are used in combinations to provide from one to six units of space. The selection of the proper combination of operations of the three wheels is made for each character by three magnets EM1, EM2 and EM3 under control of the code selector 13 insofar as the recorder is concerned and under control of a letter space selector 13a insofar as the reproducer is concerned. Three contacts ECA, ECB and ECC on the selectors control the lower case spacing, and three other contacts ECD, ECE and ECF control the upper case letter spacing. Case shift contacts CSC (Fig. 4) operated by the type basket select which of the two groups of three contacts are effective to control the three magnets.

A carriage return control clutch (Fig. 22) operated by a toggle mechanism consisting of levers 201, 202, 210 and 211 returns the carriage and line spaces the platen. The toggle linkage for operating the clutch is straightened by a carriage return cam which is controlled by a key lever. At the end of the carriage return movement, a carriage margin stop engages and moves a stop lever 189 on the frame (Fig. 19) to trip a second cam which furnishes the power for disengaging the clutch by breaking the toggle.

The code selector unit 13 of the recorder comprises a rectangular frame (Fig. 29) which carries coded slides 261 and 262 which are operated by downward extensions 264 of the cam units 12. There is one slide for each of the cam units, the slides 261 for the front row of cams moving forwardly and the slides 262 for the rear row of cams moving rearwardly. The forwardly moving slides 261, are interspaced with the rearwardly moving slides 262, and a single return spring 272 between adjacent pairs of slides normally holds the slides against a common stop bar 269. Provision is made for pivotally mounting thirteen bails 274 transversely across the slides, there being seven bails in a lower row and six bails in an upper row (Figs. 30, 31 and 32). Each slide 261—262 may be provided with a cam portion 285 for operating each of the thirteen bails, but certain of these cam portions are removed in dotted lines in Fig. 30 so that only the bails involved in the code for each particular slide are operated by the moving of that slide; thus, all slides 261—262 are different, because of the removal of different combinations of the cam portions 285.

The bails 274 are connected to companion contact operating shafts 280 which carry actuators for operating associated contacts SC1 through SC6 and SCC mounted on a casting 282 (Fig. 29). Six of the lower row of bails SB1 through SB6 and their associated contacts SC1 through SC6 select a six unit code and control the punching of the selected code in a tape. The seventh bail SBC controls the contact SCC which is common to the code selecting contacts. The upper row of six bails 286a through 286f operate contacts ECA through ECF for selecting the unit spacing of the carriage for securing proportional letter spacing, as noted before. The bails 286a, 286b and 286c control the contacts for lower case printing while bails 286d, 286e and 286f control the contacts for upper case printing.

The rear portion of the code selector assembly 13 is pivotally mounted on a cross shaft 266a carried by the main frame 10, and the front end is held to the main frame by screws extending through lugs 266b. This permits the selector unit to swing away from the power roll about the shaft 266a, and, in doing so, the contacts mounted on the frame 282 are not disturbed. The selector unit 13 may be completely removed from the machine by removing the pivot shaft 266a.

The tape punch 15, which is part of the recorder, is driven from the power shaft 19, through gears 22 and 23 (see Figs. 36 and 60), and is removably mounted at the left hand rear portion of the main frame 10. A normally stationary rotary shaft 315 (Fig. 35) makes one revolution under control of a magnetically operated clutch for each punch cycle (Figs. 33 and 34). The tape to be punched is obtained from a supply spool 316 (see Fig. 2) removably mounted at the rear of the machine, and the tape passes over the top of the punch unit, and the holes are punched upwardly at the front of the unit for convenient manipulation and observation of the tape by the operator. The tape is fed for spacing of the holes by a pin wheel 331 during each punch cycle, but the pin wheel may be manually turned to move the tape in either direction.

The selector contacts SC1 through SC6 and SCC determine the code holes to be punched in the tape by energizing the associated ones of six code magnets PM1 through PM6, which, by attracting their armatures 351 release associated punch lever latches 342 (Fig. 37). The punch clutch magnet is jointly controlled by a contact operated by the release of any one or more of these latches, and by the common selector contact SCC. During the initial rotation of the punch shaft 315, the latches which were released are locked in their released position and the ones which were not released are locked in their normal position by means of a locking bail 360.

The punches CP1–CP7 (Fig. 37 and Fig. 36) are each operated upwardly through the paper tape by an associated punch lever 322 pivotally mounted between its ends on a shaft 323. The shaft 323 is positively raised and lowered during the punch cycle by identical cams 335 and 336 at each end of the shaft 323. The front end of each punch lever 322 is connected to its punch CP, and the rear end of each lever coacts with an associated latch 353. When the latch 353 is released, due to energization of its code magnet PM, the rear end of the punch lever is restrained from moving upwardly so that upward movement of the operating shaft 323 forces the punch through the paper. However, when a latch is not released because its code magnet PM was not energized, the rear end of the punch lever 322 is free to move upwardly, thereby allowing the front end of the lever and its punch to remain stationary while the operating shaft 323 moves upwardly. The cams 335 and 336 are arranged to quickly and positively withdraw the punches from the paper after a punching operation, and, during this part of the cycle, the latches 342 are mechanically restored to their normal position and the armatures are forcibly moved away from their code magnets. At the end of the punching cycle, a feed pawl 367 operated by a cam 363 (Fig. 38) operates a ratchet wheel 372 on the pin wheel shaft to feed the tape one space.

As a line is being written in the recording unit, a justification computing mechanism (Figs. 42 through 48) counts the word spaces and when the length of a line being written and coded into the control tape has reached a justifiable length a signal is given which indicates that the line may be justified. Depression of the J carriage return key automatically results in the final computation of the number of unit spaces required between each of the word spaces to achieve justification. This information is automatically punched into the tape as a justification control code.

The tape reader 16 which is part of the reproducer is mounted at the left hand side of the main frame 10. The tape reader includes two reading stations which are operated from a single, continuously operating cam shaft.

*Power frame and type action*

The trial copy recorder and the justified copy reproducer are each assembled around a sturdy four-sided base 10 formed by a right and left aluminum casting joined at the front by another aluminum casting and at the rear by an angular steel plate 11 extending over the top rear portions of the side castings to brace the entire assembly. A power frame assembly 12 is mounted between the two side castings. A carriage and rail assembly is mounted between the top rear portions of the two side castings, and a space at the rear of the carriage is provided for auxiliary apparatus.

A single, constant speed 1/20 H. P. motor 17 is mounted on the inner face of the rear frame plate 11, and this motor is connected by a V-belt 18 to the power shaft.

The power shaft 19 is connected by means of a chain drive 20 to a continuously rotating power roll 21 which is adapted to operate the type bars through a conventional cam arrangement as will be more fully pointed out.

The power frame 12 which is mounted within the base 10 has assembled thereon the key levers 27 and the power operated type actions. The key levers 27 are operable to control their associated power cams with a minimum of effort. The manner in which the operating cams are energized by the power roll 21 will appear more fully hereinafter. A normally energized magnetic lock KLM (Figs. 2, 2a and 70) adapted to rock a key lever locking bail 29 (see Fig. 3) is provided to prevent effective operation of the keys when the power for any reason is off, or when the keys should not be operated for any other reason.

Each key lever controls a cam assembly contacting with the constantly running power roll 21 whereby each lever control cam furnishes the power for operating a type bar through a bell crank.

The manner in which power is imparted to the operative mechanism of the machine will be only briefly described since the arrangement is generally shown in the International electric writing machine formerly known as the "Electromatic." It is in connection with electric writing machines of this type that the invention has been disclosed. However, it will be understood that the invention is not limited in application to the specific machine selected for purpose of illustration, but may be applied to other power operated writing machines.

As shown in Fig. 3 of the drawings the key levers 27 are pivoted on a rod 30 which is supported by a cross member of the power frame assembly. The power roller 21 is mounted under the power frame assembly for rotation in the direction of the arrow (Fig. 3) by means of the drive connections to the motor previously described.

Cooperating with the power roll 21 are cam units 31 which are pivotally mounted on rods 32 extending parallel with the power roller 21. There is a cam unit 31 associated with each key lever 27 and each cam unit in control of a type bar is connected by a link 33 with a bell crank 34 pivoted on rod 30. The bell cranks 34 are connected by links 35 to the type bars 36 through the medium of toggles 37. The type bars 36 are pivoted on the usual wire segment 38 provided on a type bar segment 39 located in front of the conventional platen. The platen, as will appear hereinafter, is rotatably mounted in a carriage which is supported on front and rear rails by means of suitable anti-friction roller trucks.

When any character key 40 is depressed, its cam unit 31 is caused to operably engage the power roller 21 in a well known way, thereby rocking the cam unit 31 clockwise or counterclockwise, according to whether the operative cam unit is pivoted on the left or on the right hand rod 32, respectively. The rocking of the cam unit causes its link 33 to be drawn downwardly, thereby rocking the corresponding bell crank 34. This movement of the bell crank 34, through the corresponding link 35 and toggle 37, causes type bar 36 associated with the selected key to rock in a printing stroke and to make an impression of the type upon a work sheet carried about the platen. The type bar, near the end of its operative stroke, engages the usual universal bar 41 and causes the same to rock.

It may be pointed out that the operating linkage for the type bars 36 which has just been described includes several novel features which render the linkage system adjustable to secure an optimum and a uniform impression of the type. In Fig. 3 of the drawings, it will be noted that the downwardly depending link 42 is connected to its cam assembly 31 at the forward or keyboard side of the power roll by means of a turnbuckle 43, which is pivoted at one end to the link 42 and which is adjustably threaded at its other end into a socket 44 in the horizontal leg of the cam unit frame. The links depending downwardly from the bell crank 34 are composed of two sections which are screwed into each other, thereby providing an adjustment by means of which the associated cams may be accurately spaced with respect to the power roll. It will appear, therefore, that the leverage asserted through the link and the cam unit may be adjusted through the turnbuckle 43. It may also be pointed out that the toggle 37 consisting of arms 45 and 46 is so arranged as to effectively inhibit rebound action of the type bars 36. One end of the arm 45 of the toggle is mounted on a fixed pivot rod 47, while the other end is pivoted to the arm 46 by means of a pivot pin 48. The operative connection of the arm 46 of the toggle to the type bar 36 is at a pivot pin 49. The operation of the toggle mechanism is stabilized by a spring 50 which is attached to the toggle arm 46 at one of its ends and to a fixed frame member at its other end. It will be observed that when the toggle linkage 45—46 is in its extended position the points 47, 48 and 49 are in a substantially straight line so that upon return of the key lever 27 to its position of rest, as shown in Fig. 3 of the drawings, the toggle linkage will in effect constitute a lock against the rebound action of the type bar 36. A fine adjustment of the toggle linkage may be obtained by either slightly shortening the arm 45 or by lengthening it. Such alteration of the arm 45 is easily achieved by either springing apart, or closing a pair of ears 51 which constitute the legs of a generally U-shaped portion of the arm 45.

Case shift mechanism

The type basket 52 of both recorder and reproducer, see Figs. 4, 5, 6 and 7, is mounted for selective shifting between upper and lower case printing position by mounting the same on two sets of parallel leaf springs in the well known manner. For the purpose of shifting the type basket, there has been provided herein improved power operated mechanism. A key lever and cam assembly is provided for shifting the basket to one position, and a separate key lever and cam assembly is provided for shifting it to the other position. This provides positive, fast, automatic operation of the type basket shift for selectively printing upper or lower case characters under the control of the code translator mechanism 14. Two oppositely disposed toggle mechanisms adjustably hold the basket in its two shifted positions, and the power from each basket shift cam unit is applied to move the basket by breaking its associated toggle. This imparts an easy, accelerated motion to the basket. Specifically, the manner in which the type basket is shifted from one position to another will be seen by reference to Figs. 4–7, wherein Figs. 4 and 5 illustrate the shifting mechanism at the left side of the type basket and Figs. 6 and 7 illustrate the shifting mechanism at the right side of the basket. Furthermore, Figs. 4 and 7 show the position of the shifting mechanism at the left and right side of the basket, respectively, when the basket has been moved upwardly for printing lower case characters, while Figs. 5 and 6 show the position of the mechanism at the left and right side, respectively, when the basket has been moved downwardly for printing of upper case characters. A lower case key LC1 is disposed at the right hand side of the keyboard, and depression of this key will operate a cam assembly as will be pointed out hereinafter. The key LC1 is connected by means of a transverse bail 53 (Fig. 3) with a lower case shift key LC2 disposed at the left hand side of the keyboard. An upper case shift key UC1 is disposed at the left hand side of the keyboard and depression of this key will operate an associated cam assembly, as will be pointed out hereinafter. The upper case shift key UC1 is attached to an upper case shift key UC2 which is disposed at the right hand side of the keyboard by means of a transverse bail 54. It will appear, therefore, that depression of either of the case shift keys LC1 or LC2 on the one hand or UC1 or UC2 on the other hand will effect a shifting movement of the type basket.

Fig. 4 of the drawings shows the type basket 52 in its upper position in which lower case characters are printed. To the rear face of a side frame member of the basket 52 is attached a bracket by means of a pair of screws, and to the bracket 55 are pivoted three toggle levers 56, 58 and 59. One end of the toggle lever 56 is pivoted on a shaft 60 while the other end is pivoted to the lever 59 at an intermediate point thereof by means of a pivot pin 61. The free end of the lever 59 has a stud 62 extending from a face thereof to which is attached a spring 63 which is anchored at its other end to a fixed frame member. The other end of the lever 59 is pivoted to the bracket 55 by means of a pivot pin 59a. The lever 58 of the toggle system has one end thereof pivoted on a pivot pin 64 carried by the bracket 55. The opposite end of the arm 58 is pivoted to a short lever 65 by means of a pivot pin 66, the short lever 65 being secured to a rock shaft 67.

The toggle system as it is disposed in Fig. 4 when the three magnets EM1, EM2 and EM3. Spacing between words and the like is controlled by dummy or non-printing type actions so that the same timing is retained as in printing.

The carriage escapement mechanism is designed to letter space in proportion to the width of the respective characters employed, and this mechanism is mounted in a frame casting 127 which is secured to the undersides of the front and rear rails 128, 129 (Fig. 14). The frame 127 supports three wheels which are designated 130, 131 and 132. A rod 133 on which the wheels 130, 131 and 132 are rotatably mounted is supported in parallel spaced frame members 134 and 135. A pinion 136 which is attached to a pinion 137 meshes constantly with a spiral rack 138 which is secured to the underside of the carriage 118.

Figure 18:
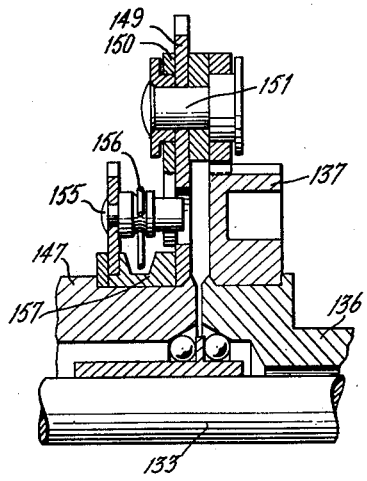
Fig. 18 is a sectional view on line 18—18 of Fig. 17.

The rear end of the pinion 136 is formed as a ball race (see Fig. 18) in cooperation with balls 139 whereby the pinion 136 and ratchet 137 rotate on the rod 133. The latter is relatively fixed in the frame members 134 and 135.

The hub of wheel 130 is integral with a pinion 140 located adjacent the hub of the wheel 131. The pinion 140 meshes with one of a pair of intermeshing sun pinions 141 rotatably mounted on brackets 142 carried by the wheel 131 while the other pinion 141 meshes with a pinion 143 which is secured to a pinion 144. The pinion 144 meshes with one of a similar pair of intermeshing sun pinions 145 mounted on brackets 146 carried by wheel 132, while the other pinion 145 meshes with a pinion 147.

Figure 17:
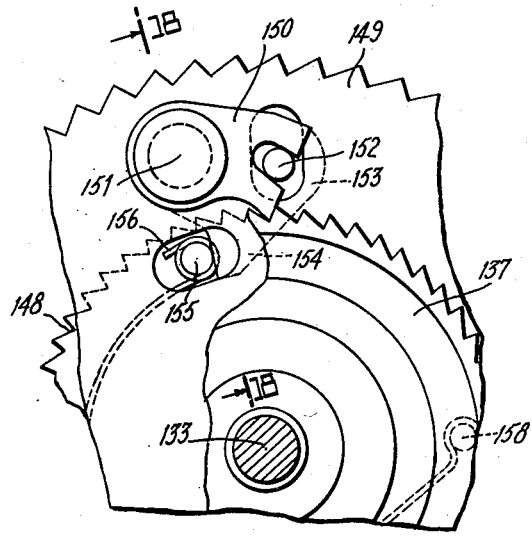
Fig. 17 is a large scale detail view of part of the carriage release mechanism.

Rotatably mounted on the pinion 147 is a ratchet wheel 148 which is of the same diameter as the ratchet 137 while secured to the pinion 147 is a ratchet 149 which is considerably larger in diameter than the ratchets 137 and 148. The ratchets 137 and 149 are normally connected for driving purposes by means best shown in Figs. 17 and 18 comprising a dog 150 pivoted on a stud 151 fixedly mounted on the ratchet wheel 149. The dog 150 normally engages the teeth of the ratchet wheel 137 whereby the ratchet wheel 149 will be rotated in a counterclockwise direction (Fig. 17) whenever the ratchet wheel 137 is similarly rotated by movement of the carriage. The dog 150 is slotted to embrace a stud 152 carried by a member 153 also pivotally mounted on the stud 151. The member 153 has a lug 154 engaging a stud 155 secured to the side of ratchet wheel 148. A torsion spring 156, hooked over the end of stud 155 and lying in a groove formed in a collar 157 on the pinion 147 and also anchored to a stud 158 (Fig. 17) on ratchet 149, normally tends to rotate the ratchet 148 in a counterclockwise direction (Fig. 17).

Movement of the carriage is effected, as usual in typewriting machines, by means of a spring drum 159 partly shown in Fig. 2 on which drum is wound a tape 120a passing over a pulley 160 mounted on the rear rail 129 and thence to the right hand end of the rack 138 at which point the tape 120a is secured. Due to the constant tension produced in the tape 120 by the spring drum 159, the carriage 126 tends to move to the left. Thus the ratchet 137 tends to rotate the ratchet 149 and pinion 147 in a counterclockwise direction (Fig. 17). This rotational tendency of the pinion 147 is communicated to the wheels 130, 131 and 132 (Fig. 14) through the train of connections comprising the pinions 140, 141, 143, 144 and 145. Normally, however, this rotational tendency has no effect so far as movement of the carriage is concerned because the ratchet wheels 130, 131 and 132 are restrained from rotation by means of the loose dogs 161 (Fig. 16) of the escapement mechanism.

Reverse rotation of the ratchet 149 and pinion 147 is prevented by means of a dog 162 (Fig. 19) pivoted on a stud 163 carried by a plate 164 which is adjustably secured to the rear rail 129. Also pivoted on stud 163 is a bracket 165 having a bumper 166 composed of resilient material such as leather against which the dog 162 is normally held by a spring 167. The bracket 165 is adjustably rotated on the stud 163 until the free end of said dog 162 engages one wall of a tooth in the ratchet 149 but does not quite touch the other wall of the adjacent tooth, the object being to silence the clicking noise which ordinarily is experienced with similar ratchet-and-pawl mechanisms due to the end of the dog striking the side of the next succeeding tooth after riding over a given tooth.

Figure 15:
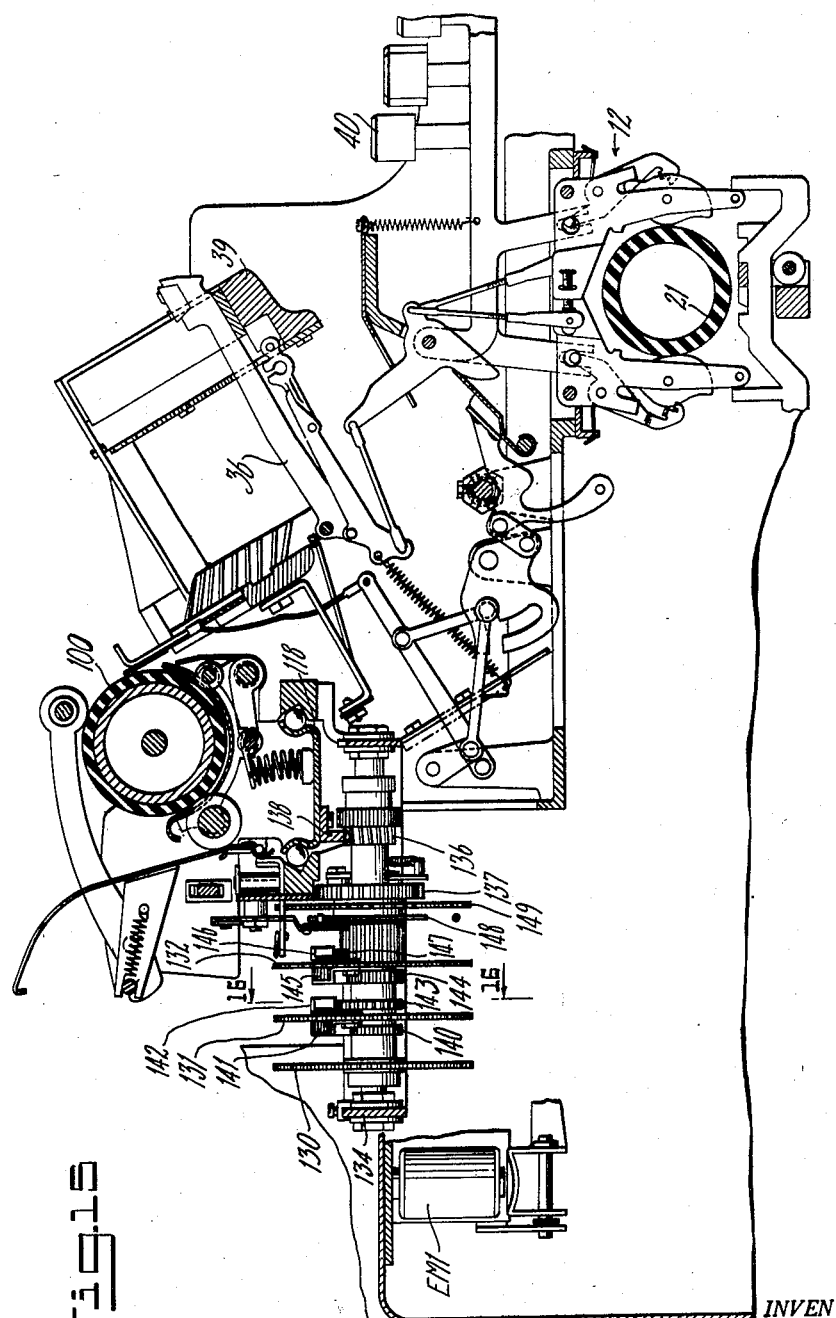
Fig. 15 is a vertical sectional view through the power roll, the type basket, the carriage and the escapement mechanism.

The ratchet wheels 130, 131 and 132 have 54, 54 and 36 teeth, respectively, whereby the amount of feeding movement imparted to the carriage may be varied. Due to the method of interconnecting the ratchet wheels by means of intermeshing pinions, the ratchet wheels 130 and 132 rotate in a direction opposite to the ratchet 131. Assuming for the moment that the ratchet wheels 130 and 131 (Figs. 14 and 15) are fixed against rotation, the pinion 144 will be locked against rotation. Therefore, if ratchet wheel 132 is now permitted to rotate one tooth space, one of the pinions 145 will roll around said pinion 144 and by rotating the companion pinion 144 will permit the pinion 147 to rotate in the same direction as the ratchet wheel 132 but twice as much as ratchet wheel 132. Similarly, if the ratchet wheels 130 and 132 are locked against rotation and the ratchet wheel 131 is permitted to move, one of the pinions 141 will roll around the pinion 140 and cause pinions 143 and 144 to be rotated. The rotation of pinion 144 is communicated to pinion 147 through the intermeshing pinions 145. As in the case of ratchet wheel 140, pinion 147 rotates twice as much as ratchet wheel 131. However, when the ratchet wheels 131 and 132 are held against rotation and ratchet wheel 130 rotates, the same amount of movement will be communicated from the ratchet wheel 130 to the pinion 147 through the pinions 141, 143, 144 and 145 acting as idlers. It is possible, however, to permit the ratchet wheels 130, 131 and 132 to rotate in combinations to produce an accumulative effect upon the pinion 136 which, of course, will permit the carriage to move correspondingly.

Since the ratchet wheel 130 has fifty-four teeth, the pinion 147 and hence the pinion 136 will be rotated $\frac{1}{54}$ of a revolution whenever the ratchet wheel 130 rotates one tooth space. Moreover, since the movement of the pinion 147 is twice that of the ratchet wheel 131 and the latter has fifty-four teeth, the pinions 147 and 136 will be rotated the equivalent of $\frac{1}{27}$ of a revolution of the ratchet wheel 131. Likewise, the ratchet wheel 132 having thirty-six teeth, pinions 147 and 136 will be rotated $\frac{1}{36}$ of a revolution of the ratchet wheel 132. It will be seen, therefore, that the movements of pinions 147 and 136 produced by the ratchet wheels 130, 131 and 132 are so designed and the spacing of the teeth on their ratchet wheels has been so selected that ratchet wheel 130 causes the carriage to move one unit of spacing, ratchet wheel 131 two units of spacing and ratchet wheel 132 three units of spacing.

It is thus possible to secure six different spacings of the carriage which, in terms of units of carriage spacing, are as follows: 1, 2, 3, 4, 5 and 6. Thus the spacing of the carriage can be accommodated to the different widths of letters employed. The means by which the wheels 130, 131 and 132 are selectively controlled will be described in the following paragraphs.

Figure 16:
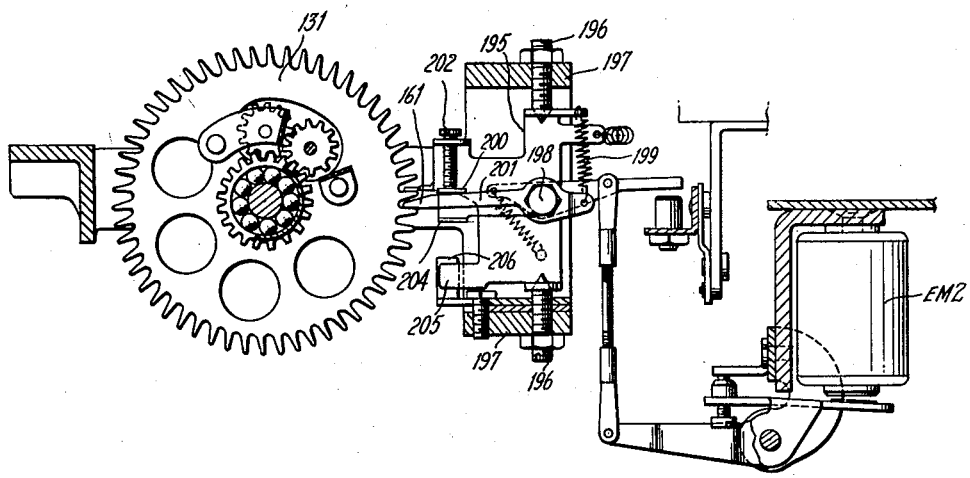
Fig. 16 is a vertical sectional view taken on line 16—16 of Fig. 15.

The rotation of the escapement ratchet wheels 130, 131 and 132 is controlled by means of three dog rocker mechanisms which are selectively controlled by magnets EM1, EM2, and EM3, respectively. Fig. 16 shows the dog rocker mechanism for the ratchet wheel 131. Each dog rocker mechanism includes a dog rocker plate 195 which is pivotally mounted on vertically aligned conical studs 196 screwed into threaded holes in two parallel and horizontal portions 197 of the frame 127. The conical points of the studs are seated in conical holes in lugs formed in the dog rocker plate 195. Pivoted on a stud 198 carried by the rocker plate 195 is the usual loose escapement dog 161 mentioned hereinbefore which is actuated by a spring 199 so as to be urged in a counterclockwise direction (Fig. 16). The left hand end of the dog 161 engaging one of the teeth of the ratchet 131, however, is held in the position of Fig. 16 owing to the tension of the spring drum 159 (Fig. 14) being greater than the tension of the spring 199 (Fig. 16) whereby the dog 161 is forced against a stop 200 mounted on an arm 201 which is rotatably secured to the side of the rocker plate 195 by means of the stud 198. The upper left hand portion of the arm 201 is provided with a bent-over lug against which bears an adjusting screw 202 carried by a lug formed in the rocker plate 195. By turning the screw 202 in one direction or another, the arm 201 may be rotatably adjusted about the stud 198 as a pivot. The dog rocker plate 195 is provided with a lug 203 which is substantially in horizontal alignment with the left end of the dog 161 but does not normally engage the teeth of the ratchet wheel 131.

When the rocker plate 195 is rocked in a counter-type basket is elevated to its lower case position has the pivot points 59a, 60 and 61 of the toggle system in substantial alignment and the spring 63 under substantial tension, and is effective to exert considerable turning force on finger 70 which holds the toggle arms 59 and 56 in their straightened relation, as shown in Fig. 4, wherein lever 56 engages the finger 70 of the release lever 69 which is in turn stopped by extension 71 and stop 72. This positively holds the basket in its upper position. The arrangement at the other side of the basket has a like function.

In order to release the basket 52 to its lower position for the printing of upper case characters it is merely necessary to depress either key UC1 or UC2 to rock the key lever 67 about the rod 30, whereby its associated cam assembly is brought into contact with the power roll 21 and a connecting link 68 is thereby drawn downwardly. A toggle release lever 69 is pivoted for rocking movement about the rock shaft 60 and the upper free end of the release lever 69 has an inturned finger 70 which abuts the edge of the lever 56 to rock the same in a clockwise direction to break the toggle linkage into the position shown in Fig. 5 of the drawings. The release lever 69 has an extension 71 which is adapted to contact a stop member 72 when the release lever and its associated cam assembly are in normal or non-operated position.

As viewed in Fig. 5 of the drawings the case shift toggle linkage is in its released position wherein the force of the spring 63 is directed along a line from its point of anchorage 62 through the pivot point 59a of the lever 59. In this position the effect of the spring is substantially neutralized.

When the type basket is in its upper case position the operating toggle at the right hand side of the basket is as shown in Fig. 6 of the drawings, while its position at that side of the basket for lower case printing is shown in Fig. 7 of the drawings. The toggle linkage at the right side of the basket which controls the shifting of the basket into the lower case position is in all respects similar to the shifting mechanism at the left hand side of the basket with the exception that the position of the lever 59 is reversed. That is to say, the pivot point 59a is disposed at the bottom edge of the bracket 55 while the free end of the lever 59 extends upwardly when the toggle system is in its extended or operative position. If, therefore, the basket is in its upper case position and it is desired to shift the same to lower case position, it is merely necessary to depress the lower case shift key LC1 and its associated key lever 73 to rock the lever downwardly about the rod 30. This will effectively release its cam assembly for contact with the power roll 21 with the result that the link 68 is moved downwardly and the release lever 69 will be rocked into contact with the toggle lever 56 so that the toggle system will be broken into the position shown in Fig. 7 of the drawings where the force of the spring 63 extends substantially from its point of connection 62 with the lever 59 through the pivot point 59a whereby its effect on the toggle linkage is substantially nullified.

The type basket 52 has lugs 74 extending forwardly from each side thereof, and these lugs carry stop screws 75 on which stop nuts 76 are threaded. The stop nut 76 at the left side of the basket is adapted in its upper case position to contact the face of a stop bar 77 fixed to and extending forwardly from a portion of the power frame. The stop nut 76 at the right hand side of the basket is adapted in its lower case position to contact the lower face of the stop bar 77 at the right hand side of the basket. The movement of the type basket 52 may, therefore, be accurately limited by adjusting the stop nuts 76, the one at the left hand side of the basket for limiting downward movement of the basket and the one at the right hand side of the basket for limiting upward movement of the basket.

When one set of toggles is operated to shift the basket a slight compression force is exerted on the stop members 75–76 (Fig. 7) at the opposite side of the basket. Thus, the force applied at one side of the machine is resisted to some extent at the other side. This is effective to take up all the play that may be in pivots 64, 66 and in the bearings of rock shaft 67.

The importance of the foregoing case shift control lies in the fact that the toggle linkage system is broken by power roll energy, whereby a mechanical advantage is realized and wear on the power roll is minimized. Furthermore, the movement of the type basket is rapid and positive under the influence of the breaking of the toggle linkage and the spring 63.

Platen indexing

The platen of both the recorder and the reproducer is indexed about its longitudinal axis for the purpose of feeding the copy paper through the type impression zone by conventional mechanism which need, therefore, be only briefly described. In Figs. 11 and 12 is illustrated the mechanism by which the platen is indexed. The platen 100 is rotatably mounted on its axis 101 and has attached to one end thereof a ratchet wheel 102 which is adapted to be engaged by a feed pawl 103 for rotating the platen. The feed pawl 103 is pivoted on a pin 104, the pin 104 being carried by a sliding supporting member. The supporting member 105 has a pair of spaced slots 106 and 107 which embrace fixed guide studs 108 and 109, respectively. A finger 110 pivoted on the carriage frame at 111 has its free end resting on the top edge of the feed pawl 103. The upper edge of the finger 110 has a series of notches 1, 2 and 3 representing line spaces, and when the operating lever 113 which is mounted on the pivot pin 108 is moved into one of the line space notches 1, 2 or 3, the free end of the finger 110 bears on the top of the feed pawl 103 and alters the relation of the feed pawl 103 in respect to the ratchet wheel 102 by moving the supporting member 105 upward or downward so as to cause the feed pawl 103 to engage either every tooth, every second tooth or every third tooth of the ratchet wheel 102 in accordance with the setting of the hand lever 113.

The lower end of the support 105 has a laterally extending lug 114 which engages in the slotted free end of an operating lever 115. The operating lever 115 is pivoted on a fixed pivot stud 116 and is normally held in its raised position by means of a spring 117 which is wound about the pivot stud 116 and has one end thereof anchored to the carriage 118 and the other end to stud 119 extending from one face of the operating lever 115.

The platen indexing mechanism thus far described is operated through an indexing movement when the carriage is returned under the force of a carriage return tape 120. The end of the carriage return tape is attached to a downwardly projecting T-shaped lever 121 which is pivoted on a pivot stud 122. The studs 116 and 122 are carried by a fixed, upstanding bracket 123 secured to the carriage 118. One arm of the T-shaped lever 121 has a bifurcation 124 in which is received a pin 125 extending laterally from a face of the lever 115.

It will appear from the foregoing, therefore, that when the carriage is returned under the influence of the carriage return tape 120, the T-shaped lever 121 will be rocked in a counterclockwise direction about its fixed pivot 122 with the result that the bifurcated end 124 of the lever will move downwardly, and as a consequence of the connection between the bifurcation of the lever and the pin 125, the lever 115 will also be rocked downwardly thereby drawing the supporting member 105 downwardly to the point where the slots 106 and 107 will engage with their upper extremities with the pins 108 and 109, respectively. Thereupon, in accordance with the setting of the control lever 113, the platen will be indexed 1, 2 or 3 line positions as the carriage is being returned.

Variable letter spacing

It is contemplated that both the recorder and the reproducer be equipped with a standard carriage 126 (Fig. 13) and that all of the spacing movements of the carriage be controlled by a rotary wheel escapement mechanism operated by the segment universal bar 41 (Fig. 3). Herein is disclosed proportional spacing mechanism wherein three differentially connected escapement wheels are used in combinations to provide from one to six units of spacing. The selection of the proper combination of operations of the three wheels is made for each character by three magnets EM1, EM2 and EM3 (Fig. 2), under the control of the code selector 13. Three contacts on the code selector control the lower case spacing and three other contacts on the code selector control the upper case spacing as will be pointed out hereinafter. Case shift contacts CSC operated when the type basket is raised and lowered select which of the two groups of the three code selector contacts are to be effective to control the clockwise direction (Fig. 14), the lug 203 is moved into the tooth space occupied by the dog 161 before said dog is moved free of the ratchet wheel whereby when the dog ultimately clears teeth in the ratchet 131, the ratchet wheel is permitted to rotate counterclockwise a fraction of a tooth space in Fig. 16. The spring 199 then rocks the dog 161 in a counterclockwise direction until said dog strikes a resilient stop 204 mounted on the arm 201. The stops 203 and 204 on arm 201 are so spaced that the end of dog 161 assumes a position in horizontal alignment with the next lower tooth space of ratchet wheel 131.

When the plate 195 is restored to the position of Fig. 14, the end of dog 161 is moved into the path of the next lower tooth on ratchet wheel 131 before the lug 203 clears the teeth in ratchet 131. When the lug 203 finally clears the teeth in ratchet 131, the ratchet wheel 131 will be permitted to rotate in a counterclockwise direction (Fig. 16) the remainder of a tooth space, thereby bringing the end of dog 161 back against the resilient stop 203. Thus, by giving the plate 195 one complete oscillation the escapement ratchet 131 is permitted to turn one full tooth space.

The rocker plate 195 (Fig. 16) is formed with a lug 205 which extends between two resilient stops 206 and 207 (Fig. 14) mounted on adjustable arms 208 and 209, respectively, which arms are pivoted in scissors fashion on one of the conical studs 196. The stops 206 and 207 being located on opposite sides of the lug 205, adjustably limit the oscillatory movements of the plate 195 on the studs 196 as pivots.

Similar mechanism is provided for the other two ratchet wheels 130 and 132 but, owing to the fact that these two ratchet wheels rotate in a direction opposite to the ratchet wheel 131, the rocker plates 195 for the ratchet wheels 130 and 132 are in effect inverted. Normally, the plates 195 are held by torsion springs 210 with their lugs 205 abutting the stops 207, as shown in Fig. 14, with all of the dogs 161 engaging the teeth of their respective ratchets.

The rocker plates 195 are selectively and combinationally operated through power mechanism controlled by the keys 40 and the code selector mechanism 13 which will be described at a later point in this specification.

*Manual carriage release*

It is desirable to be able to release the escapement mechanism from the carriage for the purpose of moving the carriage by hand, or when the carriage is to be returned by the usual power operated carriage return mechanism. For this purpose, there is provided release mechanism which is operated by the usual carriage release levers 168 one of which is shown in Fig. 13, these levers being pivoted on studs 169 on the side plates of the carriage with the free end of levers 168 adjacent the usual platen rotating knobs 170. Each lever 168 abuts one end of a bail 171 pivotally mounted in the side plates of the carriage. When either of the levers 168 is depressed, the bail 171 is rocked clockwise in Fig. 13 thereby causing the bail to move rearwardly of the platen. A lug 172 formed in a lever 173 (Fig. 19), pivoted on the top surface of the rear rail 129, is thereby moved rearwardly of the platen whenever the bail 171 is moved by the release levers 168.

Mounted on a bracket 174 (Fig. 19) is a lever 175 pivoted on a stud 176 carried by the bracket 174. A release dog 177 is pivoted to the lower end of the lever 175 by means of a stud 178. A spring 179, anchored to one end of the dog 177 and to a leg 180 of the bracket 174 normally holds a pin 181 in the outer end of said dog against a stop notch 182 formed in the leg 180. Whenever the lever 173 is moved forwardly in Fig. 19 by the bail 171 as a consequence of the operation of one of the release levers 168, the dog 177 is moved to the left in Fig. 19. By a clockwise pivotal movement of lever 175 on the stud 176 and a resulting movement of the dog 177, the ratchet 148 is moved in a counterclockwise direction relative to the ratchet 149 (Fig. 19).

Through the cooperation of the pin 155 on ratchet 148 with the lug on lever 153, and the cooperation of pin 152 with the slot in the dog 150, the latter is lifted out of engagement with the teeth of ratchet 137, thereby permitting said ratchet to be moved independently of the ratchet 149. Thus the carriage may be moved by hand or by the power operated return mechanism without disturbing the escapement mechanism and without the escapement mechanism interfering with the movement of the carriage.

*Carriage return*

The dog 177 is operated automatically whenever the usual power operated return mechanism operates to return the carriage prior to writing a new line. In the "International" electric writing machine, the carriage is returned by power mechanism very similar to the one described in Patent No. 1,753,450 under control of a carriage return key. This mechanism is not shown in any great detail in the present case, because it is not directly involved in the operation of the invention claimed hereinafter. It will suffice to say that when the carriage return key is depressed, a cam unit controlled thereby is operative to straighten the toggle which engages the carriage return clutch (Fig. 22) and, through a chain of connections including a link 183 (Fig. 19), a bell crank 184, and a link 185, rocks a three-armed lever 186 pivoted at 187 to a plate 188 secured to the rear rail 129.

The three-armed lever 186 controls the release of the carriage return clutch and, when operated as described, moves one arm of said lever 189 into the path of the left hand marginal stop 190 carried by the usual marginal stop rack 191 mounted on the carriage. Through the arm 192 and a link 193, which interconnects said arm 192 with the lever 173, the dog 177 is operated to disengage the dog 150 from the ratchet 137. During a carriage return operation, the ratchet 137 rotates in a clockwise direction (Fig. 18) whereby, if the dog 150 were not released a clicking noise would result which is undesirable as it renders the operation of the machine noisy.

When the carriage approaches its left hand marginal position, the left hand marginal stop 190 strikes a cam surface 194 in the arm 189 and rocks said lever 189 in a counterclockwise direction whereby a linkage system and an associated cam is operated to disengage the carriage return clutch (Fig. 22), as will be explained in greater detail at a later point herein. The dog 177 is then restored by spring 179 to the position shown in Fig. 19.

As noted hereinbefore, the return of the carriage is under control of a friction clutch and carriage return tape reel on one end of the power roll drive shaft. This mechanism is illustrated in detail, Fig. 22. A toggle mechanism is operated by a carriage return cam controlled by a key lever, and the cam immediately returns to normal position even though the clutch toggle may be locked in its straightened position to hold the clutch engaged. At the end of the carriage return movement, a carriage margin stop engages and moves a stop lever on the frame which in turn trips a cam to furnish the power for disengaging the clutch by breaking the toggle. This provides a closer control of the carriage and allows the clutch to slip momentarily while the disengaging cam is operating, thereby permitting the rebound force of the carriage to be dissipated before the clutch is disengaged. The foregoing generally described mechanism will be described in detail hereinafter, and insofar as the carriage return tape reel, the clutch and its operating toggle is concerned, reference may be had to Fig. 22 of the drawings wherein an extension 21a of the power roll shaft is journalled for rotation in the side member of the frame casting 10. The shaft 21a extends laterally beyond the outer face of the frame casting 10 where it rotatably carries the carriage return ribbon reel 196a. Immediately adjacent the reel 196a is a clutch disc 197a which is pinned to the shaft 21a for rotation therewith. In the normal non-operative position of the clutch, the adjacent face of the clutch disc 197a has little or no operative influence on the confronting flange 198a of the reel 196a. The opposite face of the clutch disc 197a is adapted for contact by an axially slidable plate 199a so that when pressure is applied to move the plate 199a inwardly against the clutch disc 197a a driving connection will be established between the confronting faces of the clutch disc 197a and the flange 198a of the carriage return tape reel.

Clutching pressure is transmitted to the place 199a through a sleeve 200a, the outer end of which is engaged by the end of a toggle arm 201a. The toggle arm 201a is pivoted to a downwardly extending leg 202a constituting a part of a bracket 203a which is attached to the outer surface of the frame casting 10. The toggle arm is pivoted to the downwardly extending leg 202a by means of a pivot stud 204a, this pivot being established near the lower end of the toggle arm 201a. The upwardly extending portion of the toggle arm 201a has formed therein a U-shaped portion 205a, the bight of which is threaded to receive an adjusting screw 206a. The extreme upper end of the arm 201a is notched to receive one end of a spring 207a which has its other end anchored to the frame casting 10. Thereby, the toggle arm 201a is retained in normal operative relation with a second link 208a of the toggle system, this link also having its lower end pivoted on the pivot stud 204a. The outer edge of the link 208a is embraced by the U-shaped portion of the toggle arm 201a, and the adjuusting screw 206a bears against that edge of the link. The link 208a has a forwardly extending portion 209a to which is pivoted one end of a short link 210a, the other end of said link being pivoted to an arm 211 which is adapted to rock on a pivot pin 212. The arm 211 has an outwardly projecting finger 213 adapted to engage the inwardly extending portion 209a of the lever 208a at a point below its pivotal connection with the short link 210a. As a consequence, the upward movement of the arm 211 is limited. An operating lever 214 is mounted to rock on the pivot stud 212, the pivot stud 212 being carried by an inwardly projecting portion 215 of the supporting bracket 203a. The operating arm 214 has a laterally extending flange 216 which is adapted to contact the upper edge of the inwardly extending bracket portion 215, thereby limiting the rocking motion of the operating lever 214 in a clockwise direction about its pivot pin 212. The arm 211 has an inwardly projecting flange 217 which underlies the bottom edge of the operating lever 214.

The operating lever 214 is provided at its inner free end with an eye 218 to which the cam controlled carriage return linkage is connected. Thus, upon operation of the carriage control linkage the operating arm 214 will be drawn downwardly, thereby rocking the lever 211 in a counterclockwise direction through engagement of the lever 214 with the inturned flange 217 of the lever 211. This will be effective to straighten the toggle connection between the lever 211 and the inturned portion 209a of the lever 208a. The lever 208a will consequently be rotated in a clockwise direction, and by virtue of the previously described connection between the lever 201a and the lever 208a, the lever 201a will be rocked in a clockwise direction about its pivot 204a. This movement it will be observed is transmitted by the lower end of the lever 201a to the sleeve 200a, to the pressure plate 199a with the consequent coupling of the clutch disc 197a and the reel flange 198a to cause the reel 196a to rotate and wind the carriage return tape thereon.

The terminal member of the aforementioned stop lever linkage for disengaging by breaking the clutch toggle system is diagrammatically illustrated in Fig. 22 as a bar 219 which is adapted to rock upwardly against the inturned flange 217 of the lever 211. It is clear from the foregoing description how the clockwise motion of the lever 211 will break the toggle system thereby permitting the toggle arm 201a to move in a counterclockwise direction about its pivot to release the clutch disc 197a. A more specific understanding of the several cam controlled operating linkage systems bearing on the engagement and disengagement of the clutch will be acquired as the description of the machine proceeds.

As intimated in the foregoing paragraph once the carriage return clutch toggle has been straightened and the clutch has been engaged for returning the carriage, it is necessary to provide means for breaking the clutch toggle and for disengaging the clutch. Herein the mechanism includes cam controlled levers and links shown in Fig. 25 of the drawings. When the hooked end of the lever 194 (Fig. 19) engages the margin stop 190 the lever 189 is drawn leftwardly with the result that the end 249a of the finger 249 which engages in a notch in the top edge of the lever 189 is rocked in a counterclockwise direction (Fig. 27). This causes the arm 251 to be similarly rotated, thereby pushing the link 252 to the right in Fig. 25, thus rocking the trip lever 253 for the trip cam unit in a clockwise direction. This causes the trip cam unit to be operatively coupled to the power roller 21. As a consequence the cam trip unit is rocked clockwise, thereby drawing down the link 254 and rocking the lever 255 in a clockwise direction. This draws the link 256 to the right in Fig. 25 and rocks the arm 257 (Fig. 26) in a counterclockwise direction. The arm 257 is connected to a bell crank lever 800. The opposite arm of the bell crank lever 800 has a link 801 connected thereto. The link 801 is attached to a lever 802 that is pivoted on a pin 803. One end of a clutch release link 185 is attached to the free end of the lever 802, the other end of the link 185 being pivoted to a bell crank 184. The bell crank 184 has pivoted thereto the rear end of the clutch release rod 183 and the opposite end of the release rod 183 is attached to the top of a bell crank 219 (Fig. 22). It will appear from the foregoing, therefore, that when the lever 189 (Fig. 19) is pulled to the left by engagement with the margin stop 190, the trip cam linkage (Fig. 25) is operated and it, through the intermediate link and lever system, including bell crank 800, link 801, lever 802 and the clutch release linkage 183, 184 and 185, will pull rearwardly on the top of the bell crank 219 (Fig. 22) and rock it about its horizontal pivot to lift its forwardly extending arm 219a into engagement with the inturned flange 217 of the toggle lever. This will serve to rotate the toggle lever 215 about the pivot 212 in a clockwise direction, thereby breaking the toggle link and permitting release of the clutch disc 197a.

*Tabulating mechanism*

The tabulating mechanism is best shown in Figs. 23 and 24. Pivoted on a stud 220 carried by the extension 221 (Fig. 21) is the tabular lever or counter-stop 222 (Figs. 22 and 23), which extends horizontally parallel with the lever 189 (Fig. 19) and is provided with a tooth 223 normally out of the path of movement of the tabular stops 224. Also pivoted on the stud 220 is an operating lever 225 which has one arm extending almost straight downwardly and provided with a pin 226 in the plane of an arm 192 pivoted on a stud 187. The latter is carried by a bracket secured to the underside of the frame. A spring 229, connected to the arm 192 and to a fixed pin 230, holds the arm 192 in contact with pin 226. The arm 192 is connected by the link 193 to the lever 173 pivoted on the top of the rear rail. The lever 173 cooperates with the edge of the arm 175 and is operated by the carriage release levers which are mounted in the carriage, heretofore described.

Whenever the arm 225 is rocked clockwise (Figs. 19, 23 and 24), the pin 226, engaging the arm 192, will cause the latter to rock counterclockwise, thereby pushing the link 193 to the left and operating the arm 173. The arm 173, in turn, operates the arm 175 to disengage the pinion 136 from the escapement mechanism, this operation being required during tabulating operations in order to release the carriage for free running movement by the spring motor 159.

The lever 225 is resiliently connected to the lever 222, whereby the foregoing movement of lever 225 also causes the lever 222 to be rocked clockwise to elevate the lug 223 into the path of a tabular stop 224. For this purpose, the horizontal arm of the lever 225 has a short downward extension provided with a pin 232 connected by a spring 233 to a pin 234 on the lever 222. A guard plate 235 is loosely pivoted on the pin 234 and slotted to embrace the pin 232 and is placed between the extension of the arm 225 and the spring 233. Opposite the front or upper face of the lever 222, there is provided a similar spring which, with spring 233, causes the levers 222 and 225 to normally move in unison. If the tooth 223 should strike the lower edge of a column stop 224 when the lever 225 is rocked clockwise, springs 233 stretch and prevent damage to any of the parts.

The lever 225 is pivotally connected at 236 to a link 237 (Figs. 23 and 24), having its lower end pivotally connected at 238 to a bell crank 239 (Fig. 25). The downwardly extending arm of the bell crank 239 is connected by a long link 240 to a rock lever 241 pivoted on the rod 30 which fulcrums the key levers including the tabulating key TK. The lever 241 is connected by a short link 242 to a conventional cam unit of the single-lobe type pivotally mounted on the rod 32. The cam unit cooperates with the usual power roller 21. The cam unit is controlled in a well known way by the tabulating key TK which, when depressed by the operator, causes the cam unit to be actuated by the power roller in a well known way, thereby rocking the cam unit in a clockwise direction. This results in drawing down the link 242, rocking the lever 241 clockwise, and drawing the link 240 to the right in Fig. 25, thereby rocking the bell crank 239 counterclockwise on its pivot 243. Link 237 is thus drawn downwardly depressing the right hand end (Figs. 23 and 24) of the horizontal arm of the lever 225. The arm 192 is operated as described above to free the carriage from the escapement mechanism and, at the same time, the lever 222 is rocked clockwise to elevate the lug 223 into the path of the nearest stop 224 immediately to the left of the lug 223.

When operated in this fashion, the lever 225 is latched to hold the lug 223 in the path of the column stop 224. As best shown in Fig. 26, there is provided a latch 244 pivoted on a stud 245 carried by the frame extension 221 and urged in a clockwise direction by a spring 246 which is anchored to a bracket 247 secured to the frame extension 221. Normally the latch 244 bears against the rear face or side of the lever 225 but, when the latter is operated as described above, it snaps over the upper edge of the lever 225 and thereby prevents said lever from returning to the position of Fig. 23. When the lever 225 is rocked as described above, a spring 248 connected to the pin 226 and to the same pin on bracket 230, tends to restore the levers 222 and 225 as a unit to the position of Fig. 23 but the latch 244 prevents this from taking place. Thus, the counter-stop 222 is maintained in the operative position in the path of the column stop 224 until the movement of the carriage brings the column stop into engagement with the lug 223.

The lever 222 is slotted horizontally at the point where the stud 220 passes through and normally the lever 220 occupies the left hand position of Fig. 19. The lever 220 is held in this position by means which include a finger 249 (Figs. 21, 27 and 28) secured to the upper end of a stub shaft 250 which is rotatably mounted in a horizontal portion of frame extension 221 (Fig. 21). Fixed to the lower end of the stub shaft 250 is an arm 251 connected by a link 252 to a trip lever 253 pivoted on the rod 30. This trip lever extends downwardly and at its lower end is shaped like that portion of a key lever which cooperates with the release lever of a cam unit and controls a trip cam unit (Fig. 25) in the well known manner. The trip cam unit is similar to the other cam units and it is connected by a link 254 to a rock lever 255 somewhat similar to the rock lever 242. The rock lever 255 is connected by a horizontal link 256 to an arm 257 journalled on the stud 245 and engaging a bent-over lug 258 in the latch 244. A torsion spring 259 (Fig. 21) connected to the arm 251 and to a collar 260 secured by set screws to the shaft 250, tends to urge the shaft 250 and finger 249 in a clockwise direction with reference to Figs. 27 and 28, thereby holding lever 222 in its left hand position as shown in Fig. 19.

When the column stop 224 strikes the lug 223, it moves the lever 222 to the right in Fig. 28, thereby rocking the finger 249 in a counterclockwise direction (Fig. 28). This causes the arm 251 to be similarly rotated, thereby pushing the link 252 to the right in Fig. 25, thus rocking the trip lever 253 for the trip cam unit in a clockwise direction. This causes the trip cam unit to be operatively coupled to the power roller 21 in a well known way. As a consequence, the cam trip unit is rocked clockwise, thereby drawing down the link 254 and rocking the lever 255 in a clockwise direction. This draws the link 256 to the right in Fig. 25 and rocks the arm 257 (Fig. 26) in a counterclockwise direction, also, through the lug 258, rocking the latch 244 to disengage it from the depressed horizontal arm of lever 225. This permits the levers 222 and 225 to rock counterclockwise (Fig. 23) under the influence of spring 248, thereby removing lug 223 from engagement with the column stop.

In light of the fact that the machine is designed to space units as small as 1/45 of an inch, it is of course quite important that carriage rebound upon tabulating movement thereof be minimized or avoided entirely. In order that the carriage rebound may be kept within very narrow limits, thereby has been provided a latch lever 810 shown in Figs. 19 and 8A. The latch lever is mounted for rocking movement on an eccentric sleeve 811 of a hexagonal spacer 812 which is secured by a screw 813 in bracket 189. The free end of the lever 810 is formed with an upwardly opening hooked portion 814 which is positioned substantially flush with the upturned end of the lever 222. The hooked end of the lever 810 has an external surface 815 which engages the tabular stops 224, thereby camming the lever 810 downwardly against the tension of a spring 816 which interconnects the levers 222 and 810. As the carriage proceeds in its tabulating movement the tabulating stop 224 engages the upturned end 223 of the lever 222 and moves such lever to the right as viewed in Fig. 8A. This movement of the lever 222 exposes the hooked portion 814 of the lever 810 and permits such portion to engage behind the tabular stop 224 as the free end of the lever is drawn upwardly behind the tabular stop under the influence of the spring 816. It will be noted that under such conditions the hooked end 814 of the lever 810 engages one face of the tabular stop 224 while the outer upturned end 223 of the lever 222 engages the opposite face of the tabular stop 224. By this means the carriage is afforded positive security against movement in either direction once the tabulating operation has been effected. It follows, therefore, that any carriage rebound is effectively avoided.

In the normal operation of the carriage return there is a line spacing operation of the platen as hereinabove described. The return of the carriage involves the tripping of a carriage return cam and the operation of a carriage clutch release cam. Since in the carriage return structure heretofore described there is no provision for tripping the carriage return clutch release cam a second time, there has been provided special mechanism which permits successive line spaces under the control of the carriage return clutch without the accompanying movement of the carriage; withal, there has been provided means for releasing the carriage return clutch after each such succeeding line spacing operation without resort to the carriage return clutch release cam which is effective during the initial line spacing operation which takes place at the return of the carriage.

Figure 10:
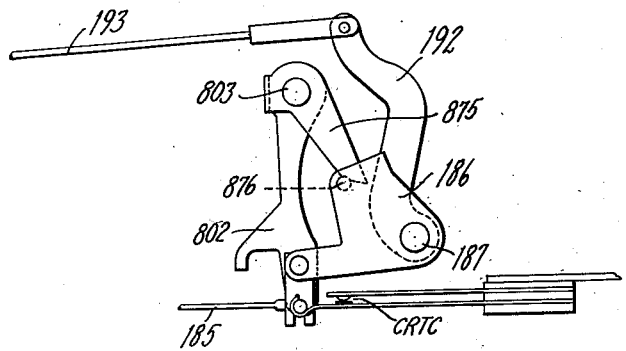
Fig. 10 is a fragmentary detail in elevation of carriage return linkage arranged to operate a carriage return contact.

Reference to Figs. 10, 19 and 20 will perhaps best illuminate the mechanism which is operative upon second and subsequent line spacing operations when the carriage is in its returned position. A lever 820 is pivoted adjacent the lever 802 on the pivot pin 803. The downwardly extending leg of the lever 820 is connected to the lower end of the lever 802 by means of a spring loop 821 which has one end anchored to a pin 822 extending laterally from the lower end of the lever 820, and the other end of the spring 821 is anchored on a stud 823 extending laterally from the lower end of the lever 802. An upper leg of the lever 820 has pivoted thereto an angular shaped catch 824 which is normally held against a shoulder 825 formed in the upwardly extending portion of the lever 820, the force for holding the catch 824 in that position being provided by a spring 826 which has one end attached to the catch and the other end to a pin 827 extending laterally from the lever. The catch 824 has an inturned horizontal lip 828 which normally lies in the path of the margin stop 190. During the return of the carriage the margin stop 190 will engage the inturned lip 828 of the catch 824 and will rock the catch in a counterclockwise direction, thereby simply moving it out of the way so that the margin stop may engage the end of the lever 189 to effect operation of the carriage return clutch release cam as hereinbefore described. At such time the catch 824 will return to its normal position against the stop shoulder 825 and when in such position the horizontal lip 828 thereof will underlie the margin stop 190.

From the foregoing it follows that the lever 820 will be inhibited against rocking about its pivot pin 803. If, therefore, under such conditions the carriage return key is again depressed, the carriage return clutch will be engaged as heretofore described in connection with the return of the carriage. Since, however, the lever 820 is locked against movement, the carriage return clutch toggle linkage will be straightened under the influence of the carriage return control cam, and the link 185 will be drawn to the left in Fig. 20 against the tension of the bow spring 821. At such time the carriage return clutch will be engaged and the tape reel 196a will be rotated sufficiently to effect a line spacing operation as heretofore described.

The carriage return clutch toggle linkage will be broken immediately after its control cam has been operated by expanding action of the bow spring 821 against the locked lever 820, this tending to move the lever 802 to the right in Fig. 20. The movement of the lever 802 results in drawing the link 185 to the right in Figs. 19 and 20 with the consequent operation of the finger 219 (Fig. 22) and the breaking of the clutch toggle linkage in a manner similar to that described in connection with the return of the carriage.

Back spacing of the carriage is under the influence of a back spacing cam which is not shown since it is identical in structure and function with the cams already described.

Herein it is sufficient to say that when the back space key is depressed the associated cam will be released into contact with the power roll 21 and a link 830 (Figs. 14 and 19) will be drawn forwardly. The link 830 is connected to a bell crank 831 which is mounted for rocking motion about a stud 832 supported in the rail 129. One leg of the bell crank 831 is connected to a link 833 and the latter has its opposite end connected to a ratchet 834 which is mounted on the casting 127 adjacent the gear 137. Each time the linkage system now described is operated by its operating cam, the ratchet 834 is carried into engagement with the teeth of the gear 137 and moves said gear the space of one tooth in a retrograde direction to effect back spacing of the carriage.

The automatic control of the machine requires that certain control contacts be opened each time the carriage is returned or the carriage is back spaced. The contacts in question are the carriage return contacts CRTC (Fig. 19) and the back space contacts BSC (Fig. 14). By first referring to Fig. 19 it will be seen that the contacts CRTC are under the immediate control of a contact operator 850 which is under the influence of a stud 851 extending from a face of the plate 186, the plate 186 being pivoted on the pivot stud 187. The normal resilience of the movable leaf of the contact CRTC holds the contact closed and holds the plate 168 in its extreme clockwise rotative position. The lever 192 carries a pin 852 which engages the right hand edge of the plate 186 and which is effective, therefore, when the lever 192 is rocked in a counterclockwise direction during carriage return to rock the plate 186 in a counterclockwise direction about its pivot 187, with the result that the contact CRTC is broken.

By reference to Fig. 14 of the drawings it may be observed how the contact BSC is opened during back spacing movement of the carriage. The bell crank 831 has a stud 860 extending from a face thereof and this stud engages and operates a contact operating link 861, one end of the link 861 being connected to the movable leaf 862 of the contact BSC. Each time, therefore, that the link 830 is drawn forwardly and the bell crank 831 is rocked about its pivot 832 in a clockwise direction, the contact operating link 861 will be moved to the right with the result that the contact BSC will be opened.

Figure 9:
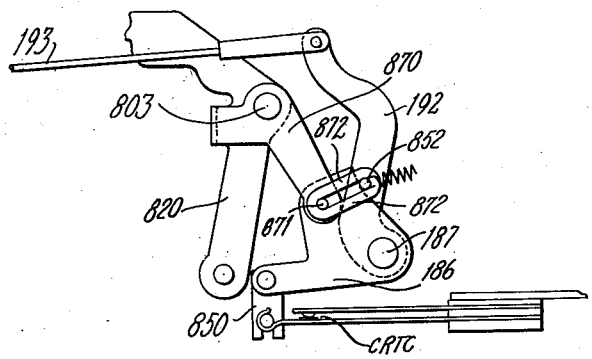
Fig. 9 is a rear elevation of a part of the carriage release and tabulating mechanism, certain parts having been removed to show underlying structure.

It has been generally stated hereinabove that during carriage return the lever 173 is rocked to engage the lever 175 for the purpose of disconnecting the escapement clutch during such return movement. It is now possible to trace the specific mechanism by which this function is performed. The lever 820 (Figs. 9 and 19) has a laterally spaced, generally rearwardly extending finger 870 from the face of which extends a stud 871. The stud 871 and the stud 852 extending from the outer face of the lever 192 (Figs. 9 and 19) are interconnected by means of a loop 872. Consequently, when the connected levers 802 and 820 are rocked about the pivot pin 803 by movement of the link 135 to the left in Figs. 9 and 19, such motion is imparted to the lever 192 because of the pin and loop connection just mentioned. The lever 192 will rock about its pivot 187 in a counterclockwise direction, thereby moving the link 193 to the left in Figs. 9 and 19 and rocking the lever 173 into engagement with the lever 175 with the result that the escapement clutch mechanism is disengaged.

It is contemplated that the carriage return contact CRTC be opened also during tabulation and during extra line spacing operations when the carriage has been fully returned.

During tabulation it will be remembered the bell crank 239 will draw the right hand end of the lever 222 downwardly with the result that a downwardly extending portion 873 of that lever will be rocked in a clockwise direction. The free end of the downwardly extending portion of the lever 873 has a pin 226 which is adapted to engage the right hand edge of the lever 192, thereby rocking the latter lever in a counterclockwise direction and engaging the pin 852 thereon with the right hand edge of the plate 186. This will result in the counterclockwise movement of the plate 186 and the resultant opening of the contact CRTC through downward movement of the operating link 850.

Provision has also been made for opening the contact CRTC during extra line spacing operations when the carriage is in its returned position. In connection with such line spacing operations described before, it has been explained how the lever 820 is locked against movement by engagement between the latch 828 and the lower face of the margin stop 190. In such case only the lever 802 can be rocked about its pivot 803 and accordingly there has been provided a laterally spaced and generally downwardly extending finger 875 (Figs. 10 and 19). The finger 875 extends into the path of a pin 876 which is carried by and extends from the rear face of the plate 186. It follows, therefore, that when the lever 802 is rocked in a clockwise direction about its pivot 803 under the force of the link 135, the finger 875 of said lever will rock into engagement with the pin 876 and thereby rock the plate 186 about its pivot 187 in a counterclockwise direction, thereby opening the carriage return contact CRTC.

*Code selector unit*

In the trial copy recorder letter spacing and control of the punch 15 is under control of the code selector unit. It will be appropriate at this time, therefore, to describe the manner in which the code selector unit controls not only the letter spacing magnets EM1, EM2 and EM3, but also how it controls the punch magnets PM1, PM2, PM3, PM4, PM5, PM6 and PM7 (Fig. 70A). The code selector unit 13 is shown best in Figs. 29 through 32. The unit is operated upon the actuation of each of certain keys of the main keyboard, to energize the punch magnets PM1–PM7, inclusive, singly and in combination so as to punch in a tape the code designation which corresponds to the particular key actuated.

The code selector unit 13 comprises a frame structure which is removably mounted at the base of the machine as shown in Fig. 3, and a plurality of selector slides 261 and 262 are mounted, respectively, for longitudinal sliding movement in the frame structure. The slides 261 and 262 correspond, respectively, to the keys of the keyboard which control the punch 15.

As explained previously, each time a key is depressed, a related one of the cam units 12 is tripped and the cam 31 of the tripped unit then engages the constantly rotating power roller 21. As a result such cam unit is rocked first away from the power roller 21 and then back toward the power roller and relatched in the position shown. The relationship of the several cam units 12 with respect to the power roller 21 is indicated in Fig. 3. The cam units 12 appearing to the right of the roller in Fig. 3 are referred to herein as front cam units and the units appearing to the left of the roller in Fig. 3 are referred to herein as the back cam units.

Each cam unit 12 which is tripped by a key of the main keyboard is equipped with a downward extension 263 carrying a pin 264 and each time such a cam unit is tripped and is operated, its pin effects a sliding movement of a corresponding one of the selector slides. The pins 264 engage upstanding lugs 264a at the forward end of the slides, whereby the slides are adopted for reciprocation by their related cams 31. The selector slides 261 are those which are operated by corresponding front cam units and the slides 262 are those which are operated by corresponding rear cam units. As the cam units 12 are arranged in staggered relation along the power roller 21, the slides 261 and 262 will be arranged alternately in the frame structure, as shown in Fig. 29. The frame structure for the selector unit includes a front guide comb 265 and a rear guide comb 266 and the selector slides are mounted, respectively, in aligned slots 267 formed in the two combs and are supported therein by suitably mounted anti-friction rollers 268 (Figs. 30 and 31). A stop plate 269 overlies the front comb 265 and cooperates with spaced lugs 270 and 271 on the selector slides to limit the longitudinal sliding movement of the latter. Tension springs 272 (Fig. 29) connecting pins 273 projecting from adjacent slides 261 and 262 serve to urge such slides against the stop plate 269 and thereby maintain the slides in their respective positions shown. From the foregoing it will be apparent that each time a slide 261 (Fig. 29) is operated by its related front cam unit 31, it will be moved lengthwise forwardly of the machine and will be returned by the spring 272 attached thereto and that each time a slide 262 (Fig. 29) is operated by its related back cam unit, it will be moved rearwardly thereby and will be returned to the position shown by its spring.

The sliding movement of the selector slides 261 and 262, which results from each operation of their related cam units 31, provides for the energizing of the seven punch selector magnets PM1 to PM7, inclusive, and also provides for energizing the punch clutch magnet PCM. This control of the punch by each of the selector slides is effected by the permutative closing of six selector code contacts SC1 to SC6, inclusive (Fig. 29) and by the closing of the common contact SCC. The code contacts SC1 to SC6, inclusive, control, respectively, the energizing of the punch magnets PM1 to PM7, inclusive. These code contacts SC1 to SC6, inclusive, are operated, respectively, by corresponding bails SB1 to SB6, inclusive. The common contact SCC is operated by a corresponding bail SBC.

As shown in Fig. 29, the bails SB1 to SB6, inclusive, and SBC are arranged in horizontally spaced relation and each such bail comprises a bail element 274 extending transversely through aligned elongated slots 275 formed in all of the selector slides. Each bail element 275 is connected at its two outer ends to supporting arms 276 and 277, respectively; the arm 276 being secured at its outer end to a pivot pin 278 carried by one frame 279, and the arm 277 being mounted on a pivot projection 280a extending from a bail shaft 280 which extends through aligned openings in the side frame plate 281 and in a vertical flange 282 of a frame plate 283. A yoke 277a attached to the inner end of the shaft 280 connects the arms 277 with their respective bail shafts 280. An inturned portion of the yoke 277a embraces the arm 277, as best shown in Fig. 32, and provides a positive operating connection between the parts. The right hand end of each bail shaft as viewed in Fig. 29, extends outwardly of the flange 282 and an upstanding contact actuating element 284 is fixed thereto in position to close the corresponding set of contacts of the group SC1 to SC6, inclusive, and the contact SCC.

The bottom of the slot 275 of each of the selector slides 261 and 262 is formed with upstanding cam projections 285 which are permutatively located on the several selector slides and operate corresponding ones of the bails SB1 to SB6 and the bail SBC. Each cam projection 285 functions to cam upward a related bail element when the selector slide on which the cam projection is located is moved lengthwise by the operative movement of its corresponding cam unit 31, and the upward movement of each such bail element results in rotating the related bail shaft 280 to close the related set of selector code contacts of the group SC1 to SC6, inclusive, and the contact SCC.

Each of the selector slides 261 and 262 is provided with a cam projection 285 for raising the bail SBC and closing the common contact SCC each time such slide is operated. The cam projections 285 for operating the remaining bails SB1 to SB6, inclusive, are so located on each selector slide that they provide, when such slide is operated, for the closing of those code contacts of the group SC1 to SC6, inclusive, which correspond to the code hole positions for representing the character or functional operation corresponding to the character key which was actuated to operate such slide. Each selector slide is originally formed with lower cam projections 285 and the projections not to be used are removed by any suitable means. The respective positions of the cam projections which have been removed in the slide 261 of Fig. 30 are indicated by dotted lines.

It is noted that the slide 261 of Fig. 30 contains cam projections which will operate the bails SBC, SB4 and SB6, and the latter will therefore close the related contacts SCC, SC4 and SC6, respectively, when such slide is operated. From the previous description, it will be obvious that the closure of such contacts will energize the punch clutch magnet PCM and the punch selector magnets PM4 and PM6 and thereby operate the punch 15 to punch the 4—6 code designation in the tape. As shown in Fig. 72 the 4—6 designation represents the period.

The foregoing is a description of how the selector unit operates to select the proper punches for punching a code in a tape in response to the depression of either a character key or a functional key on the keyboard of the machine. It will be remembered that it was generally stated hereinbefore that the selector slides are also operative to energize the letter space selecting magnets EM1, EM2 and EM3. The following will, therefore, be an explanation of the structure resulting in these functions. Each of the selector slides 261 and 262 (Figs. 30 and 31) supports a second tier of bails 286a, 286b, 286c, 286d, 286e and 286f. These bails are supported in notches 287 which correspond in their general nature and function to the notches 275 heretofore described. Associated with certain of the bails 286a–286f, inclusive, are cam surfaces 288 which are permutatively arranged in fashion similar to the cam surfaces 285 described in connection with the punch selection bails.

Since the escapement mechanism of the machine is under the control of three magnets EM1, EM2 and EM3, respectively, of one, two and three units of spacing, it is essential of course that these magnets may be energized singly or in combination to obtain a letter space which is proportional to the unit width of the letter being struck. Accordingly, the bails 286a, 286b and 286c control the closure of bail contacts ECA, ECB and ECC. These contacts are operative during the operation of the machine when the type basket is in lower case position. The bails 286d, 286e and 286f control the closure of contacts ECD, ECE and ECF. These contacts are operative during operation of the machine when the type basket is in upper case position. A switch CSC (Fig. 4) which is operated by the shifting movement of the carriage selects either the lower case contacts ECA, ECB and ECC or the upper case contacts ECD, ECE and ECF depending on the position of the type basket.

The operation of the tape punch 15 is under the control of an electromagnetic clutch. The clutch as it applies to the tape punch is shown in Figs. 33 and 34. In Figs. 33 and 34 the shaft 315 represents the cam shaft of the tape punching unit. The shaft 315 has provided a pair of bearing hubs 290 and 291 which are adapted for the free rotational support of the drive gear 23 (which is the drive gear for the tape punch) the latter having a hub extension 293 in contact with the outer bearing 291. The outer end of the shaft 289 is fitted with a bearing sleeve 294 which is affixed for rotation therewith by means of a set screw 295. The bearing sleeve 294 has an inwardly extending hub 296 of reduced diameter to which is fixed a sleeve 297 by means of a set screw 298. The sleeve 297 anchors one end 299 of a helically wound expansion clutch spring which is wound to surround the inwardly extending gear hub 293, as well as to surround a portion of sleeve 297 which is of the same diameter as the gear hub 293. The opposite end 300 of the clutch spring 301 is anchored on a sleeve 302 which is mounted in a recess formed in the gear hub 293 and in the sleeve 297. The gear 23 is constantly driven while the machine is in operation and its power is transmitted to the shaft 315 because the clutch spring 301 normally grips the gear hub 293.

When it is desired to disconnect the shaft 315 from the gear 23, it is merely necessary to block rotation of the sleeve 302 whereby continued rotation of the sleeve 302 will expand the clutch spring 301 to release its grip on the gear hub 293 and the sleeve 297. The outer peripheral surface of the sleeve 302 has a latch shoulder 303 (Fig. 34) extending in an axial direction thereon, and when this shoulder is engaged by an armature 304 of an electromagnet PCM, the sleeve 296 is held against rotation. When the magnet PCM is energized, the armature 304 will be attracted thereto, thereby permitting rotation of the sleeve 302 under the influence of the spring 301, contraction of the clutch spring 301 into contact with the gear hub 293 and sleeve 297, and the consequent rotation of the shaft 315 with the gear 23.

Figure 36:
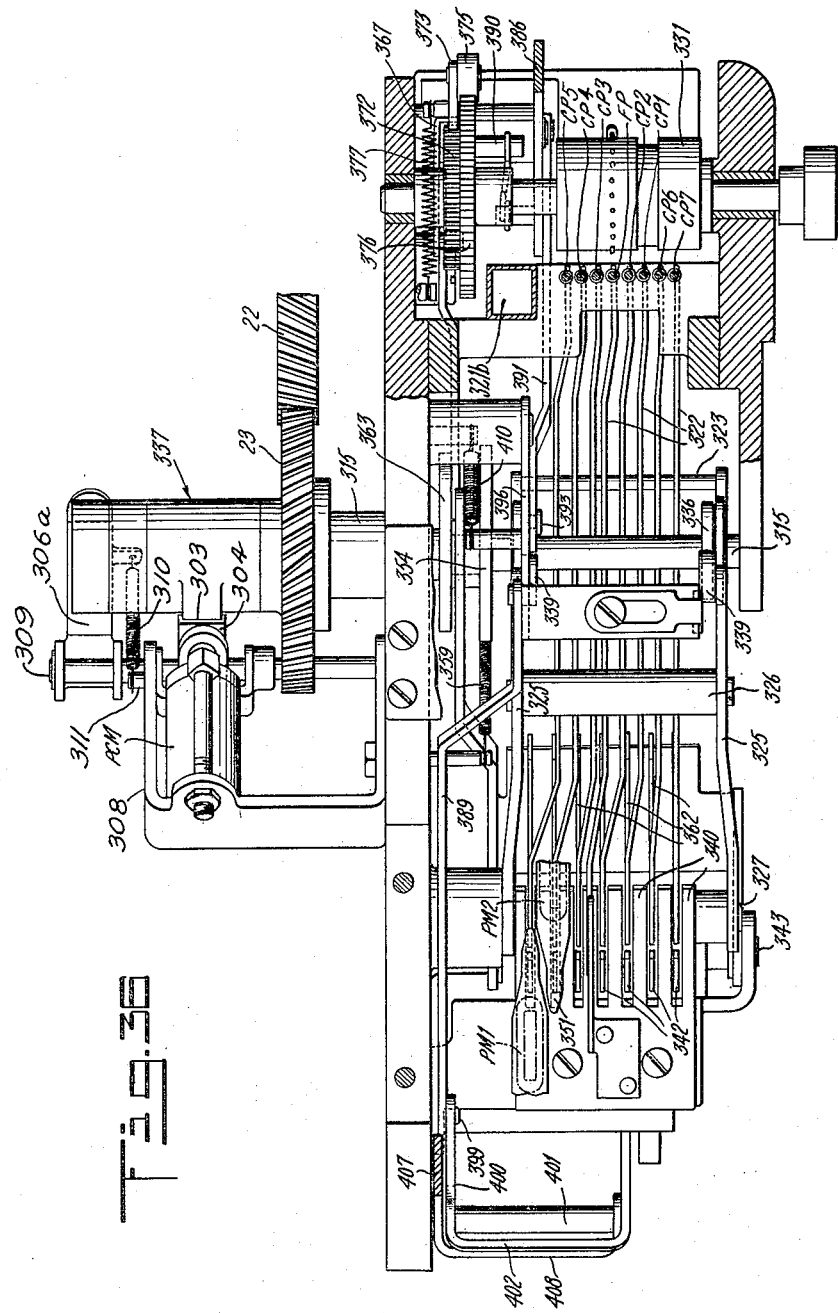
Fig. 36 is a top plan view of the tape punch shown in Fig. 35.
Figure 42:
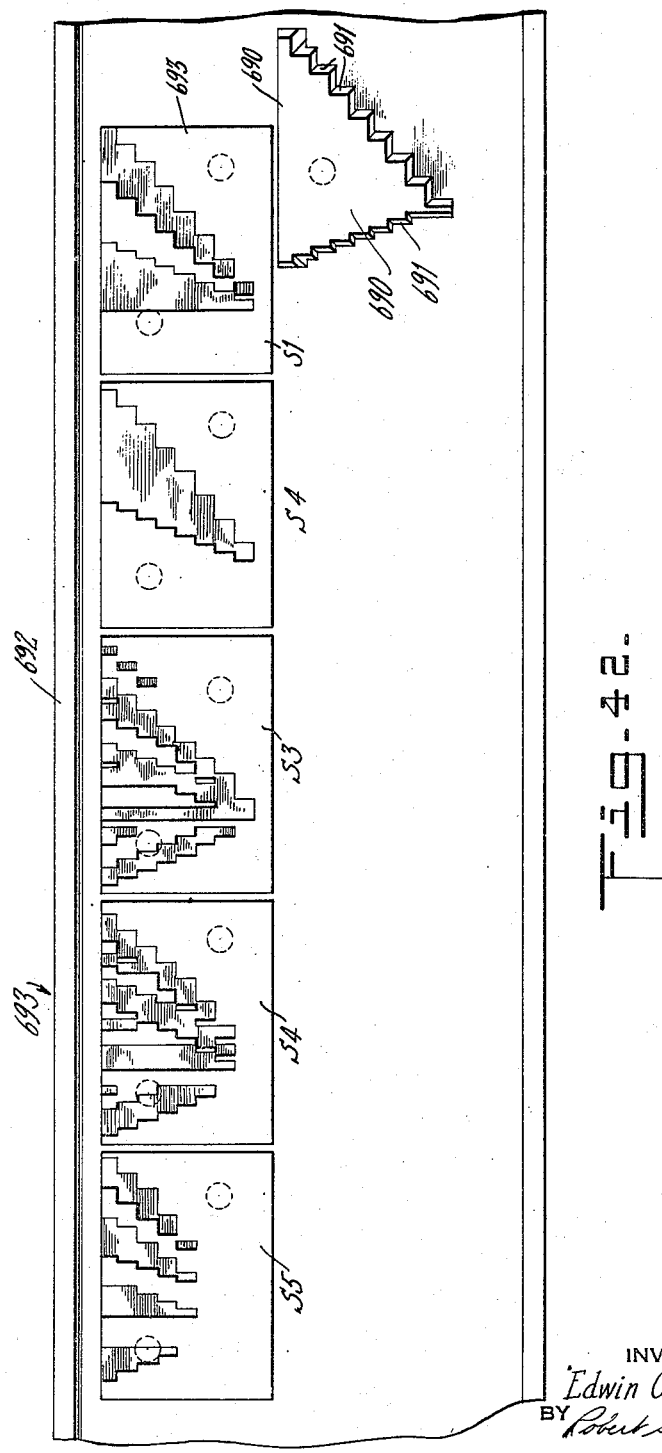
Fig. 42 is a plan view of a justification code computing bar located in the trial copy recorder, and a justification zone indicating cam.

The outer peripheral face of the sleeve 294 also has an axially disposed latch shoulder 306 formed thereon which is provided for engagement by a pivoted latch 306a, the latch being pivoted on the magnet yoke 308 by means of a laterally extending pivot pin 309 (Fig. 36). The latch 306a is normally urged in a clockwise direction by means of a spring 310 which has one end attached thereto and the other end to an anchor pin 311 extending from the magnet yoke 308. By reference to Fig. 36 the foregoing arrangement will be clear as well as the fact that the armature 304 is also pivoted on the pivot pin 309. A spring (not shown) also urges the armature 304 toward the shoulder 303.

From the foregoing it will be seen that both the armature 304 and the latch 306a are spring pressed into engagement with their respective latch shoulders 303 and 306. It will also be seen that the latch shoulders are so disposed in relation to the direction of rotation of the parts that the armature 304 prevents clockwise rotation of the sleeve 302 while the latch 306a prevents counterclockwise rotation of the sleeve 294.

When the magnet PCM of the punch, is deenergized, the armature 304 will be pulled down into contact with the sleeve 302 and will block rotation of the sleeve as soon as the end of the armature and the latch shoulder 303 come into contact with each other. The momentum of the shaft 315 will tend to cause some additional rotation which would result in recoil were it not for engagement of the latch 306a with the latch shoulder 306. The latch shoulder 306 is so positioned in respect to the end of the latch 306a that engagement between the armature 304 and the latch shoulder 303 is effected before the latch shoulder 306 passes beyond the end of the latch 306a. After the latch shoulder 306 is carried beyond the end of the latch 306a under momentum of the shaft 289, the recoil of the shaft is dampened by engagement between the latch 306a and its related latch shoulder 306 as the shaft begins its retrograde movement under the normal tension of the clutch spring 301. The spring will, therefore, be expanded beyond its normal diameter to hold it free of the drive hub 293.

Tape punch

The tape punch 15 which forms an important part of the trial copy recorder (Figs. 35, 36, 37, 38 and 39) is a power driven unit, removably mounted at the left hand rear portion of the main frame 10. A normally stationary rotary cam shaft 315 makes one revolution under control of the magnetically operated clutch hereinabove described and illustrated in Figs. 33 and 34 for each punch cycle. A tape from a supply spool 316 (Fig. 2), removably mounted at the rear of the machine, passes over the top of the punch unit 15, and the holes are punched upwardly at the front of the unit for convenient manipulation and observation of the tape by the operator. The tape is fed for spacing of the holes by a pin wheel during each punch cycle, and the pin wheel may be manually turned to move the tape in either direction. The tape may be easily inserted edgewise into the punch.

The selector contacts SC1 through SC6 select the code holes to be punched in the tape by energizing the associated ones of the six punch magnets PM1 through PM6, which, by attracting their armatures, release corresponding punch lever latches. The seventh punch magnet PM7 is energized automatically when certain circuit conditions prevail, as will be explained later. The punch clutch magnet is jointly controlled by a contact operated by the releasing of any one or more of these latches, and by the common selector contact SCC. During the initial part of the punch shaft rotation, the latches which were released are locked in their released position, and the ones which were not released are locked in their normal position.

As stated hereinabove, the structural details of the tape punch 15 are shown in Figs. 35 to 39, inclusive. As shown, the punch comprises seven vertically arranged code hole punches CP1 to CP7, inclusive, which correspond, respectively, to the seven hole positions of the code system employed. As shown in Fig. 36, the vertical code punches are arranged beneath and in a transverse row across the tape punching station where the coded data is recorded. The punch 15 also comprises a vertically disposed feed hole punch FP which is located between the code punches CP3 and CP4, and which functions during each operating cycle of the punch to punch the relatively small tape feed holes which are located in all record columns of the tape and which are engaged by the tape feed pins.

As shown in Figs. 35 and 37, the code punch CP1 is mounted for vertical reciprocatory movement in spaced aligned guide passages 318 in a fixed guide block 319 and in an aligned die opening 320 in a fixed die plate 321. The lower end of the punch CP1 is pivotally connected in a suitable manner to the right hand end of a related punch actuating lever 322, and the lever 322 is pivoted intermediate its ends on a rod 323 which extends transversely of and forms a part of a punch operating frame 324. The operating frame 324 also comprises spaced side arms 325 joined by a spacing sleeve 326 and pivotally supported on a transversely extending stop rod 327 which is suitably fixed at its ends to the punch frame structure. The left hand end of the punch lever 322, as viewed in Fig. 37, engages the top of the stop rod 327 when the punch CP1 is in its normal or inactive position shown. It will be appreciated that the remaining code punches CP2 to CP7, inclusive, and the feed hole punch FP are constructed the same as the punch CP1 and are mounted in the same manner in the guide block 319 and die plate 321 and are connected, respectively, at their lower ends to related actuating levers 322. Such related actuating levers are arranged side-by-side in the frame 324 and are pivoted on the transverse rod 323. The ends of all the levers, which are remote from their punches, rest on top of the stop rod 327 with the punches in their normal or inactive position. A tension spring 328 connects the right-hand end, as viewed in Fig. 37, of each punch operating lever to a fixed flange plate 329 and thereby constantly urges the several code punches and feed punch to their inactive or withdrawn positions shown in the drawings.

As shown in Fig. 37, the lower face of the guide plate 321 is spaced from the upper face of the guide block 319 to provide a passage through which a tape is fed lengthwise from left to right. The tape is further guided in its lengthwise movement across the top of the punch by a guide roller 330, shown in Fig. 35. After being punched, the tape passes over a tape feed sprocket 331 having pins 332 fitting within the feed holes formed by the feed hole punch FP. The sprocket 331 is indexed once for each operating cycle of the punch 15 so as to advance the tape to the next blank record column, as will be explained more fully hereinafter.

The punch 15 comprises an operating cam shaft 315 suitably journalled at its ends in the fixed frame structure of the punch and having a plurality of control cams 333, 334, 335 and 336 mounted thereon. Each revolution of the shaft and the cams thereof effects an operating cycle of the punch and each operating cycle is initiated by engaging a punch clutch 337 (Fig. 36) which is the same as the clutch illustrated in Figs. 33 and 44. The clutch 337 connects the constantly running drive gear 23 with the operating shaft 315 for one revolution of the latter and then disconnects the two and stops the operating shaft 315 in its home or inactive position shown in the drawings. The punch clutch is engaged by the energizing of a punch clutch magnet PCM. The structure and mode of operation of the punch clutch 337 has been described in detail hereinbefore.

The cams 335 and 336 are substantially complementary cams and are engaged, respectively, by followers 338 and 339 which are located in spaced relation, as shown in Fig. 35, on the outer end of an arm 325. The follower 339 is a roller carried by the upper fork 325a of the arm 325 while the follower 338 is a slight projection on the lower fork 325b of the arm 325 (Fig. 37).

From an examination of Figs. 35 and 37, it will be apparent that each time a punch operating cycle is effected by rotating the shaft 315 one revolution counterclockwise, the cam 335 engaging the follower 339 will first move the operating frame 324 upward or counterclockwise about its pivot rod 327, the cam 336 being so shaped as to permit such upward movement. Then, the cam 336 by its engagement with the follower projection 338 will insure movement of the operating frame 324 downwardly under the force of the springs 328, or clockwise, and back to the inactive position shown, the cam 335 being so shaped as to permit such return movement of the frame 324. The identical cams 335 and 336 at opposite sides of the frame 324 insure the even movement of the frame and prevent warping of the frame as it moves up and down. During such upward and downward movement of the frame 324, the rod 323, on which the punch actuating levers 322 are pivoted, is also moved upward and then restored to the position shown. It will be apparent that if, during such movement of the rod 323, the left hand ends of all punch actuating levers 322 are not held down against the stop rod 327, such actuating levers will be moved by the rod 323 clockwise about their pivotal connections with their related punches, the springs 328 being sufficiently strong to hold their right hand ends stationary. On the other hand, if the left hand end of any one of the punch actuating levers is held down against the fixed rod 327, the upward movement of the rod 323 will then effect a counterclockwise movement of the lever, or levers, so held, about the stop rod 327 as a pivot and, in so doing, the punch connected to each lever so held will be moved upward against the force of its spring 328 and through the tape, thereby punching a code hole in the corresponding code position of the tape, in the case of the code punches, and punching a feed hole in the tape in the case of the feed punch.

In the construction shown the lever 322 corresponding to the feed punch FP is permanently held down against the stop rod 327 by the outer end of an arm 340 (Fig. 35), the arm 340 being fixed at its other end to a fixed frame member 341. Thus, for each revolution of the shaft 315, a feed hole will be punched in the tape in the manner explained. The code designations are punched in the tape by the selective latching against the stop bar 327 of the adjacent ends of those actuating levers which are connected to the code punches corresponding to the code positions where it is desired to punch the code holes. Selective latching of the left hand end, as viewed in Figs. 35 and 37, of the seven code punch actuating levers 322, against the stop rod 327, is effected, respectively, by the selective releasing of seven corresponding latch levers 342. The releasing of the seven latch levers is controlled by the selective energization of the seven corresponding punch magnets PM1 to PM7, inclusive.

The seven latch levers 342 are arranged in side-by-side relation and are pivoted on a transverse fixed rod 343. The upper ends of the seven latch levers extend, respectively, through corresponding slots 344 of a comb plate 345 fixed to the frame member 341, and such latch levers are aligned, respectively, with the adjacent ends of their respective code punch actuating levers which also extend through the corresponding slots 344. The seven latch levers are each urged clockwise as viewed in Figs. 35 and 37 by tension springs 346 connecting, respectively, projections on the latch levers and the flange of a transverse fixed frame plate 348 (Fig. 35). In the normal or inactive position of the parts as shown, each latch lever 342 of the group is held against clockwise movement by its upper pointed end 349 engaging the right hand end of a latching notch 350 cut in the under face of the pivoted armature 351 of its related selector magnet of the group PM1 to PM7, inclusive. A tension spring 352 holds each armature in the position shown.

When any one of the punch selector magnets of the group PM1 to PM7, inclusive, is selectively energized, in a manner which will be explained hereinafter, its related armature 351 is attracted and moves upward, thereby releasing its related latch lever 342, and the latter is then moved by its spring 346 clockwise as viewed in Figs. 35 and 37, and to a point where a latching notch 353 on the released latch lever engages over the left hand end of its related punch actuating lever, and thereby holds such engaged punch actuating lever down against the stop rod 327 so that upon subsequent rotation of the operating shaft 315, the cams 335 and 336, through the frame 324 will cause the right hand end of such punch actuating lever to move its related code punch of the group CP1 to CP6, inclusive, upward and punch a code hole in the corresponding code position of the tape, in the manner previously explained.

The selector magnets PM1 to PM7, inclusive, are disposed in staggered relation as shown in Fig. 35 so that such magnets and their armatures are aligned with their related latch levers. The armatures of adjacent selector magnets overlap at their outer ends so that their latching notches 350 are aligned in a transverse horizontal plane when the parts are in the inactive position shown.

During each operating cycle of the punch 15, a cam 354 (Fig. 36) on the punch operating shaft 315 functions to lock those latch levers which have been tripped by their related selector magnets, and also functions to lock the untripped latch levers in their inactive positions so that they cannot interfere with the punching during the same cycle of the selected code combination by the tripped levers. To this end, a latch lock bail lever 355 is rotatably mounted on a transverse rod 356 suitable fixed to the frame structure of the punch and includes a follower arm 357 carrying a roller 358 which is constantly urged against the face of the cam 354 by a tension spring 359 (Fig. 35) connecting the arm 357 with a suitable fixed part (not shown) of the punch frame. The bail lever 355 carries a locking bail 360 extending transversely across the spear-shaped ends 361 of arms 362, the latter being integrally formed, respectively, with the six latch levers 342. As the latch levers 342 are released by their associated magnets, the cams 354 and spring 359 move the locking bail 360 counterclockwise, as viewed in Fig. 37, and toward the ends 361 of the levers 342. As a result of such movement, the locking bail 360 will pass beneath the points of the ends 361 of any untripped latch levers and will engage the lower inclined surfaces thereof and thereby lock such untripped levers in their inactive positions. The ends 361 of any latch levers which have been previously tripped will then be so positioned that the locking bail 360 will pass above the points of such ends and will engage the upper inclined surfaces thereof and thereby lock any such tripped levers in latching relation with respect to their related punch actuating levers.

The cam 363 (Figs. 36 and 38) is the tape feed cam and it functions during each punch operating cycle to advance the tape feed sprocket 331 and tape an amount sufficient to move the punched record column out of punching position and to move a blank record column into punching position. A lever arm 364 carrying a follower roller 365 engaging the feed cam 363 is pivoted to a suitably fixed stud 366 and it has pivoted to its right hand end a feed pawl 367. A stud 368 on the pawl 367 engages an edge of the lever 364 and a tension spring 369 connects the stud 368 and a fixed pin 370 on the lever arm 364. A tension spring 371 urges the follower 365 upward and against the face of the feed cam 363. A ratchet wheel 372 is fixed to the tape feed sprocket 331 and is adapted to be engaged by the upper end of the pawl 367, when the latter is moved upward. It will be apparent that when the punch shaft 315 to which the cam 363 is fixed rotates, thereby rotating the cam 363 counterclockwise so that the roller 365 comes into contact with the high portion of the cam 363, the arm 364 will move the pawl into the path of the teeth of the wheel 372 and then downward into engagement with a tooth of the tape feed ratchet 372 and thereby index such ratchet and tape feed sprocket clockwise when the cam 363 again allows the arm 364 to rock in a clockwise direction about its pivot 366.

A detent lever 373, pivoted on a pivot stud 374, carries a detent roller 375 which is adapted to engage the teeth of a detent gear 376 which is fast on the shaft of the tape feed sprocket. Spring 377 keeps the detent roller 375 in contact with the teeth of the detent gear 376 and thereby stabilizes the operation of the tape feed mechanism.

Immediately after a punching operation the latch levers are restored to their inactive or latched positions shown where they are held by the latching notches 350 of the armatures 351 of their related magnets of the group PM1 to PM6, inclusive. This is effected by a restoring bail 378 (Figs. 35 and 39) extending across the lower side of the right hand arms 362 of all latch levers 342. The bail 378 is formed integral with an arm 379 and the latter is fulcrumed at one end on the fixed rod 343 and is adapted to be engaged at its other and outer end by an eccentrically mounted roller 380 extending between and fixed at its ends to the tape feed cam 363 and the locking bail cam 334. During the mid-part of the punch cycle, the locking bail 360 having been restored to ineffective position, the eccentric stud 380 engages the outer end of the lever arm 379. As a result, the arm 379 and bail 378 are moved counterclockwise about the rod 343. Thus, the bail 378 engages any previously tripped latch levers 362 and moves them counterclockwise and slightly past the latching position shown in Figs. 35 and 37. In moving the previously tripped latch levers past their latching position, the bail 378 will also engage and move the remaining or untripped latch levers counterclockwise. As the latch levers are thus moved counterclockwise, one of the levers engages a bail element 381 forming a part of a knock-off bail lever 382 which is pivoted on a rod 383. The knock-off lever 382 also includes a second bail element 384 which is arranged above and extends across the outer ends of all armatures 351 of the punch magnets PM1 to PM7, inclusive. Thus, the lever 381 is rocked clockwise and the bail element 384 thereof will engage and release any of the armatures 351 that may be stuck with the result that all armatures will be positioned against the ends 349 of their related latch levers and held there by their related springs 352. The restoring bail 378 is then permitted by the further rotation of the eccentric roller 380 to return to the position shown, and in so doing the springs 346 move their respective latch levers 342 clockwise until their upper pointed ends 349 again engage the right hand wall of the notches 350 in their related armatures and are thereby held in latched position.

Provision has been made for disabling the tape punch in case of abnormal condition of tape being punched therein, as for example, tape failure or excessive tape tension. Furthermore, the disabling mechanism includes a connection to a tape hold-down plate which cooperates with the tape feed sprocket so that the punch will be disabled should for any reason the hold-down plate be moved away from the tape feed sprocket.

Specifically, a tape hold-down plate 385 is mounted to cooperate with the tape feeding sprocket 331. The hold-down plate 385 has an arcuate portion which is adapted to overlie a segment of the tape feeding sprocket which serves to guide the tape about the sprocket. The plate 385 is carried by a lever 386 which is pivoted on a stud 387 extending from a wall of the punch frame. The lever 386 has a pin 388 extending from a face thereof, and this pin anchors one end of a spring 389. The spring 389 is looped and has its opposite end anchored at a fixed pin 390 which extends from one of the walls of the punch. The pivot points of the spring 389 are so arranged as to cause the spring to exert an over-center action against the lever 386. Consequently, when the lever 386 is moved in a clockwise direction about its pivot 387, the spring 389 will cause the lever to have a positive action as it approaches its limit of movement in a clockwise direction, and it then exerts a force on the lever to hold it open. In the counterclockwise movement of the lever 386, a similar action results from the spring 389 whereby the arcuate portion of the hold-down plate 385 is held against the feed sprocket 331. The lower end of the lever 386 has pivoted thereto a rearwardly extending arm 391 which by means of a slot 392 at its opposite end is connected with a stud 393, the stud being located in a downwardly projecting portion of a curved lever 394. The lever 394 is mounted for rocking movement about a pivot pin 395, and its free end 396 includes a laterally bent arm which is adapted to lie in contact with the upper surface of a tape passing through the punch. The lever 394 is connected by means of a pin 397 with the slot of a rearwardly extending lever 398. The connecting slot in the lever 398 affords a limited amount of lost motion between the lever and the pin 397. The rear end of the lever 398 is connected by means of a pin 399 to a bail lever 400. The bail lever 400 is mounted for rocking movement about a pivot pin 401 extending from the lower rear corner of the punch frame. The bail lever 400 has a transversely extending cross member 402 which terminates in a downwardly extending arm 403 which is apertured to embrace the pin 401. A forwardly extending arm 404 of the bail lever is connected to a flexible contact carrying leaf 405 whereby rocking movement of the arm 404 will make and break a contact PTC.

The tape guide roller 330 is carried by an upstanding lever 407 which is also pivoted on the pin 401 at the rear lower corner of the punch frame. The lever 401 has a laterally extending bail 408 which extends over the rear edge of the bail lever 400, the arrangement being such that clockwise rocking movement of the upstanding lever 407 about the pivot pin 401 will engage the left hand end of the lever 398 connected to lever 400 and rock the lever 400 in a clockwise direction as viewed in Fig. 35. This rocking motion of the bail lever 400 is possible by virtue of the pin and slot connection at the forward end of the lever 398. The upstanding lever 407 is normally urged in a counterclockwise direction by a spring 409 which connects the lower end of the lever with a fixed frame member. The lever 394 is urged in a counterclockwise direction about its pivot pin 395 by a spring 410 which interconnects that lever with a pin carried by a fixed frame member.

It will appear from the foregoing that when the hold-down plate 385 is rocked away from the tape sprocket 331 by moving the same in a clockwise direction about its pivot 387, the lower end of the lever will force the rearwardly extending arm 391 toward the rear of the punch until the forward end of the slot 392 engages the stud 393. When the arm 391 has engaged the stud 393, the lever 394 will be rocked about its pivot 395, thereby pulling forward on the lever 398 and thereby effectively rocking the bail lever 400 about its pivot 401. The clockwise movement of the bail lever 400 and its associated arm 404 will serve to open the contact PTC. Furthermore, when the tape hold-down plate 385 is rocked away from the sprocket 331, the plate 396a will be lifted and thereby positioned so that a tape may be readily inserted in the punch. It will appear, therefore, that a controlled circuit to the punch may be opened when the hold-down plate is rocked away from the tape feed sprocket 331. Should the supply of tape under the free end of the lever 394 for any reason fail, the lever 394 will drop under the influence of its spring 410, rocking about its pivot pin 395 in a counterclockwise direction. This likewise will exert a pull on the rearwardly extending lever 398 and cause the opening of the contact PTC in manner similar to that described before. The tension of the tape in contact with the tape roller 330 is normally insufficient to overcome the tension of the spring 409. Should, however, the tension in the tape be increased to the point where the lever 407 is rocked in a clockwise direction about its pivot pin 401 and against the tension of the spring 409, the bail 408 of the lever 407 will operate the bail lever 400 as described and rock the latter in a counterclockwise direction, thereby breaking the contact PTC.

*Tape hole counter*

The trial copy recorder (Fig. 1) is provided with a hole counter 600 which is adapted to count the holes being punched into the tape so as to insure that a minimum amount of tape will be punched for each line. It will appear from a consideration of the duplicate tape reader which is used in connection with the justified copy reproducer (Fig. 1a) that the distance between the reading stations in said reader is substantially three inches. It is important that the justification code designations for a line be read in the justification code reading station before the character code reading station begins to read the print code for such line. For this reason a minimum amount of tape, i. e. substantially three inches, containing at least thirty columns of perforations must be provided. The hole counter 600 controls the foregoing function in connection with the tape punch.

The hole counter is illustrated in Figs. 40 and 40a and it comprises in general a stepping switch which is rendered operative to count the first 27 holes that are punched into the tape. A frame 601 supports a control magnet HCM which is connected to the punch clutch magnet. The armature 602 of the magnet HCM is pivoted on a pin 603 and includes a forwardly extending arm 604. A forwardly disposed portion of the frame 601 has a pair of upstanding lugs 605 into which is journalled a shaft 606. The shaft has fixed to one end thereof a ratchet wheel 607 which has 30 equally spaced teeth 608 in the periphery thereof. The shaft 606 has fixed thereto a cam 609 having a single lobe 610 which is adapted to operate a pair of contacts HCT. There is a second cam 611 fixed to the shaft 606 and this latter cam has a single lobe 612 which is positioned to follow the cam lobe 610 the distance of one ratchet wheel tooth. The lobe 612 is adapted to operate a pair of contacts HCB.

The forwardly extending portion 604 of the armature has pivoted thereto a pawl 613, the free end of which extends into contact with the ratchet teeth 608. The pawl is held against the teeth of the ratchet wheel by the conjoint action of a spring 614, and a stop lug 615. A detent 616 which cooperates with the teeth of the ratchet wheel 607 prevents reverse rotation of the wheel.

Following each energization of the magnet HCM, the ratchet wheel 607 will be moved in a clockwise direction the space of one tooth. The cam lobe 610 is arranged to transfer its contact HCT at the 27th punching cycle and to release the contact at the 28th punching cycle. The lobe 612 is arranged to transfer its contact HCB at the 28th punching cycle and to release the contact at the 29th punching cycle. When the cam 609 operates its transfer contact HCT the related circuit functions to stop further automatic stepping of the counter in response to punch operation and conditions a circuit which is effective after operation of the J carriage return switch, as will appear more fully hereinafter, to punch an interlocking code (the 7 hole). When the cam 611 operates its transfer contact HCB it causes punching of the justification control code, i. e. the 7 and 6 holes and the 1 and 5 holes in various combinations, and when the contact is released by further rotation of the cam at the 29th step it controls the punching of the carriage return code.

*Justification code computer*

The trial copy recorder has embodied therein a justification code computer illustrated in Figs. 41 through 48 of the drawings which operates to select one of 30 different justification control codes in accordance with the number of units a trial line is shorter or longer than the desired justified length and in accordance with the number of word spaces in the line. The mechanism is mounted as a unit within the frame at the rear of the carriage to coact with a computer code bar assembly mounted on the carriage. The justification control information is in the form of a five unit code and accordingly there are five sets of contacts JC1, JC2, JC3, JC4 and JC5 (see also Fig. 43). Each set of contacts has an associated vertical contact arm 637 and a horizontal seeker 638 is pivoted to the upper end of each contact arm by means of a pivot stud 639. The movable contact spring 640 of each set of contacts is formed with a tension in a direction tending to close the JC contact points, but a bail 641 extending across the five contact arms 637 normally holds the contact points open against the force of the springs 640.

A seeker bail 642 determines the angular position of all five of the seekers with respect to their contact arms. The seeker bail 642 extends laterally under the five seekers and is engaged by each of them by a hooked portion 643. The seeker bail 642 is designed to permit horizontal sliding movement of the seekers and therefore the seekers rest freely on the top of the bail.

The seeker bail 642 is indexed from its normal or zero position upwardly to eight different positions by a stepping magnet JSM mounted on the frame 645. The stepping magnet JSM is energized by the word spacing mechanism of the trial copy recorder so that the seekers are elevated one position for each succeeding word space.

The indexing mechanism is best shown in Fig. 43 of the drawings wherein the pivoted armature 646 has a rearwardly extending arm 647 to the rear end of which is pivoted a connecting link 648 by means of a pivot stud 649. The depending end of the connecting link 648 is pivoted to an indexing arm 650 by means of a pivot stud 651. The indexing arm is mounted for rocking movement on a flanged frame member 652 by means of a pivot shaft 653. It will follow, therefore, that whenever the armature 646 is attracted by the magnet JSM, the rearwardly extending arm 647 of the armature structure will be elevated with the consequent elevation of the indexing arm 650. The movement of the indexing arm 650 is transmitted to the seeker bail 643 by means of a pawl 654 which has a pivotal connection 655 on the end of the indexing arm 650. The pawl 654 has an inturned upper end 656 which is adapted to engage the teeth of a segment 657 at the outer end of a bail supporting and operating arm 658, the opposite end of the arm 658 being pivoted on a pivot screw 659 supported in an upstanding lug 660 formed at the end of the flanged frame member 652. A guide block 661 maintains the free end of the pawl 654 in alignment with the tooth segment 657 and a spring 662 interconnecting the pawl and the operating arm 650 maintains the pawl in operative position.

It will follow from the foregoing that each time the magnet JSM is energised, the pawl operating arm 650 will be rocked in a counterclockwise direction about the pivot rod 653 and the pawl 654 will thereby be rocked into contact with the tooth segment 657 and elevate the bail supporting and operating arm 658.

The opposite end of the frame 652 pivotally supports a holding ratchet 663 to which the end of the bail 642 is attached. The holding ratchet 663 comprises an arm 664 which is pivoted by means of a pivot screw 665 to an upstanding lug formed in the channel frame member 652. The free end of the holding ratchet arm 664 has a toothed segment 667 similar to the segment 657. The teeth of the segment 667 are adapted for engagement by a detent 668 which is attached to and extends upwardly from the armature 669 of a release magnet JRM. The armature 669 is pivoted to the top of the horizontal portion 671 of the frame 645 and it includes an upstanding lug 672 which is connected by means of a spring 673 to a lug 674. The spring 673 is tensioned to hold the free inbent end of the detent 668 in contact with the teeth of the segment 667. As a consequence of this arrangement each time the holding ratchet arm 664 is indexed upwardly, the spring 673 will engage a tooth of the segment and hold the arm in its adjusted position. Release of the holding mechanism follows energization of the magnet JRM which effectively attracts the armature 669 and rocks the same about its pivot in a counterclockwise direction. The pivot shaft 653 has mounted thereon a switch arm 673a which controls contacts SSC which when opened will prevent further upward indexing of the seeker bail 642. The switch arm 673a is mounted for rocking movement on the pivot shaft 653 and an arm 677 thereof extends generally parallel to the holding ratchet arm 664. An upstanding link 678 is pivoted to the arm 677 by means of a pivot pin 679. The upper end of the upstanding link 678 is slotted to engage a pin 680 extending laterally from the side of the holding ratchet arm 664. As a result of this connection, the contact SSC will be separated when the seeker bail 642 moves to its highest intended position shown in Fig. 47. A stop lug 681 is located under the arm 677 and limits its downward movement. When the seeker bail 642 is released the bottom of the slot in the upstanding link 678 limits the movement of the bail in a clockwise direction by engaging the adjusting screw 677a with the stop lug 681.

Pivoted on the pivot shaft 653 at the end of the channel-shaped frame member 652 on which the seeker indexing arm is located is a bracket structure 682 which is generally U-shaped, and supports on the inner leg of the U a contact operating arm 683 which controls a pair of contacts JZC in the circuit of an indicating signal such as a lamp. The contact arm 683 is under the control of an operating arm 685 which is pivoted on a pin 686 extending from the face of the bracket structure 682. The operating arm 685 is connected to the bail supporting and operating arm 658 by means of a link 687. It will thus appear that whenever the arm 658 is indexed upwardly, the operating arm 685 will follow its movement. The operating arm 685 includes a nose 688 which extends through a vertical slot in a face plate 689.

A small cam 690 is mounted on the code bar assembly to move with the carriage, and this cam coacts with the nose 688 of the operating arm 685 to close the contact points JZC during certain zones of movement of the carriage depending on the number of word spaces in the line. In other words, the greater the number of word spaces the greater will be the range of positions of the carriage in which justification can be accomplished. Accordingly, the zone cam 690 on the carriage is arranged to hold the contacts JZC closed through a maximum of 30 units of travel of the carriage when there are eight or more word spaces and to close the contact at one position only when there is only one word space. All intermediate numbers of word spaces will hold the contact closed a proportionate number of units of travel of the carriage. Because of these requirements the zone cam 690 is generally triangular in shape and has formed in the angular face of the same cam surfaces 691 which are adapted to be engaged by the nose 688 of the operating arm 685. When this engagement takes place, the operating arm 685 is cammed in the direction of its length whereby the bracket structure 682 and the contact arm 683 are moved in a counterclockwise direction about the pivot shaft 653 to close the contacts JZC.

The contacts will remain closed to give a signal so long as the nose 688 of the operating arm 685 is in contact with the face of the cam 690. It will be observed by reference to Fig. 42 that the face surface of the cam 690 presents an angular area which increases in width from bottom to top. Consequently, as the operating arm 685 is indexed upwardly as word spaces are put into the line being written a wider surface of the cam will be presented to the nose of the operating arm. The signal, herein a lamp JZL, remains energized during the time that the nose of the operating arm travels across the face of the cam. The manner in which the cam derives its shape is taught in the code chart of Fig. 50.

The five seekers 638 and their associated contacts and contact levers are spaced horizontally one inch apart so that a code bar assembly 693 five inches in length (Fig. 42) mounted on a carriage frame 692 has five one-inch sections S1, S2, S3, S4 and S5 associated with the seekers, one such section being associated with each one of the seekers. Each one-inch section of the code bar assembly 693 has nine vertically spaced fields at levels corresponding to zero and the eight stepped positions of the seekers. Each level (except zero) and each section of the code bar assembly is notched at certain points to allow forward movement of the seekers under the force of their contact springs to an extent to allow the contact points to close.

The remaining portions of the code bars which are not notched restrain forward movement of the seekers to prevent closing of the contact points. Thus, each horizontal unit space of each section and each level of the code bar assembly is either notched or not to control the operation of all five contacts JC1 through JC5, according to the horizontal position of the carriage and the vertical position of the seekers. In this manner, a code may be set up which is the quotient of the unit shortage in a line divided by the number of word spaces in the line. The face of the cam 690 and the face of the code bars 693 are convexed to accommodate the arc of the operating arm 685 and the seekers 638, respectively.

During the typing of the trial line the seekers do not contact the code bars and consequently do not interfere in any way with the carriage movement. This is because the previously mentioned bail 641 extends across the contact arms and normally holds the contact points open and also holds the seekers withdrawn from the plane of the code bars on the carriage. An electromagnet JCM is provided for moving the bail 641 at the end of a trial line so that the noses 695 of the seekers are all allowed to move through their respective slots in the plate 689 and into cooperative relation with the code bars whereby some seekers are stopped by the face of the code bars while others move into notches and allow their contacts to close. In this manner the contacts are closed in various combinations representing the quotient of the unit shortage in a line divided by the number of word spaces in such line. The magnet JCM is energized following the closure of the J carriage return switch. The specific manner in which the magnet JCM controls the bail 641 is best shown in Fig. 45, wherein it is seen that the armature 696 of the magnet JCM (which in this case includes two magnet coils for furnishing the required power) is pivoted on the horizontal portion 671 of the frame 645 and includes an upstanding arm 697 to which is pivoted a bail operating lever 698. The bail operating lever 698 is pivotally connected to a bracket 699 by means of eccentric pivot 699a. The bracket 699 is secured at the central portion of the bail 641 which has ears formed at each of its end portions whereby it is mounted to turn about shaft 653. The bracket has an upstanding lug 700 to which is fixed one end of a spring 701, the other end of the spring being attached to the flange of the frame member 652. It will be seen, accordingly, that the spring 701 will hold the bail 641 against the contact arms 637 and since the tension of the spring 701 is greater than the combined pressure of the contact springs 640, the contacts will be held open. When, however, the J carriage return switch is closed, the magnet JCM will be energized and its armature 696 will be attracted to the core of the magnet whereby the arm 697 will be rocked in a clockwise direction. This action will result in a forward pull on the bail operating lever 698 which is sufficiently strong to overcome the tension of the spring 701 with the result that the bail 641 is withdrawn from contact with the contact operating arms 637. The contact springs 640 of the five JC1 through JC5 contacts will project their associated seekers 638 into operative contact with the code bars 693. Thereafter, the seekers are immediately withdrawn and the bail release magnet JRM will be energized to rock the detent 668 out of contact with the tooth segment 667 whereby all the seekers are again restored to their normal or zero position. The forwardly projected position of the seekers is indicated in Fig. 48 wherein one seeker is shown to be in a depression of its associated code bar section and a second seeker is shown to be in contact with the face of its associated code bar section. This results in the closure of the contacts controlled by first seeker and in the maintenance of the open condition of the contacts controlled by the second seeker.

Tape punching circuits

In order to operate the tape punch, the Punch On switch (see Figs. 51 and 52) must be pressed, and with the switch in this position, the key levers of the trial copy recorder cannot be operated unless there is a supply of tape properly inserted in the punch. This is because the key lever lock magnet KLM must be energized to allow key lever operation, and with the punch switch on, the energizing circuit for magnet KLM includes the punch tape contact PTC. This contact PTC is in the tape punch unit and is closed only when there is tape in the punch and there is not excessive tension on the tape between the punch and the tape supply spool. A contact closed when the punch switch is off allows the key lever lock magnet to be energized regardless of whether the contact PTC is open or closed.

All circuits controlling the punching of the tape include the tape contact PTC, the contact points closed by punch switch in its on position and the normally closed points of the punch lock contact PLC. The contact PLC is operated momentarily during the first part of the cycle of operation of the tape punch, and the normally closed points of contact PLC are tungsten circuit breakers provided to eliminate arcing from other contact points in the circuit.

In feeding tape through the punch by punching only the small feed holes, the tape feed switch lever is pressed to close the normally open points of this switch and energize the punch switch magnet PCM. This will cause continuous cycles of operation of the punch as long as the tape feed switch is held depressed even though the energization of magnet PCM is momentarily interrupted each cycle by the operation of contact PLC.

In the automatic operation of the tape punch by the recorder through the code selector, the selector common contact SCC is operated by every selector slide, and the closing of these contact points establishes a circuit to the common side of all the selector code contacts SC1, SC2, SC3, SC4, SC5 and SC6. This circuit includes the previously mentioned normally closed points of contact PLC and also the normally closed points of a transfer contact on an anti-repeat relay ARR. This circuit further extends from these normally closed points of the relay transfer contact through another normally closed contact on relay ARR to the punch clutch magnet PCM. Thus, the punch clutch magnet is energized and the closing of certain ones of the selector code contacts according to the particular slide which is operated causes energization of the corresponding punch code magnets PM1, PM2, PM3, PM4, PM5 and PM6 to which the selector code contacts are respectively connected.

As the punch operates, the transfer contact PLC is operated to close its normally open points and complete a circuit for energizing relay ARR and the operation of contact PLC also breaks the energizing circuit for the punch clutch magnet and the punch code magnets. The contact PLC returns to its normal position at about midpoint in the punch cycle, and in this return movement, the movable contact engages the normally closed points before breaking the normally open points. Thus, if the selector common contact SCC is still closed, the anti-repeat relay ARR is held energized through the normally open points of its own transfer contact, and will remain energized as long as contact SCC remains closed to prevent energization of the punch magnets even though contact PLC has returned to normal. This prevents a repeat operation of the punch regardless of how long the selector contacts are held closed.

A code relay CR is used for deleting a code in the tape and also for punching a stop code. This relay is provided with seven normally open contacts, and is energized by pressing either the code delete switch or the stop code switch. When the code delete switch is pressed, a circuit is established through the normally closed points of the tape feed switch contacts, and through a normally open contact of relay CR to the two movable contacts of relay ARR the same as when the selector common contact SCC is closed. This energizes the punch clutch magnet PCM through the normally closed contact of relay ARR, and also energizes the punch code magnets PM4, PM5 and PM6 through three normally open contacts on relay CR which are all connected to the normally closed points of the transfer contact of relay ARR the same as selector contacts SC4, SC5 and SC6. At the same time, punch code magnets PM1, PM2 and PM3 are energized through respective normally open contacts of relay CR which are all connected through another normally closed contact on relay ARR and through normally closed points of the transfer contact operated by the stop code switch.

Thus, the pressing of the code delete switch causes a punch operation in which all the six code holes are punched the same as if a selector slide were operated to close all the six selector code contacts. However, only one punch cycle will occur regardless of how long the code delete lever is held depressed. This is because the anti-repeat relay ARR will be energized during this punch cycle and will be held energized through the normally open contact of relay CR as long as the switch is held depressed in the same manner as relay ARR is held energized through the selector common contact SCC.

However, if it is desired to rapidly delete a series of codes without pressing and releasing the delete switch once for each code, both the delete switch and the tape feed switch may be pressed simultaneously. These two switches are located adjacent each other in the front panel and both may be easily pressed by placing the finger in a position to overlap both switch levers. This simultaneous operation of the two switches causes the punch to punch all six holes in the tape, but as the normally closed points of the tape feed switch are now open, the holding circuit for relay ARR is open and the relay is deenergized at the end of each punch cycle. This permits the punch to operate continuously and punch code delete holes as long as both switches are depressed.

In punching a stop code into the tape, the stop code switch only is depressed. This energizes relay CR by closing the normally open points of the stop code switch to cause a single cycle of operation of the punch and to hold relay ARR energized as long as the switch is held depressed. The circuits for accomplishing this single punch cycle are the same as when the code delete switch is pressed. However, when the stop code switch is pressed, the normally closed points of this switch are opened to prevent energization of punch code magnets PM1, PM2 and PM3. Thus, only punch code magnets PM4, PM5 and PM6 are energized to punch the stop code into the tape.

A punch common contact PCC on the tape punch is connected in parallel with the selector common contact SCC in the energizing circuit for the punch clutch magnet PCM. This contact PCC is closed whenever any one or more of the punch lever latches is tripped by energization of the associated ones of the punch code magnets. The closing of contact PCC will cause a punch cycle to occur by energizing magnet PCM regardless of whether or not the selector contact SCC is closed. Contact PCC thus acts to insure an operation of the punch in the event the selector contact SCC is closed for a short interval which is sufficient to trip the punch lever latches but insufficient to engage the clutch.

The space bar is marked Justifying Space in the trial copy recorder, and its operation closes a word space contact WSC operated by the space bar selector slide. This contact WSC energizes the magnet JSM on the justification code computer, which is the magnet that steps the seekers upwardly each time the word space contact is closed. If a line contains more than eight word spaces, a contact SCC on the computer opens at the eighth stepped position of the seekers so that further operation of contact WSC during that line does not energize magnet JSM.

In addition to the justifying space bar, the recorder is provided with a one unit space key lever and a three unit space key lever. Operation of these keys causes corresponding carriage spacing movements but does not energize magnet JSM. These one and three unit keys are called fixed space keys because they select codes causing operation of similar keys on the justified copy reproducer which cause the same carriage spacing as on the trial copy recorder and is not altered for justification as is the extent of spacing resulting from operation of the space bar.

As each line is typed on the trial copy recorder, the number of codes punched in the tape is counted by the tape hole counter. The tape hole counter as pointed out before is provided to insure that a sufficient length of tape is punched for each line of copy for proper operation of the double reader on the justified copy reproducer. The tape hole counter is essentially a stepping switch mechanism using a magnet HCM to index a rotary shaft through a pawl and ratchet mechanism. The magnet HCM is momentarily energized once each punch cycle through the selector common contact over a circuit connecting the magnet HCM in multiple with the punch clutch magnet through a normally closed contact of relay ARR and the normally closed points of a transfer contact HCT of the counter mechanism.

When a line has been typed to a length which, in consideration of the number of word spaces, allows for justification upon retyping, the justification zone contact JZC on the computer is closed as previously described. This contact closes an energizing circuit for an indicating lamp JZL which is positioned at the rear of a translucent lens at the front of the machine. This gives a visual indication to the operator that, if the trial line is ended while this light is energized, the line may be justified when retyped on the justified copy reproducer. This justification zone light always is lighted for some distance short of the 0 point on the special carriage scale provided on the trial copy recorder, and this scale assists the operator in knowing whether or not to type additional letters after the light is first lighted. The lamp JZL will stay energized by contact JZC as long as the line can be justified but will be deenergized if the operator types beyond a point permitting justification. The justification zone of course varies with the number of word spaces but lines having eight or more word spaces may be expanded up to twenty-two units or contracted as much as seven units.

In order to end a line on the trial copy recorder, the operator merely presses and releases the J carriage return switch on the front panel of the machine which causes first a number 7 code to be punched in the tape and then causes a justification code to be punched and, finally, causes the carriage to be returned automatically. The apparatus in the recorder functions in response to operation of the J carriage return key in the following sequence:

1. When the J carriage return switch is pressed, relay ICR is energized by the closing of the contacts of the switch. Upon release of the J carriage return switch a holding circuit becomes effective to maintain ICR energized through its normally open contacts and a circuit is then established upon the closing of the normally closed contacts of the J carriage return switch and a set of normally open contacts of relay ICR and normally closed contacts of relay JCR to cause punching of a number 7 code hole in the tape providing at least 27 code holes have previously been punched in the tape for that line. The above circuit is completed (if 27 or more holes have been punched in the tape) through the hole counter contacts HCT in their transferred position to energize the punch magnet PM7. This causes a cycle of operation of the tape punch in this instance by energizing the punch clutch magnet PCM through the punch common contact PCC, as previously described in connection with the tape punch. If less than 27 holes have been punched during typing of that line, the contacts HCT will be in normal position and punch magnet PM7 will not be energized upon releasing the J carriage return switch. In this case the releasing of the switch establishes another circuit through contacts HCT in normal position for energizing the punch clutch magnet PCM. This causes operation of the tape punch to punch feed holes in the tape and step the hole counter until the contacts HCT are operated after the 27th step. This operation of contacts HCT stops the punch operation and causes punching of the number 7 code in the tape as previously described. Simultaneously with the energization of magnet PM7 to cause punching of the number 7 code hole, magnet HCM becomes energized over the circuit including the same contacts of relays ICR and JCR and the normally closed contact of relay ARR.

During this cycle of operation of the tape punch to punch the number 7 code hole, relay ARR is energized through contacts PLC, thereby deenergizing magnet HCM to allow indexing of the counter cam to its 28th position. This restores contacts HCT to reconnect magnet HCM to punch magnet PCM so that the counter will again follow the operation of the tape punch in the manner previously described.

Also when relay ARR is energized, to index the counter cam to its 28th position, contacts HCB are transferred. Relay ARR becomes deenergized during this punch cycle, whereupon a circuit is established for energizing relay JCR through a normally closed contact on relay ARR and normally open contacts on relay ICR.

2. Energization of relay JCR now energizes the computer contact operating magnet JCM to select the justification code to be punched in the tape during the next punch cycle providing the carriage is in the justifying zone to close contacts JZC and complete a circuit through normally closed contacts of relay LDR, normally open contacts of relay JCR and normally closed contacts of relay CRR. The energizing circuit for the punch clutch magnet PCM includes the normally open points of a transfer contact of relay JCR, and the normally closed contact of relay ARR. The punch code magnet PM6 is also energized over the same circuit up to the contacts of relay ARR, and, in this case, the circuit for the code magnet passes through the normally closed points of the transfer contact of relay ARR and through normally open contacts on relay JCR. This same circuit also energizes code magnet PM7 through a normally closed contact of relay CRR and another normally open contact of relay JCR. Likewise it will be noticed that a common side of all the computer contacts JC1, JC2, JC3, JC4 and JC5 is connected to this circuit so that when any one or more of these contacts close, the associated punch code magnets are energized. Thus, if the justification zone contact JZC is closed, the magnet JCM will be energized at the same time as the punch clutch magnet PCM to allow the computer code contacts to close and select the justification code to be punched in the tape along with the 6 and 7 code selected by the contacts of relay JCR. On short lines such as at the end of paragraphs, the carriage will not be in a position to close contacts JZC, and, accordingly, no five-unit code will be punched in the tape as the magnet JCM will not be energized. However, the 6 and 7 codes will be punched in the tape in all cases.

In the event the operator types a line longer than can be justified the indicating lamp JZL will be deenergized by the opening of contact JZC as previously described. In this case, or if the operator finds some error in typing the line, the entire line is easily deleted by pressing both the line delete and J carriage return switches. This may be done by placing one finger in a position to overlap the two switch levers as the two levers are located adjacent each other on the machine.

The same sequence of operations occurs when these two switches are pressed together as occurs when only the J carriage return switch is pressed, except that the line delete relay LDR is energized by the pressing of the line delete switch. The LDR relay is held energized after the switch is released by a holding circuit including its own normally closed points. During this sequence of operations with relay LDR energized, the computer magnet JCM is not energized when relay JCR becomes energized because the circuit for magnet JCM includes normally closed contacts of relay LDR. Relay CR becomes energized in this case instead of magnet JCM and the circuit to relay CR is completed as soon as relay ARR becomes deenergized after the transfer of contacts HCB. This circuit includes contacts HCB transferred, normally closed contacts of relay ARR, normally open contacts of relay JCR, normally closed contacts of relay CRR, and normally open contacts of relay LDR. The energization of relay CR selects the punching of the 1-2-3-4-5-6 code in the usual manner, and in this instance the 7 code hole is also punched because the punch code magnet PM7 is energized over the previously described circuit including normally open contacts of relay JCR and normally closed contacts of relay CRR.

During this second cycle of operation of the tape punch to punch either a justification code or a line delete code, relay ARR becomes energized by the closing of contact PLC. This deenergizes magnet HCM to step the hole counter to its 29th position, thereby restoring contact HCB to normal position to close a circuit for energizing relay CRR through a normally open contact of relay ARR, and a normally open contact of relay JCR. A holding circuit for relay CRR includes its own normally open contacts and normally closed points of the carriage return contacts CRTC so that relay CRR will be held energized until a carriage return operation. The holding circuit for relay JCR, however, includes a normally closed contact of relay CRR so that this relay will be deenergized by this energization of relay CRR. The holding circuits for relays JCR and LDR include normally open contacts of relay JCR so that these relays JCR (and LDR if energized) will now be deenergized by the deenergization of relay JCR.

3. A magnet CRM is provided beneath the keyboard of the trial copy recorder for operating the carriage return key lever, and this magnet now becomes energized over a circuit including the normally closed points of a transfer contact of relay JCR, and a normally open contact of relay CRR.

The energization of magnet CRM trips the carriage return cam which in the usual manner causes a return movement of the carriage. During this return movement of the carriage, contacts CRTC are operated to deenergize relay CRR, thereby deenergizing magnet CRM. The operation of contact CRTC also energizes magnet JRM on the computer which releases the seeker bail allowing all the seekers to return to their normal zero position. The operation of the carriage return cam automatically causes the punching of a carriage return code in the tape, and during this cycle of operation of the punch the hole counter is indexed to its 30th position.

The manner in which the justification controls must be set up may be observed from a study of the diagram of Fig. 50. It will be observed from this diagram that the controls are adapted to reduce a line having a minimum number of eight word spaces by seven units or to increase a line having a minimum number of eight word spaces by twenty-two units. It is evident, of course, that the greatest reduction or expansion of a line is possible when eight word spaces appear in the line. In this regard it may be noted that the normal space between words is two units and furthermore after the eighth word space all subsequent word spaces are reduced to a normal two units.

Spacing between words at the beginning of a line will be a given number of units for a given number of word spaces, whereafter the spacing between the following words will be reduced by a given number of units until the spacing between the first nine words has been adjusted, whereafter any additional words will be spaced by the normal two-unit space. The manner in which justification is controlled may best be understood by resort to an example. With reference to Fig. 50, suppose a line having five word spaces appears to be eight units short of a desired length. It will, therefore, be necessary to add eight units between the words of such line to achieve complete justification of the line. Thus, by referring to the justification code, which is applicable to such condition, it will be noted that it consists of the 2 code and the 4 code. The first of these codes, namely the 2 code, will control the number of units by which the words will be spaced during the reproduction of the initial part of the line. The 4 code in this diagram indicates the point at which the reduction, if any, in word spacing takes place.

The 2 code may be found in the small box at the bottom left of Fig. 50, wherein it will appear that the starting word space will be four units and that the reduced word space will be three units. By referring to the box at the lower right of Fig. 50, it will appear that the reduction in spacing units will take place after the third word space.

In the example there are five word spaces having an aggregate of ten normal units of spacing therebetween. Since the first three word spaces will be four units or a total of twelve units, and since the next two word spaces will be three units for each or an aggregate of six units, it follows that a total of eighteen units will be provided in the five word spaces. Since the normal number of space units in the five word space line would be ten units, as noted above, it readily appears that eight additional units have been provided to achieve complete justification of the line.

While a specific form of the instrumentalities employed in the machine has been described for purpose of illustration, it is contemplated that numerous changes may be made without departing from the spirit of the invention.

What is claimed is:

1. In a trial copy recorder adapted to produce a perforated control tape, a mechanism for computing the number of spaces required between words to effect justification comprising: a carriage under control of word space escapement, a member fixed to said carriage and having a plurality of zones having formed therein horizontally and vertically spaced apertures, a seeker for each of said zones fixed to said machine adjacent to but spaced from said member, means for positioning said seekers opposite successively higher apertures in said member upon each word spacing movement of said carriage, key controlled means for advancing seekers into contact with said member whereby a surface thereof abuts the surface of said member or enters an aperture therein, and control means associated with each of said seekers adapted to operate upon entry of a seeker into an aperture in said member.

2. In a trial copy recorder adapted to produce a perforated control tape, a mechanism for computing the number of spaces required between words to effect justification comprising: a carriage under control of word space escapement, a member fixed to said carriage and having a plurality of zones having formed in each horizontally and vertically spaced apertures, a seeker for each of said zones fixed to said machine adjacent to but spaced from said member, means for positioning said seekers opposite successively higher apertures in said member upon each word spacing movement of said carriage, key controlled means for advancing said seekers into contact with said member whereby a surface thereof abuts the surface of said member or enters an aperture therein, and a control contact associated with each of said seekers adapted to close upon entry of a seeker into an aperture in said member.

3. In a machine for producing a control tape for the control of a justified copy reproducer, a mechanism for computing and punching into a control tape the number of spaces required between words to effect justification comprising: a carriage under control of word space escapement, a member fixed to said carriage and having a plurality of zones having formed in each horizontally and vertically spaced apertures, a seeker for each of said zones fixed to said machine adjacent to but spaced from said member, means for positioning said seekers opposite successively higher apertures in said member upon each word spacing movement of said carriage, key controlled means for advancing said seekers into contact with said member whereby a surface thereof abuts the surface of said member or enters an aperture therein, control means associated with each of said seekers adapted to operate upon entry of a seeker into an aperture in said member, and a control tape punch under control of each of said control means.

4. In a machine for producing a control tape for the control of a justified copy reproducer, a mechanism for computing and punching into a control tape the number of spaces required between words to effect justification comprising: a carriage under control of word space escapement, a member fixed to said carriage and having a plurality of zones having formed in each horizontally and vertically spaced apertures, a seeker for each of said zones fixed to said machine adjacent to but spaced from said member, means for positioning said seekers opposite successively higher apertures in said member upon each word spacing movement of said carriage, key controlled means for advancing said seekers into contact with said member whereby a surface thereof abuts the surface of said member or enters an aperture therein, a control contact associated with each of said seekers adapted to close upon entry of a seeker into an aperture in said member, and a tape punch control magnet under control of each of said control contacts.

5. In a machine for producing a control tape for the control of a justified copy reproducer, a keyboard, a tape punch, means under control of said keyboard to control said tape punch for punching code holes representative of characters therein, means for counting the number of codes punched by said punch, means under control of said counting means for feeding tape through said punch when the effective counting capacity of said counter has not been reached, and means for disabling said tape feeding means when said counter has reached its effective counting capacity.

6. In a machine for producing a control tape for the control of a justified copy reproducer, a keyboard, a tape punch, means under control of said keyboard to control said tape punch for punching code holes representative of characters therein, a stepping switch, means for advancing said switch each time said punch is operated to punch a code in a tape, means under control of said stepping switch for feeding tape through said punch when the effective capacity of said switch has not been reached, and means for disabling said tape feeding means when said switch has reached its effective capacity.

7. In a trial copy recorder adapted to produce a perforated control tape, a paper carriage, an escapement mechanism for controlling the word spacing movement of said carriage, a member having a plurality of zones and having formed in each zone thereof a series of horizontally and vertically spaced control apertures, a seeker for each of said zones adjacent to but spaced from said member, means for stepping said seekers in one direction upon each word spacing movement of said carriage to position them opposite successive apertures in said member, means for causing a relative movement in a second direction between said member and said seekers, key controlled means for advancing said seekers into contact with said member whereby a surface thereof abuts the surface of said member or enters an aperture therein, a control contact associated with each of said seekers adapted to close upon entry of a seeker into an aperture in said member, and a tape punch under control of said control contacts.

8. In a trial copy recorder adapted to produce a perforated control tape, a paper carriage, means for controlling the word spacing movement of said carriage, a member having a plurality of zones and having formed in each zone thereof a series of horizontally and vertically spaced control apertures, a seeker for each of said zones adjacent to but spaced from said member, means for stepping said seekers in one direction upon each word spacing movement in said carriage to position them opposite successive apertures in said member, means for causing a relative movement in a second direction between said member and said seekers, means operative after a predetermined number of seeker stepping operations to render inoperative said means for stepping said seekers, key controlled means for advancing said seekers into contact with said member whereby a surface thereof abuts the surface of said member or enters an aperture therein, a control contact associated with each of said seekers adapted to close upon entry of a seeker into an aperture in said member, and a tape punch under control of each of said control contacts.

9. In a trial copy recorder adapted to produce a perforated control tape, a paper carriage, means for controlling the word spacing movement of said carriage, a member having a plurality of zones and having formed in each zone thereof a series of horizontally and vertically spaced control apertures, a seeker for each of said zones adjacent to but spaced from said member, means for stepping said seekers in one direction upon each word spacing movement in said carriage to position them opposite successive apertures in said member, means for causing a relative movement in a second direction between said member and said seekers, means for simultaneously urging said seekers into contact with said member, common means for maintaining said seekers spaced from said means, means responsive to the depression of a key to release said maintaining means whereby a surface of said seekers abuts the surface of said member or enters an aperture therein, a control contact associated with each of said seekers adapted to close upon entry of a seeker into an aperture in said member, and a tape punch under control of each of said control contacts.

10. In a trial copy recorder adapted to produce a perforated control tape, a paper carriage, means for controlling the word spacing movement of said carriage, a plate having a plurality of zones and having formed in each zone thereof a series of horizontally and vertically spaced control apertures, a seeker for each of said zones adjacent to but spaced from said plate, means for stepping said seekers in a vertical direction upon each word spacing movement in said carriage to position them opposite successive apertures in said plate, means for causing a relative movement in a horizontal direction between said plate and said seekers, key controlled means for advancing said seekers into contact with the plate whereby a surface thereof abuts the surface of said plate or enters an aperture therein, a control contact associated with each of said seekers adapted to close upon entry of a seeker into an aperture in said plate, a tape punch mechanism having a plurality of punches, a control magnet for each of said punches, and a control circuit for each of said magnets controlled by a respective one of said control contacts.

11. In a trial copy recorder adapted to produce a perforated control tape, a paper carriage, means for controlling the word spacing movement of said carriage, a plate having a plurality of zones and having formed in each zone thereof a series of horizontally and vertically spaced control apertures, a seeker for each of said zones adjacent to but spaced from said plate, an electromagnet for stepping said seekers in a vertical direction to position them opposite successive apertures in said plate, an energizing circuit for said electromagnet including a normally open contact, means operative upon each word spacing movement of said carriage to close said contact and thereby provide an energizing circuit for said electromagnet, means for causing a relative movement in a horizontal direction between said plate and said seekers, key controlled means for advancing said seekers into contact with said plate whereby a surface thereof abuts the surface of said plate or enters an aperture therein, a control contact associated with each of said seekers adapted to close upon entry of a seeker into an aperture in said member, and a tape punch under control of each of said control contacts.

References Cited in the file of this patent

UNITED STATES PATENTS

| | | |
|---|---|---|
| 742,523 | Timmis | Oct. 27, 1903 |
| 996,300 | Timmis | June 27, 1911 |
| 1,136,900 | Cornwall | Apr. 20, 1915 |
| 2,390,413 | Ayres | Dec. 4, 1945 |
| 2,540,027 | Dodge | Jan. 30, 1951 |
| 2,555,734 | Dodge | June 5, 1951 |